US010514840B2

(12) United States Patent
Miyazawa et al.

(10) Patent No.: US 10,514,840 B2
(45) Date of Patent: Dec. 24, 2019

(54) INFORMATION PROCESSING APPARATUS, METHOD, AND PROGRAM FOR DISPLAYING AN IMAGE DURING OVERDRAG

(71) Applicant: SONY CORPORATION, Tokyo (JP)

(72) Inventors: Yusuke Miyazawa, Tokyo (JP); Tetsuo Ikeda, Tokyo (JP); Fuminori Homma, Tokyo (JP); Reiko Miyazaki, Tokyo (JP); Ken Miyashita, Tokyo (JP); Shoichiro Moriya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/940,109

(22) Filed: Mar. 29, 2018

(65) Prior Publication Data

US 2018/0217729 A1 Aug. 2, 2018

Related U.S. Application Data

(63) Continuation of application No. 15/403,665, filed on Jan. 11, 2017, now Pat. No. 9,965,163, which is a (Continued)

(30) Foreign Application Priority Data

Oct. 8, 2010 (JP) ................................ 2010-228303

(51) Int. Cl.

| | |
|---|---|
| ***G06F 3/0484*** | (2013.01) |
| ***G06F 3/0485*** | (2013.01) |
| ***G06F 3/0488*** | (2013.01) |

(52) U.S. Cl.

CPC .......... *G06F 3/0485* (2013.01); *G06F 3/0488* (2013.01); *G06F 3/04845* (2013.01)

(58) Field of Classification Search

None

See application file for complete search history.

(56) References Cited

U.S. PATENT DOCUMENTS

| | | | |
|---|---|---|---|
| 6,259,432 | B1 | 7/2001 | Yamada et al. |
| 7,786,975 | B2 | 8/2010 | Ording et al. |

(Continued)

FOREIGN PATENT DOCUMENTS

| | | | |
|---|---|---|---|
| CN | 101384047 | A | 3/2009 |
| EP | 1727032 | A2 | 11/2006 |

(Continued)

OTHER PUBLICATIONS

Dec. 22, 2015, European Search Report for related EP Application No. 11183246.5-1507.

(Continued)

*Primary Examiner* — Diane M Wills

(74) *Attorney, Agent, or Firm* — Paratus Law Group, PLLC

(57) ABSTRACT

A method is provided for modifying an image. The method comprises displaying an image, the image comprising a portion of an object; and determining if an edge of the object is in a location within the portion. The method further comprises detecting movement, in a member direction, of an operating member with respect to the edge. The method still further comprises moving, if the edge is not in the location, the object in an object direction corresponding to the detected movement; and modifying, if the edge is in the location, the image in response to the detected movement, the modified image comprising the edge in the location.

18 Claims, 44 Drawing Sheets

100(100T) 100(100U) 100(100V)
overshoot List
Action
Adventure
Animation
Children
Comedy
Documentary
Drama
141
OP

Related U.S. Application Data continuation of application No. 13/242,129, filed on Sep. 23, 2011, now Pat. No. 9,619,135.

(56) References Cited

U.S. PATENT DOCUMENTS

| | | | |
|---|---|---|---|
| 2007/0150830 | A1 | 6/2007 | Ording et al. |
| 2008/0168404 | A1 | 7/2008 | Ording |
| 2009/0070711 | A1 | 3/2009 | Kwak et al. |
| 2010/0134425 | A1 | 6/2010 | Storrusten |
| 2010/0171716 | A1 | 7/2010 | Ikeda et al. |
| 2011/0001709 | A1 | 1/2011 | Wang |
| 2011/0010659 | A1 | 1/2011 | Kim et al. |
| 2011/0090255 | A1 | 4/2011 | Wilson et al. |

FOREIGN PATENT DOCUMENTS

| | | | |
|---|---|---|---|
| EP | 2017581 | A2 | 1/2009 |
| EP | 2034399 | A2 | 3/2009 |
| JP | 2862626 | B2 | 3/1999 |
| JP | 2006-042319 | A | 2/2006 |
| JP | 2010-515978 | A | 5/2010 |
| JP | 2010-157189 | A | 7/2010 |
| JP | 2013-508812 | A | 3/2013 |
| KR | 10-0873679 | B1 | 12/2008 |
| KR | 10-2009-0024594 | A | 3/2009 |
| KR | 10-2009-0073084 | A | 7/2009 |
| WO | WO 2011/007994 | A2 | 1/2011 |

OTHER PUBLICATIONS

Jun. 3, 2015, CN communication issued for related CN application No. 201110305572.7.

Apr. 30, 2014, Japanese Office Action for related JP application No. 2010-228303.

Galaxy Mini s5570 Overscroll Glow, Jun. 19, 2011, https://www.youtube.com/watch?v=254BHN6GueE.

Nov. 16, 2017, KR communication issued for related KR application No. 10-2011-0099965.

Dec. 20, 2018, European Summons to attend oral proceedings issued for related EP Application No. 11183246.5.

Oct. 11, 2019, Korean Office Action issued for related KR Application No. 10-2019-0082088.

DT
PR READ-AHEAD DISTANCE
EXECUTE FLICK FOR THIS DISTANCE
DISPLAY REGION
141
DB1
DB2
100(100A)
100(100B)
Cabbage
Lettuce
Fish
Fried noodles
Fried udon
Oregano
Sliced cheese
Chopped tomato
Tomato
Bread
Tofu
Sausage
Potato
Coffee beans 100
210
POSITION DETECTION DEVICE
220
CPU
230
RAM
240
DISPLAY DEVICE
250
NON-VOLATILE MEMORY 100(100G)
100(100H)
100(100I)
DT
G
141
OP
DB3
H1
H2
Clear
overshoot List
17:00
Action
Adventure
Animation
Children
Comedy
Documentary
Drama
Educational
Family
Foreign
Horror
Music 900(900A)
DT
141
OP
17:00
Clear
Shopping List
Cabbage
Lettuce
Fish
Fried noodles
Fried udon
Oregano
Sliced cheese
Chopped tomato
Tomato
Bread
Tofu
Sausage
Potato
Coffee beans
DB3
900(900B)
141
OP
DB3
DRAG OPERATION IS RECOGNIZED,
BUT DISPLAY OBJECT IS NOT MOVED.

S201
DRAGGING?
Yes
No
S202
DURING OVERDRAG?
Yes
No
S203
OVERDRAG IN IMMEDIATELY PRECEDING PROCESSING FLOW?
Yes
No
S204
FADEOUT-DRAWING
S205
OVERDRAG ALSO IN IMMEDIATELY PRECEDING PROCESSING FLOW?
Yes
No
S206
UPDATE OVERDRAG-START POINT
S207
IS OPERATION POINT PRESENT WITHIN PREDETERMINED RANGE?
Yes
No
S208
UPDATE OVERDRAG-DRAWING

100(100T)
100(100U)
100(100V)
141
OP
17:00
Clear
overshoot List
Action
Adventure
Animation
Children
Comedy
Documentary
Drama 100(100T)
100(100U)
100(100V)
141
OP
17:00
Clear
overshoot List
Action
Adventure
Animation
Children
Comedy
Documentary
Drama 100(100T)
100(100U)
100(100V)
141
OP
Clear
overshoot List
17:00
Action
Adventure
Animation
Children
Comedy
Documentary
Drama 100(100T)
100(100U)
100(100V)
141
OP
17:00
Clear
overshoot List
Action
Adventure
Animation
Children
Comedy
Documentary
Drama 100(100T)
141
OP
Clear
overshoot List
17:00
Action
Adventure
Animation
Children
Comedy
Documentary
Drama
100(100U)
141
OP
Clear
overshoot List
17:00
Action
Adventure
Animation
Children
Comedy
Documentary
Drama
100(100V)
141
Clear
overshoot List
17:00
Action
Adventure
Animation
Children
Comedy
Documentary
Drama 100(100T)
141
OP
Clear
overshoot List
17:00
Action
Adventure
Animation
Children
Comedy
Documentary
Drama
100(100U)
141
OP
Clear
overshoot List
17:00
Action
Adventure
Animation
Children
Comedy
Documentary
Drama
100(100V)
141
Clear
overshoot List
17:00
Action
Adventure
Animation
Children
Comedy
Documentary
Drama 100(100T)
141
OP
Clear
overshoot List
17:00
Action
Adventure
Animation
Children
Comedy
Documentary
Drama
100(100U)
141
OP
Clear
overshoot List
17:00
Action
Adventure
Animation
Children
Comedy
Documentary
Drama
100(100V)
141
Clear
overshoot List
17:00
Action
Adventure
Animation
Children
Comedy
Documentary
Drama 100(100T)
100(100U)
100(100V)
141
OP
overshoot List
Clear
17:00
Action
Adventure
Animation
Children
Comedy
Documentary
Drama 100(100T)
141
OP
17:00
Clear
overshoot List
Action
Adventure
Animation
Children
Comedy
Documentary
Drama
100(100U)
100(100V)

100(100V)
141
overshoot List
17:00
Clear
100(100U)
141
OP
overshoot List
17:00
Clear
100(100T)
141
OP
Mypicture List
17:00
Clear 100(100T)
141
OP
Mypicture List
17:00
Clear
100(100U)
141
OP
overshoot List
17:00
Clear
100(100V)
141
overshoot List
17:00
Clear 100(100V)
141
100(100U)
141
OP
100(100T)
141
OP
overshoot List
Mypicture List
Clear
17:00

100(100T)
100(100U)
100(100V)
141
OP
Mypicture List
overshoot List
17:00
Clear

100(100X1)
100(100X2)
100(100X3)
17:00
Clear
overshoot List
Action
Adventure
Animation
Children
Comedy
Documentary
Drama
B(1)
B(2)
B(3)
A(1)
A(2)
A(3)
L
141
OP 100(100Y1)
100(100Y2)
100(100Y3)
141
OP
VELOCITY v
A
B
Clear
overshoot List
17:00
Children
Comedy
Documentary
Drama
Foreign
History
Indipendent 100(100a1)
100(100a2)
100(100a3)
DT1
DB4
141
OP
DT2
L
Clear
overshoot List
17:00
Action
Adventure
Animation
B(1)
B(2)
B(3)
C(2)
C(3)

100(100c1)
100(100c2)
100(100c3)
DT1
DT2
DB5
OP
141
L
N
M
Action
Adventure
Animation
Children
Comedy
Documentary
Drama
Foreign 100(100c3)
DT1
DB5
141
OP
Action
Adventure
Animation
Children
Comedy
Documentary
Drama
Foreign
N
DT2
M
100(100c4)
DT1
141
DB5
M
OP
DT2
Action
Adventure
Animation
Children
Comedy
Documentary
Drama
Foreign
100(100c5)
DT1
DB5
141
OP
DT2
Action
Adventure
Animation
Children
Comedy
Documentary
Drama
Foreign 100(100c7)
DT1
DB5
141
DT2
Action
Adventure
Animation
Children
Comedy
Documentary
Drama
Foreign
AUTOMATIC REDUCTION
M=αN
100(100c6)
DT1
141
DB5
OP
Action
Adventure
Animation
Children
Comedy
Documentary
Drama
Foreign
DT2
100(100c3)
DT1
DB5
141
OP
M
Action
Adventure
Animation
Children
Comedy
Documentary
Drama
Foreign
N
DT2

100(100c3)
DT1
DB5
141
OP
DT2
Action
Adventure
Animation
Children
Comedy
Documentary
Drama
Foreign
N
100(100c8)
DT1
DB5
141
OP
DT2
Action
Adventure
Animation
Children
Comedy
Documentary
Drama
Foreign
AUTOMATIC
REDUCTION
100(100c7)
DT1
DB5
141
DT2
Action
Adventure
Animation
Children
Comedy
Documentary
Drama
Foreign

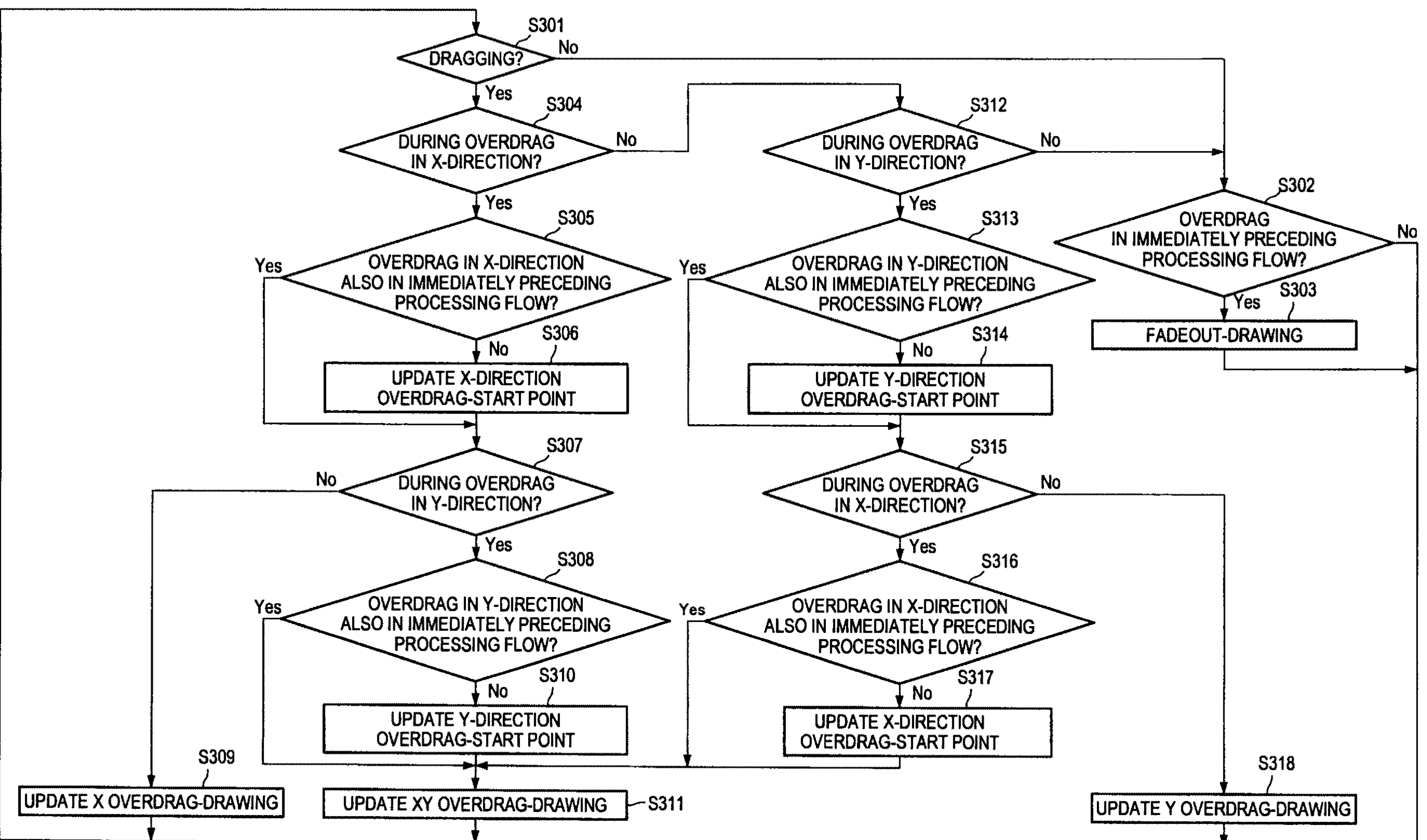
FIG.44
S301
DRAGGING?
Yes
No
S304
DURING OVERDRAG IN X-DIRECTION?
S305
OVERDRAG IN X-DIRECTION ALSO IN IMMEDIATELY PRECEDING PROCESSING FLOW?
S306
UPDATE X-DIRECTION OVERDRAG-START POINT
S307
DURING OVERDRAG IN Y-DIRECTION?
S308
OVERDRAG IN Y-DIRECTION ALSO IN IMMEDIATELY PRECEDING PROCESSING FLOW?
S310
UPDATE Y-DIRECTION OVERDRAG-START POINT
S309
UPDATE X OVERDRAG-DRAWING
UPDATE XY OVERDRAG-DRAWING
S311
S312
DURING OVERDRAG IN Y-DIRECTION?
S313
OVERDRAG IN Y-DIRECTION ALSO IN IMMEDIATELY PRECEDING PROCESSING FLOW?
S314
UPDATE Y-DIRECTION OVERDRAG-START POINT
S315
DURING OVERDRAG IN X-DIRECTION?
S316
OVERDRAG IN X-DIRECTION ALSO IN IMMEDIATELY PRECEDING PROCESSING FLOW?
S317
UPDATE X-DIRECTION OVERDRAG-START POINT
S302
OVERDRAG IN IMMEDIATELY PRECEDING PROCESSING FLOW?
S303
FADEOUT-DRAWING
S318
UPDATE Y OVERDRAG-DRAWING

INFORMATION PROCESSING APPARATUS, METHOD, AND PROGRAM FOR DISPLAYING AN IMAGE DURING OVERDRAG

CROSS-REFERENCE TO PRIOR APPLICATION

This application is a continuation of U.S. patent application Ser. No. 15/403,665 (filed on Jan. 11, 2017), which is a continuation of U.S. patent application Ser. No. 13/242,129 (filed on Sep. 23, 2011 and issued as U.S. Pat. No. 9,619,135 on Apr. 11, 2017), which claims priority to Japanese Patent Application No. 2010-228303 (filed on Oct. 8, 2010), which are all hereby incorporated by reference in their entirety.

BACKGROUND

The present disclosure relates to an information processing apparatus, an information processing method, and a program.

In recent years, a touch panel which can detect contact with an operating object has been in widespread use. Since such a touch panel can detect a position at which the operating object comes into contact, a user can perceive the position at which the operating object comes into contact (for example, refer to JP 2010-157189A).

Further, a touch panel which can detect proximity of the operating object thereto has also been in widespread use. Since such a touch panel can detect a position to which the operating object comes close, the user can grasp the position to which the operating object comes close.

SUMMARY

However, in the case where the above-mentioned general touch panel was used, there was an issue that it was difficult to grasp, in a stage in which an operation of moving a display object is performed, how far the display object can be moved.

In light of the foregoing, it is desirable to provide a novel and improved technology which is capable of allowing the user to grasp, in the stage in which the operation of moving the display object is performed, how far the display object can be moved.

Accordingly, there is provided a method for modifying an image. The method comprises displaying an image, the image comprising a portion of an object; and determining if an edge of the object is in a location within the portion. The method further comprises detecting movement, in a member direction, of an operating member with respect to the edge. The method still further comprises moving, if the edge is not in the location, the object in an object direction corresponding to the detected movement; and modifying, if the edge is in the location, the image in response to the detected movement, the modified image comprising the edge in the location.

In a second aspect, there is provided a non-transitory computer-readable medium storing instructions which, when executed by a computer, perform a method of modifying an image. The method comprises displaying an image, the image comprising a portion of an object; and determining if an edge of the object is in a location within the portion. The method further comprises detecting movement, in a member direction, of an operating member with respect to the edge. The method still further comprises moving, if the edge is not in the location, the object in an object direction corresponding to the detected movement; and modifying, if the edge is in the location, the image in response to the detected movement, the modified image comprising the edge in the location.

In a third aspect, there is provided an apparatus for modifying an image, comprising a memory and a processor executing instructions stored in the memory. The processor executes instructions stored in the memory to display an image, the image comprising a portion of an object; and determine if an edge of the object is in a location within the portion. The processor further executes instructions stored in the memory to detect movement, in a member direction, of an operating member with respect to the edge. The processor still further executes instructions stored in the memory to move, if the edge is not in the location, the object in an object direction corresponding to the detected movement; and modify, if the edge is in the location, the image in response to the detected movement, the modified image comprising the edge in the location.

BRIEF DESCRIPTION OF THE DRAWINGS

FIG. 44 is a flowchart showing a flow of an operation (when the display object can be moved in the X-axis direction and in the Y-axis direction) performed by the information processing apparatus according to the embodiment in the case where the drag operation is performed.

DETAILED DESCRIPTION OF THE EMBODIMENT(S)

Figure 1:
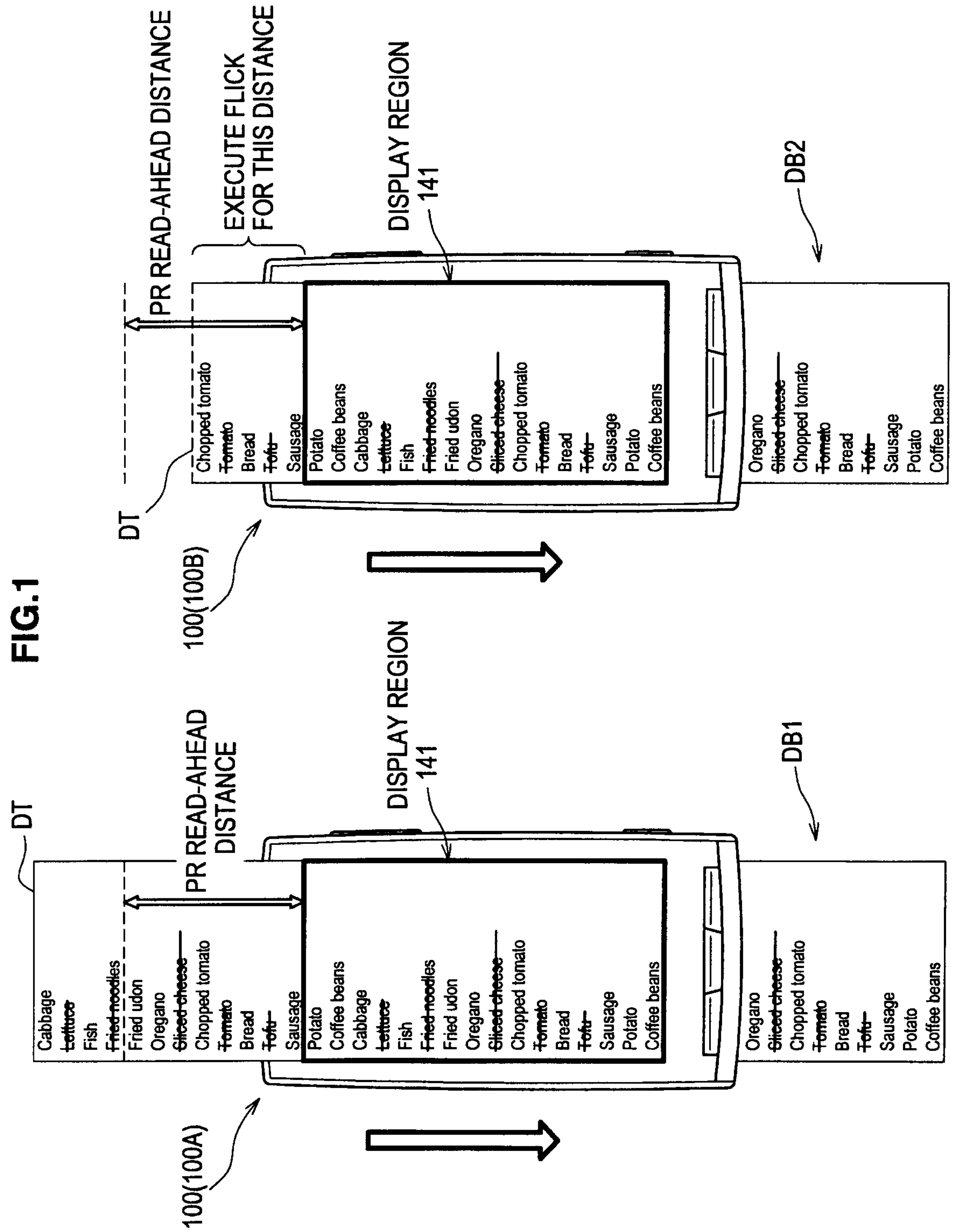
FIG. 1 is a diagram illustrating an outline of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the "detailed description of the embodiments" will be described in the order shown below.

1. Embodiment
1-1. Outline of information processing apparatus
1-2. Case where edge of display object does not reach display region at end of flick
1-3. Case where edge of display object reaches display region at end of flick
1-4. Functional configuration of information processing apparatus
1-5. Hardware configuration of information processing apparatus
1-6. Operation in case where flick operation is performed
1-7. Screen displayed by operation at stage in which edge of display object reaches display region
1-8. Disabling operation at stage in which edge of display object reaches display region
1-9. Direction of operation at stage in which edge of display object reaches display region
1-10. Case of hiding displayed predetermined display
1-11. Operation performed in case where drag operation is performed
1-12. Screen displayed by operation at stage in which edge of display object reaches display region
1-13. Screen displayed by operation at stage before edge of display object reaches display region
1-14. Screen displayed when display object is small
1-15. Screen displayed by operation before edge of display object reaches display region and after edge of display object reached display region
1-16. Screen displayed by operation after edge of display object reached display region
1-17. Another example of case where edge of display object reaches display region at end of flick
1-18. Operation in case where drag operation (in X- and Y-axis directions) is performed
2. Modified example
3. Summary <1. Embodiment>

[1-1. Outline of Information Processing Apparatus]

FIG. 1 is a diagram illustrating an outline of an information processing apparatus according to an embodiment of the present disclosure. As shown in FIG. 1, an information processing apparatus 100A according to the embodiment of the present disclosure includes a display region 141. On the display region 141, a part of a display object DB1 is displayed by the information processing apparatus 100A. Further, an information processing apparatus 100B according to the embodiment of the present disclosure displays a part (i.e., a portion) of a display object DB2 on the display region 141.

Here, the display objects such as the display object DB1 and the display object DB2 each have an edge DT, and let us assume that the edge DT represents the upper edge of each display object. In this case, when a user scrolls the display object in the downward direction, the edge DT eventually reaches the upper edge (i.e., a location) of the display region 141. After the edge DT reached the upper edge of the display region 141, the display object cannot be scrolled in the downward direction any farther.

The embodiment of the present disclosure enables the user to grasp, in the stage in which the operation of moving the display object is performed, how far the display object can be moved. In order to realize such a function, in the case of scrolling the display object in the downward direction for example, the information processing apparatus 100 according to the embodiment of the present disclosure reads a display area at a position proceeded a read-ahead distance PR in the upward direction from the upper edge of the display region 141. For example, in the case of the display object DB1 displayed by the information processing apparatus 100A on the display region 141, in which the position obtained by proceeding the read-ahead distance PR in the upward direction from the upper edge of the display region 141 is below the edge DT (upper edge) of the display object DB1, the information processing apparatus 100A may not notify the user that the edge DT nearly reaches the display region 141, because there is still some time for the edge DT (upper edge) to reach the upper edge of the display region 141.

On the other hand, for example, in the case of the display object DB2 displayed by the information processing apparatus 100I on the display region 141, in which the position obtained by proceeding the read-ahead distance PR in the upward direction from the upper edge of the display region 141 is above the edge DT (upper edge) of the display object DB2, the information processing apparatus 100B notifies the user that the edge DT nearly reaches the display region 141, because the edge DT (upper edge) reaches the upper edge of the display region 141 after a short time.

Note that, for an operation for causing the display object to be scrolled, there are assumed a flick operation, a drag operation, and the like to a position detection device such as a touch panel, but it is not particularly limited as to what kind of operation is performed to what hardware. It is necessary that the operation for scrolling the display object be at least an operation that a device can recognize the direction in which the display object is to be moved. Further, in the embodiment of the present disclosure, the operation of moving the display object is performed by the flick operation or the drag operation using an operating object OP (i.e., an operating member). Further, it goes without saying that the direction in which the display object is scrolled is not limited to the downward direction and may be the upward direction, the left direction, or the right direction.

[1-2. Case where Edge of Display Object does not Reach Display Region at End of Flick]

Figure 2:
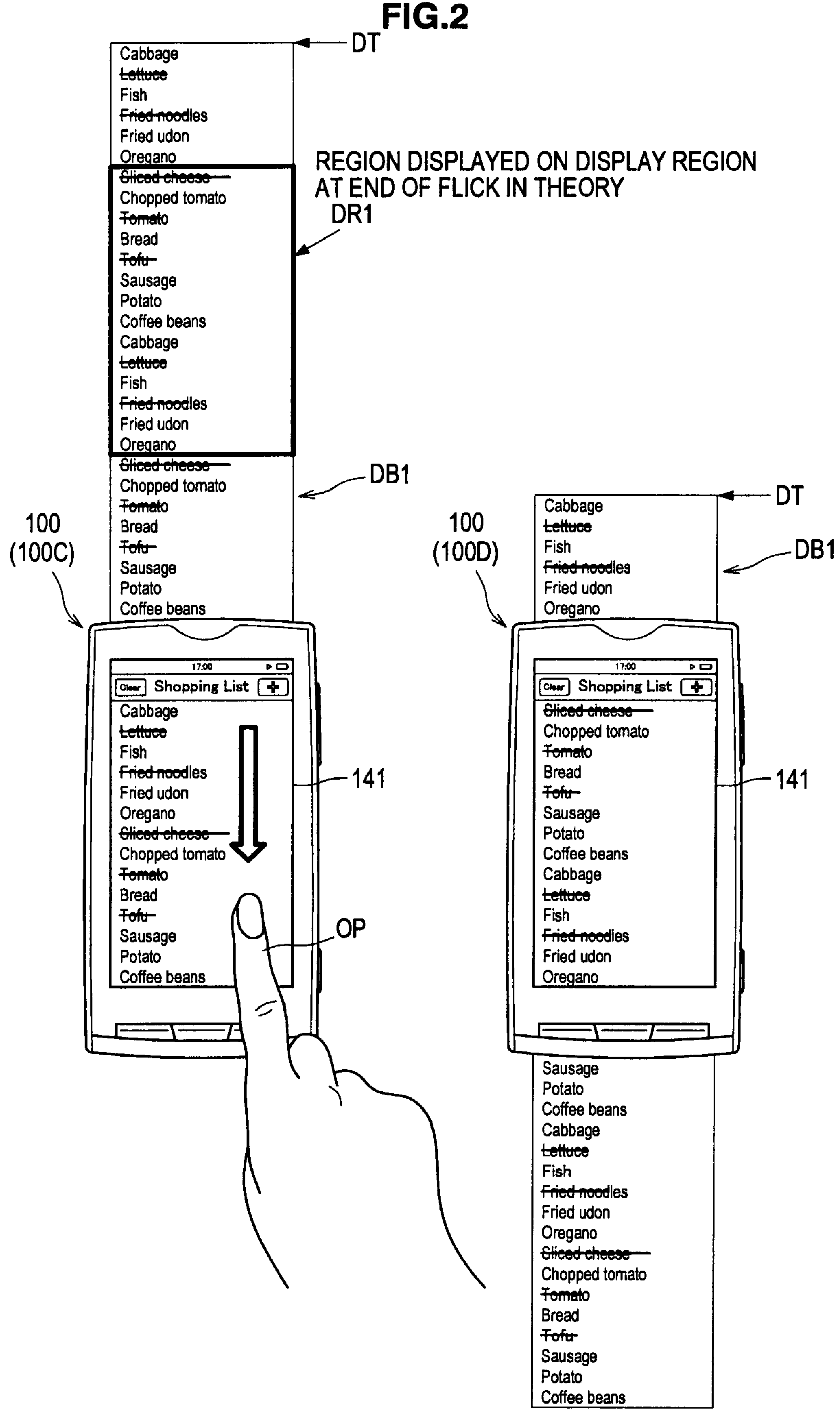
FIG. 2 is a diagram illustrating an operation of the information processing apparatus according to the embodiment in a case where an edge of a display object does not reach a display region at the end of a flick.

FIG. 2 is a diagram illustrating an operation of the information processing apparatus 100 according to the embodiment of the present disclosure in a case where the edge of the display object does not reach the display region at the end of the flick. As shown in FIG. 2, an information processing apparatus 100C causes a part of the display object DB1 to be displayed on the display region 141. When the flick operation in the downward direction is performed by the operating object OP in this state, it is assumed that the following corresponds to a region DR1 that is displayed on the display region 141 at the end of the flick operation in theory: a region within the display object DB1 obtained by proceeding the distance corresponding to the intensity (i.e., velocity) of the flick operation from the region displayed on the display region 141 in the upward direction of the display object DB1.

As shown in FIG. 2, at the end of the flick, an information processing apparatus 100D causes the region DR1 that is displayed on the display region 141 to be displayed at the end of the flick in theory. In such a case, since the edge DT (upper edge) of the display object DB1 does not reach the upper edge of the display region 141, the movement of the display object DB1 by the flick operation is performed at a first acceleration, in a usual manner.

[1-3. Case where Edge of Display Object Reaches Display Region at End of Flick]

Figure 3:
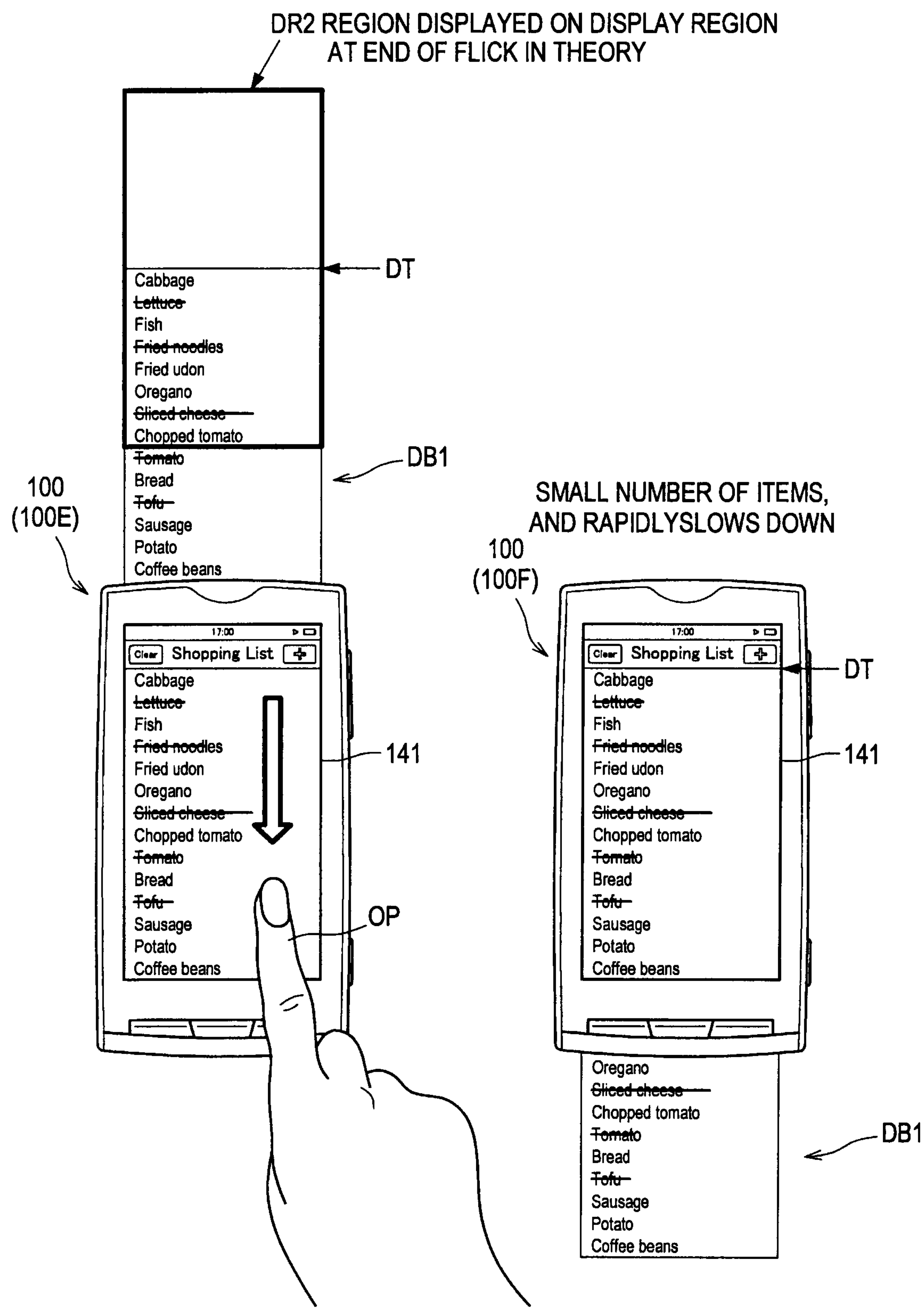
FIG. 3 is a diagram illustrating an operation of the information processing apparatus according to the embodiment in a case where the edge of the display object reaches the display region at the end of the flick.

FIG. 3 is a diagram illustrating an operation of the information processing apparatus 100 according to the embodiment of the present disclosure in a case where the edge of the display object reaches the display region at the end of the flick. As shown in FIG. 3, an information processing apparatus 100E causes a part of the display object DB1 to be displayed on the display region 141. When the flick operation in the downward direction is performed by the operating object OP in this state, it is assumed that the following corresponds to a region DR2 that is displayed on the display region 141 at the end of the flick in theory: a region within the display object DB1 obtained by proceeding the distance corresponding to the intensity of the flick operation from the region displayed on the display region 141 in the upward direction of the display object DB1.

As shown in FIG. 3, at the end of the flick, although an information processing apparatus 100F attempts to cause the region DR2 to be displayed on the display region 141, which is to be displayed on the display region 141 at the end of the flick in theory, the information processing apparatus 100F cannot cause the region DR2 to be displayed, because the edge DT (upper edge) of the display object DB1 reaches the edge (upper edge) of the display region 141. In such a case, the movement of the display object DB1 is performed by reducing the movement velocity, for example, by rapidly slowing down the movement of the display object DB1 at a second acceleration.

[1-4. Functional Configuration of Information Processing Apparatus]

Figure 4:
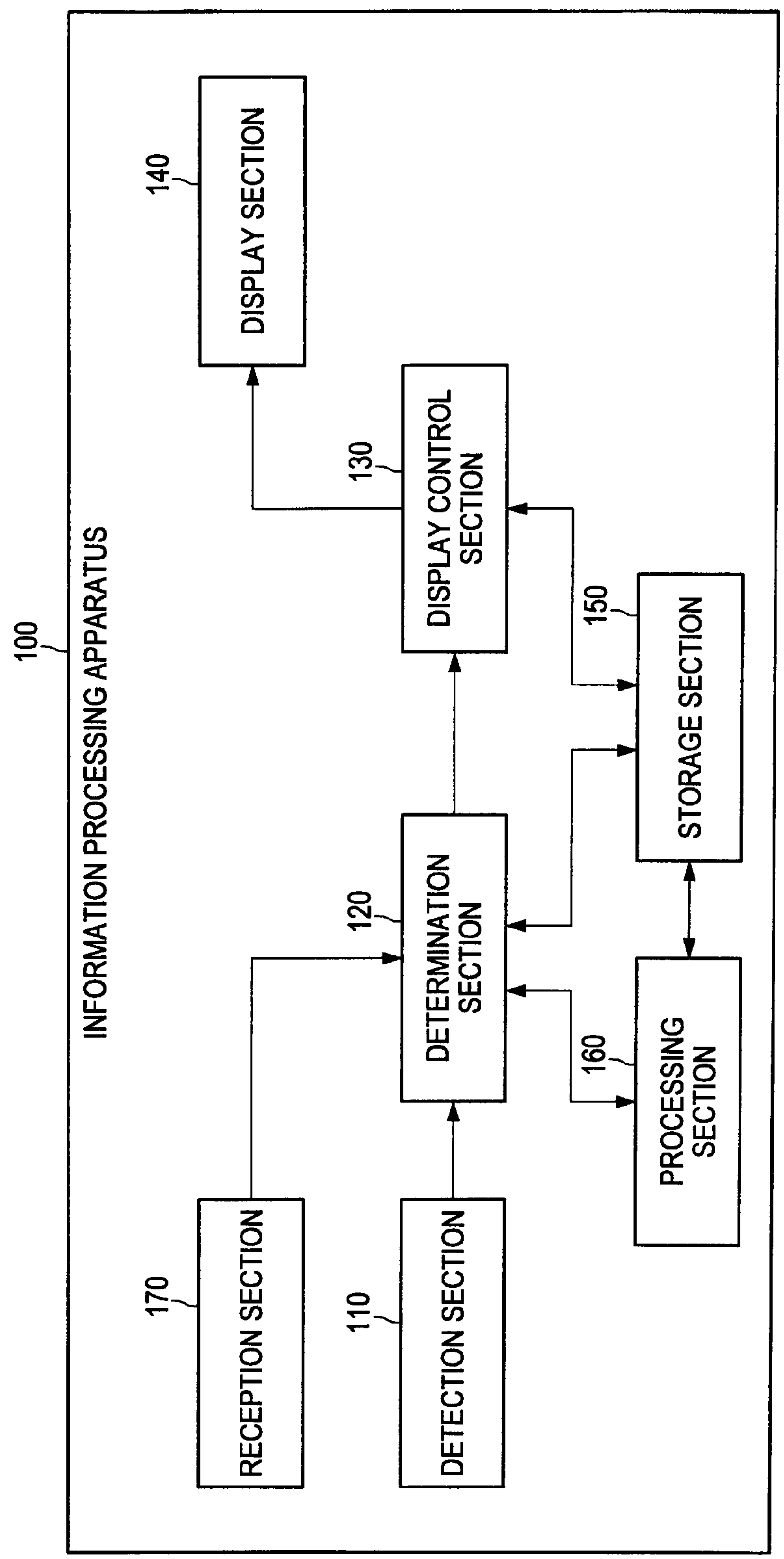
FIG. 4 is a diagram showing a functional configuration of the information processing apparatus according to the embodiment.

FIG. 4 is a diagram showing a functional configuration of the information processing apparatus according to the embodiment of the present disclosure. The information processing apparatus 100 according to the embodiment of the present disclosure includes at least a detection section 110, a determination section 120, and a display control section 130.

The detection section 110 includes a position detection device 210, and has a function of detecting a movement operation to the display object performed by the operating object OP. As described above, for example, the detection section 110 can detect the flick operation and the drag operation performed by the operating object OP as the movement operation to the display object performed by the operating object OP. However, the movement operation performed by the operating object OP is not limited thereto, and the movement operation may be an input to an input device such as an arrow key or a joystick.

The determination section 120 has a function of determining, in the case where the display object is moved a predetermined distance in a movement direction (i.e., an object direction) based on the movement operation detected by the detection section 110, whether the edge DT of the display object reaches the display region 141. In the case where the movement operation detected by the detection section 110 has a component in a predetermined direction (i.e., a member direction) the determination section 120 adopts the predetermined direction as the movement direction. For example, in the case where the movement operation is performed in an obliquely downward direction, the determination section 120 recognizes the movement direction based on the movement operation as the downward direction, and determines the case of moving the display object a predetermined distance in the downward direction.

The predetermined distance representing the distance which the display object is moved can be decided in advance, for example. In the example described above, for example, in the example shown in FIG. 2, it is determined by the determination section 120 that, in the case where the display object DB1 is caused to be moved a predetermined distance in the movement direction (downward direction) based on the movement operation, the edge DT of the display object does not reach the display region 141. Further, for example, in the example shown in FIG. 3, it is determined by the determination section 120 that, in the case where the display object DB1 is caused to be moved a predetermined distance in the movement direction (for example, downward direction) based on the movement operation, the edge DT of the display object reaches the display region 141.

As shown in FIG. 2, the display control section 130 has a function of performing control such that the display object is moved in the movement direction (for example, downward direction). At the same time, when it is determined by the determination section 120 that, in the case where the display object is caused to be moved a predetermined distance in the movement direction, the edge DT (for example, upper edge) of the display object reaches the display region 141, the display control section 130 has a function of performing control such that a predetermined first display is shown on the display region 141. As for the predetermined first display, there are assumed various displays, which will be described in detail below.

The information processing apparatus 100 may further include a storage section 150. The storage section 150 is configured from, for example, a storage device such as a non-volatile memory. The storage section 150 has a function of storing a program for realizing the determination section 120, the display control section 130, a processing section 160, or the like, and a function of storing various types of data used when the program is executed, and the like. Further, the storage section 150 can store various thresholds and the like.

The information processing apparatus 100 may further include a display section 140. The display section 140 is configured from, for example, a display device. The display section 140 includes the display region 141, and has a function of displaying the display object on the display region 141 based on the control of the display control section 130. In the example described with reference to FIG. 2, the display section 140 is capable of displaying a part of the display object or the like on the display region 141 based on the control of the display control section 130.

The storage section 150 stores information about the edge DT of the display object, for example. The information about the edge DT of the display object represents information about distance from the edge DT of the display object to each display position on the display object, for example. The determination section 120 can determine whether the edge DT of the display object reaches the display region 141, based on the information about the edge DT of the display object, a position of a display area currently being displayed on the display object, the movement direction, and the predetermined distance, for example.

Further, the storage section 150 may store the display object. In that case, the determination section 120 can acquire a display area of a position obtained by going back the predetermined distance in a direction opposite to the movement direction on the basis of a position of a display area currently being displayed on the display object, from the display object stored in the storage section 150. The determination section 120 can determine whether the edge DT of the display object reaches the display region 141 based on the acquired display area. In the display area, there is set information about a distance from the edge DT of the display object to the display area on the display object, because whether the edge DT of the display object reaches the display region 141 can be determined based on the information about the distance.

The information processing apparatus 100 may further include the processing section 160. The processing section 160 can execute processing corresponding to an item selected by the operating object OP, for example.

The information processing apparatus 100 may include a reception section 170. The reception section 170 has a function of receiving information about the edge DT of the display object, for example. In that case, the determination section 120 can determine whether the edge DT of the display object reaches the display region 141, based on the information about the edge DT of the display object, a position of a display area currently being displayed on the display object, the movement direction, and the predetermined distance. The information about the edge DT of the display object can be received from a predetermined server via a network, for example.

The reception section 170 may receive a display area of a position obtained by going back the predetermined distance in a direction opposite to the movement direction on the basis of a position of a display area currently being displayed on the display object. In that case, the determination section 120 can determine whether the edge DT of the display object reaches the display region 141 based on the display area received by the reception section 170. The display area can also be received from a predetermined server via a network, for example.

Further, as described with reference to FIG. 3, in the case where the edge of the display object reaches the display region at the end of a flick, the movement of the display object is performed by reducing the movement velocity, for example, by rapidly slowing down the movement of the display object. To be more specific, first, the determination section 120 further determines whether the movement operation detected by the detection section 110 is the flick operation. In the case of determining that the movement operation is the flick operation, the determination section 120 further determines whether the edge DT of the display object passes through the edge of the display region 141 corresponding to the edge DT of the display object by the movement of the display object caused by the flick operation.

In the case where the determination section 120 determines that the edge DT of the display object passes through the edge of the display region 141 corresponding to the edge DT of the display object by the movement of the display object caused by the flick operation, the display control section 130 sets a larger deceleration coefficient associated with the movement of the display object than in the case where it is determined that the edge DT of the display object does not pass through the edge of the display region 141 corresponding to the edge DT of the display object by the movement of the display object caused by the flick operation.

The determination section 120, the display control section 130, the processing section 160, and the like are configured from, for example, a CPU (Central Processing Unit) and a RAM (Random Access Memory), and the functions thereof are realized by developing in the RAM a program stored in the storage section 150 and executing the developed program by the CPU. However, it is not limited to such a configuration, and the display control section 130 and the processing section 160 may be configured from a dedicated hardware.

[1-5. Hardware Configuration of Information Processing Apparatus]

Figure 5:
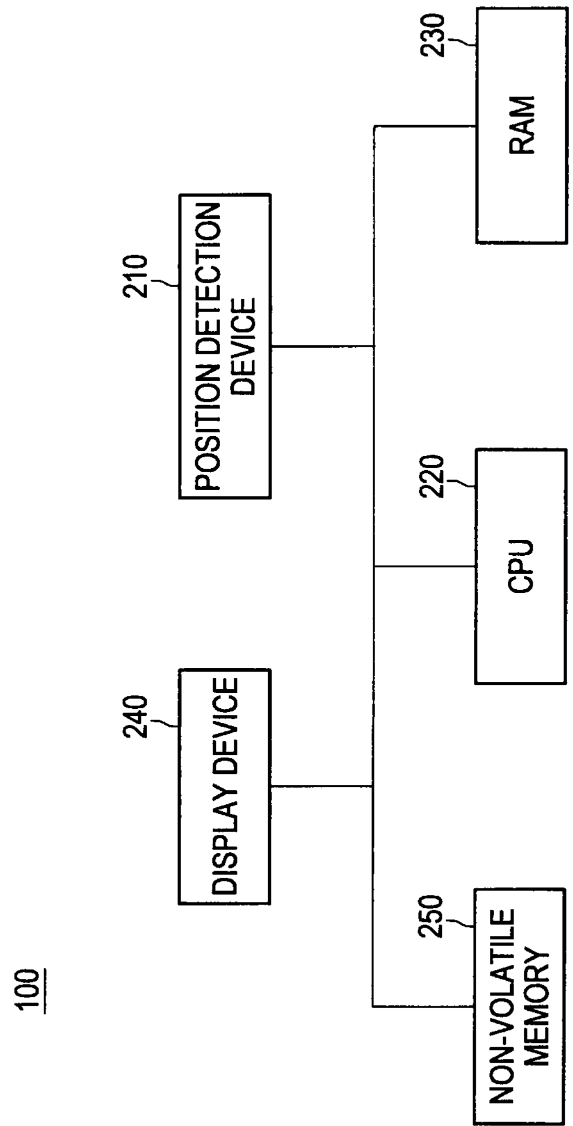
FIG. 5 is a hardware configuration diagram of the information processing apparatus according to the embodiment.

FIG. 5 is a hardware configuration diagram of the information processing apparatus according to the embodiment of the present disclosure. As shown in FIG. 5, the information processing apparatus 100 according to the embodiment of the present disclosure includes the position detection device 210, a CPU 220, a RAM 230, a display device 240, and a non-volatile memory 250.

The position detection device 210 has a position detection plane, and has a function of detecting proximity coordinates or contact coordinates of the operating object OP to the position detection plane. As the position detection device 210, a capacitive touch panel can be used, for example. In addition, an optical touch panel can be used as the position detection device 210, for example. In addition, a USB (Universal Serial Bus) camera can be used as the position detection device 210, for example.

The CPU 220 functions as an arithmetic processing unit and a control unit and controls the overall operation inside the information processing apparatus 100 or a portion thereof according to various programs recorded in the non-volatile memory 250 or the RAM 230.

The RAM 230 stores a program used by the CPU 220, a parameter that appropriately changes during execution thereof, and the like.

The display device 240 is configured from a device capable of visually notifying the user of information, such as an LCD (Liquid Crystal Display) and an organic EL (Electroluminescence) display device. The display device 240 outputs results obtained by various processes performed by the information processing apparatus 100. To be specific, the display device 240 displays the results obtained by various processes performed by the information processing apparatus 100 on the display region 141 in text or image form. Further, the display device 240 may be provided to the information processing apparatus 100, or may be provided outside the information processing apparatus 100.

The non-volatile memory 250 is a device for storing data, and includes, for example, a magnetic storage device such as an HDD (Hard Disk Drive), a semiconductor storage device, an optical storage device, or a magneto-optical storage device. The non-volatile memory 250 stores programs executed by the CPU 220 and various kinds of data.

Heretofore, there has been shown an example of the hardware configuration capable of realizing the functions of the information processing apparatus 100 according to the embodiment of the present disclosure. Each of the structural elements described above may be configured using a general-purpose material, or may be configured from hardware dedicated to the function of each structural element. Accordingly, the hardware configuration to be used can be changed as appropriate according to the technical level at the time of carrying out the embodiment of the present disclosure.

[1-6. Operation in Case where Flick Operation is Performed]

Figure 6:
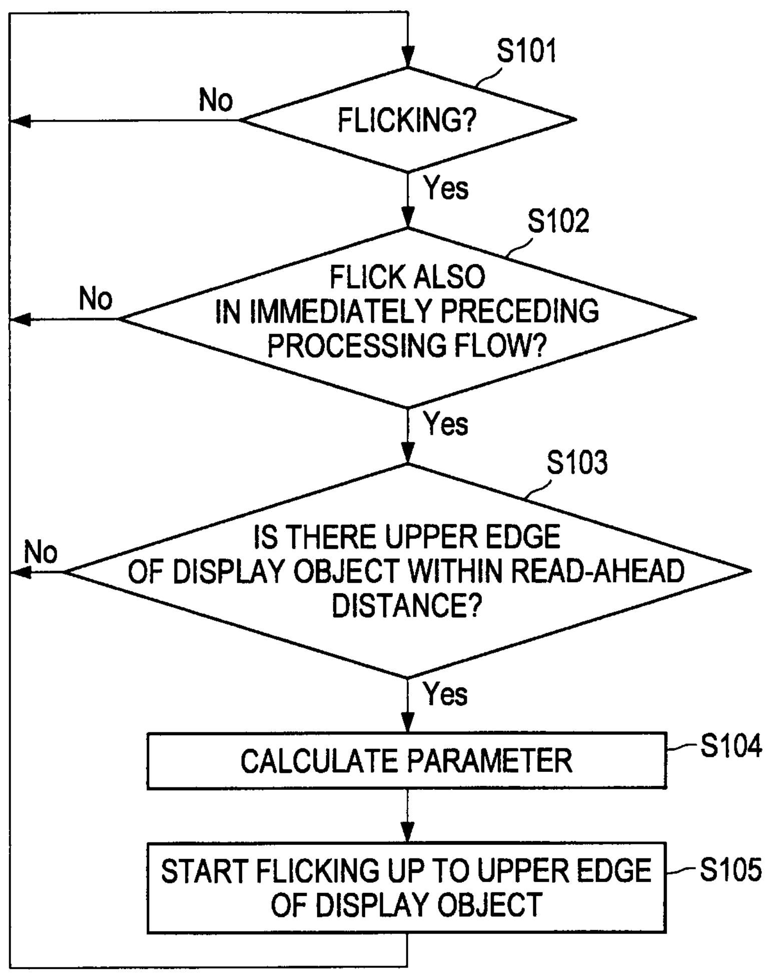
FIG. 6 is a flowchart showing a flow of an operation performed by the information processing apparatus according to the embodiment in a case where a flick operation is performed.

FIG. 6 is a flowchart showing a flow of an operation performed by the information processing apparatus 100 according to the embodiment of the present disclosure m the case where the flick operation is performed. Note that, although the example shown in FIG. 6 represents an example in which the movement direction is the downward direction, the movement direction is not particularly limited, and may be the upward direction, the left direction, or the right direction, for example.

As shown in FIG. 6, the determination section 120 determines whether the operation detected by the detection section 110 is flicking (Step S101). In the case of determining that the operation detected by the detection section 110 is not flicking ("No" in Step S101), the determination section 120 returns to Step S101. In the case of determining that the operation detected by the detection section 110 is flicking ("Yes" in Step S101), the determination section 120 determines whether the operation performed in the immediately preceding processing flow detected by the detection section 110 was the flick operation (Step S102).

In the case of determining that the operation performed in the immediately preceding processing flow detected by the detection section 110 was also the flick operation ("Yes" in Step S102), the determination section 120 determines whether there is the edge DT (upper edge) of the display object within the read-ahead distance (Step S103). In the case of determining that there is no edge DT (upper edge) of the display object within the read-ahead distance ("No" in Step S103), the determination section 120 returns to Step S101. In the case where it is determined by the determination section 120 that there is edge DT (upper edge) of the display object within the read-ahead distance ("Yes" in Step S103), the display control section 130 calculates a predetermined parameter such as the above-mentioned deceleration coefficient associated with the movement of the display object (Step S104), starts a flick process up to the upper edge of the display object (Step S105), and returns to Step S101.

[1-7. Screen Displayed by Operation at Stage in which Edge of Display Object Reaches Display Region]

Figure 7:
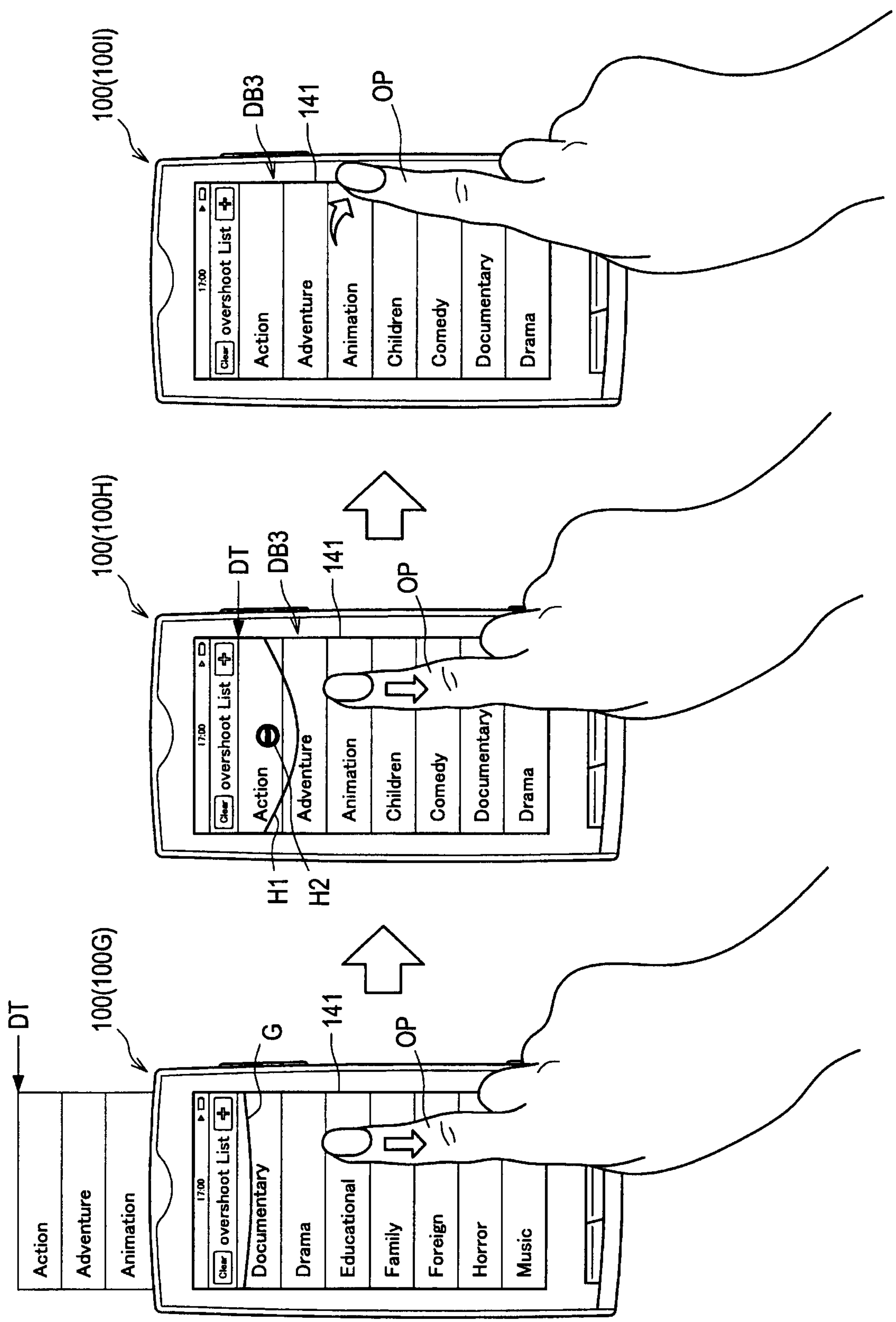
FIG. 7 is a diagram illustrating a screen example displayed by the information processing apparatus according to the embodiment in a case where it is determined that the edge of the display object reaches the display region.

FIG. 7 is a diagram illustrating a screen example displayed by the information processing apparatus 100 according to the embodiment of the present disclosure in a case where it is determined that the edge DT of the display object reaches the display region 141. As described above, when it is determined by the determination section 120 of the information processing apparatus 100G that, in the case where a display object DB3 is caused to be moved a predetermined distance in the movement direction, the edge DT (for example, upper edge) of the display object reaches the display region 141, the display control section 130 of an information processing apparatus 100G performs control such that a predetermined first display G (i.e., an image) is shown on the display region 141.

Further, in the case where the movement operation performed by the operating object OP is detected by the detection section 110 when the edge DT of the display object has already reached the display region 141, the display control section 130 of an information processing apparatus 100H performs control such that a predetermined second display (i.e., a modified image) H1, H2, which is different from the predetermined first display G, is shown on the display region 141. The state where the edge DT of the display object has already reached the display region 141 represents, for example, a state where the edge DT (upper edge) of the display object has already reached the edge (upper edge) of the display region 141 corresponding to the edge DT (upper edge) of the display object. Further, the movement operation being referred to here represents a movement operation in a direction corresponding to that in which the edge DT of the display object enters inside the display region 141.

In the case where the termination of the movement operation is detected by the detection section 110, the display control section 130 of an information processing apparatus 100I performs control such that the predetermined second display H1, H2 on the display region 141 is hidden. As for the timing at which the predetermined second display H1, H2 on the display region 141 is hidden, there are assumed various timings, which will be described below.

[1-8. Disabling Operation at Stage in which Edge of Display Object Reaches Display Region]

Figure 8:
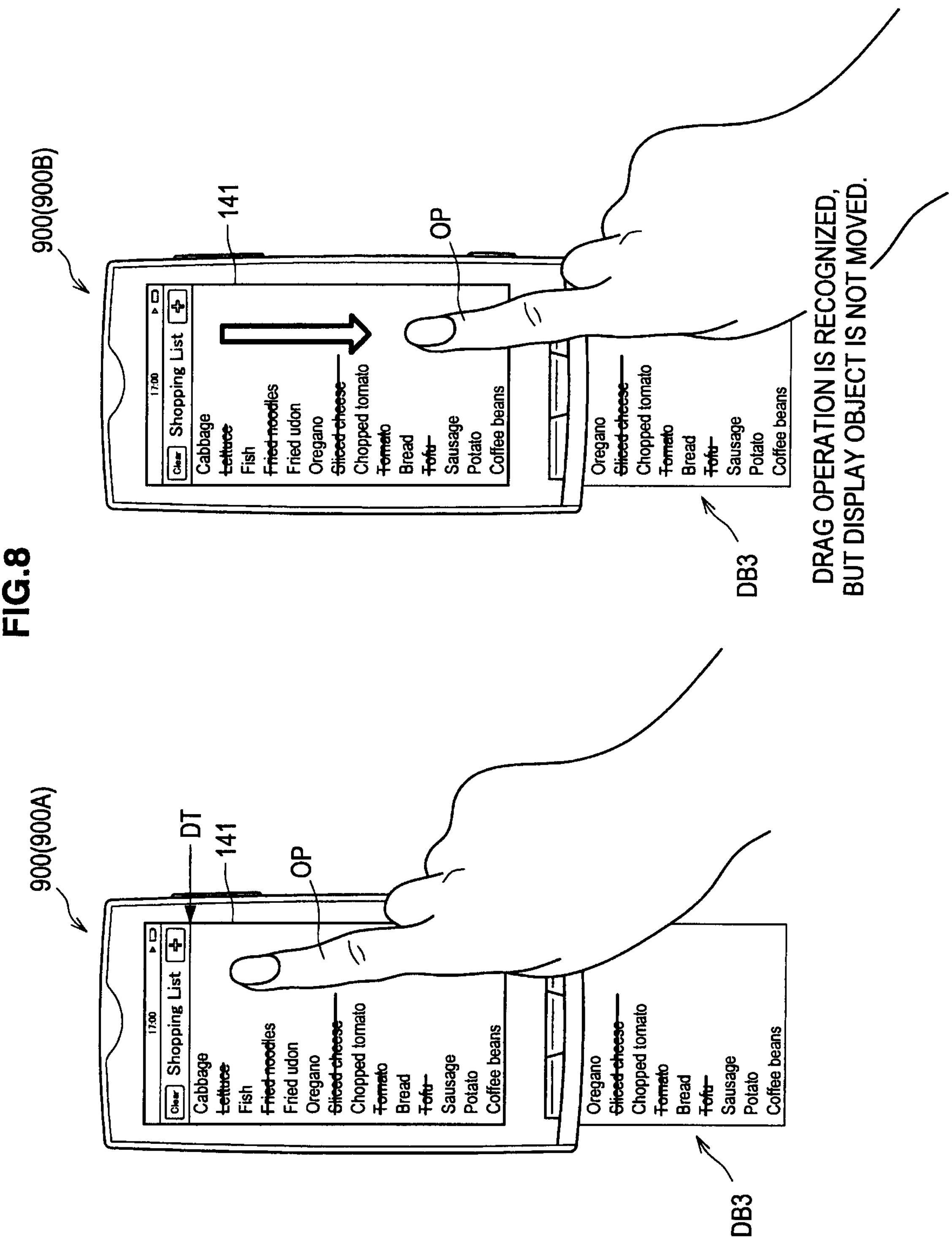
FIG. 8 is a diagram showing a screen example displayed by a general information processing apparatus in a case where a movement operation is performed at a stage in which an edge of a display object has already reached a display region.

FIG. 8 is a diagram showing a screen example displayed by a general information processing apparatus in a case where a movement operation is performed at a stage in which the edge DT of the display object has already reached the display region 141. A general information processing apparatus 900A displays a part of the display object DB3 on the display region 141, and the edge DT (upper edge) of the display object DB3 has already reached the edge (upper edge) of the display region 141. When the movement operation in the downward direction is performed in this state, for example, although an information processing apparatus 900B recognizes the movement operation, the display object DB3 cannot be moved any farther.

However, unless outputting the fact that the display object DB3 cannot be moved any farther, it is difficult for the user to grasp the reason why the movement operation in the downward direction is disabled. Accordingly, when the movement operation in a direction corresponding to that in which the edge of the display object enters inside the display region 141 is further performed in the state where the edge of the display object has already reached the edge of the display region, the information processing apparatus 100 according to the embodiment of the present disclosure performs a predetermined second display.

[1-9. Direction of Operation at Stage in which Edge of Display Object Reaches Display Region]

Figure 9:
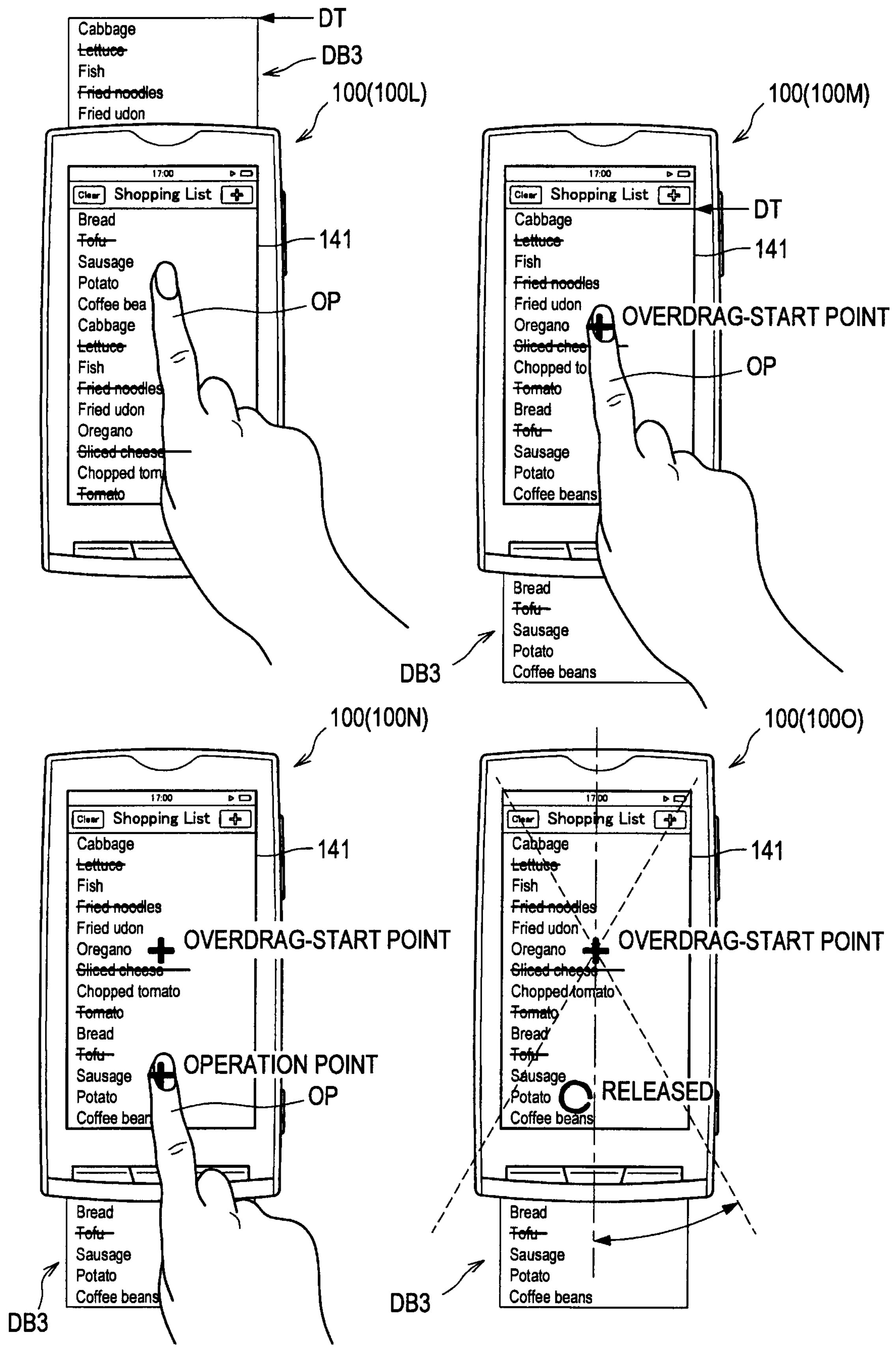
FIG. 9 is a diagram illustrating a case where the movement operation is performed at the stage in which the edge of the display object has already reached the display region.

FIG. 9 is a diagram illustrating a case where the movement operation is performed at the stage in which the edge DT of the display object has already reached the display region 141. The display control section 130 of an information processing apparatus 100L displays a part of the display object DB3 on the display region 141, and the edge DT (upper edge) of the display object DB3 has still not reached the edge (upper edge) of the display region 141 at this stage.

The display object DB3 is moved by the movement operation performed by the operating object OP, and the display control section 130 of an information processing apparatus 100M displays a part of the display object DB3 on the display region 141, and the edge DT (upper edge) of the display object DB3 reaches the edge (upper edge) of the display region 141 at this stage. Here, an operation of attempting to move the display object in a direction in which the display object cannot be moved any farther is referred to as Overdrag and an Overdrag-start point represents a position on the display object that is specified by the operating object OP at the point of starting the operation.

When the Overdrag is performed by the operating object OP, the display control section 130 of an information processing apparatus 100N displays the display object DB3 on the display region 141 at the same position as the position at which the display control section 130 of the information processing apparatus 100M displayed the display object DB83 on the display region 141. This is because the display object DB3 cannot be moved any farther. Here, a position on the display object that is specified by the operating object OP at the end of the Overdrag is referred to as operation point.

The display control section 130 of an information processing apparatus 100O also displays the display object DB3 on the display region 141 at the same position as the position at which the display control section 130 of the information processing apparatus 100M displayed the display object DB3 on the display region 141. In the case of detecting that the operating object OP is moved away from the position detection plane, the display control section 130 of the information processing apparatus 100O can perform control such that the predetermined second display is hidden.

[1-10. Case of Hiding Displayed Predetermined Display]

Figure 10:
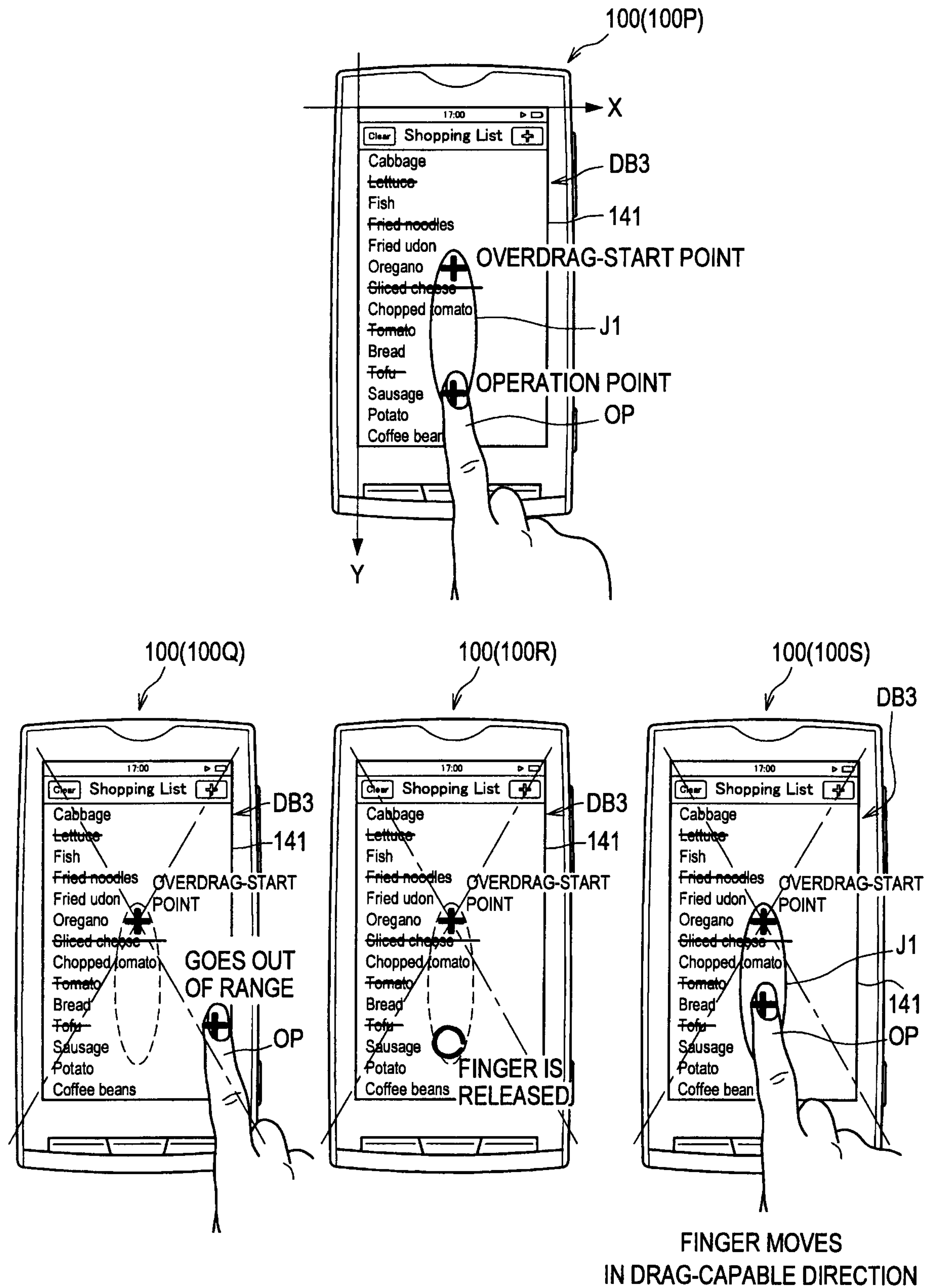
FIG. 10 is a diagram illustrating a case where a predetermined display is shown and a case where a predetermined display is hidden by the information processing apparatus according to the embodiment in the case where the movement operation is performed at the stage in which the edge of the display object has already reached the display region.

FIG. 10 is a diagram illustrating a case where the predetermined second display is shown and a case where the predetermined second display is hidden by the information processing apparatus 100 according to the embodiment of the present disclosure in the case where the movement operation is performed at the stage in which the edge DT of the display object has already reached the display region 141. The display control section 130 of an information processing apparatus 100P displays a part of the display object DB3 on the display region 141, and, since the edge DT (upper edge) of the display object DB3 has already reached the edge (upper edge) of the display region 141 at this stage, performs control such that a predetermined second display J1 is shown on the display region 141.

In the case where, while the movement operation is being performed, the operating object OP is positioned in a range exceeding a predetermined angle with respect to the movement direction on the basis of the Overdrag-start point detected by the detection section 110, the display control section 130 of an information processing apparatus 100Q can perform control such that the predetermined second display J1 on the display region 141 is hidden. The case where the operating object OP is positioned in the range exceeding the predetermined angle with respect to the movement direction on the basis of the Overdrag-start point detected by the detection section 110 represents a case where an angle between the direction from the Overdrag-start point to the operation point and the movement direction exceeds the predetermined angle.

Further, as described above, in the case of detecting that the operating object OP is moved away from the position detection plane, the display control section 130 of an information processing apparatus 100R can perform control such that the predetermined second display is hidden. In the case where, while the movement operation is being performed, the operating object OP is positioned in a range that does not exceed the predetermined angle with respect to the movement direction on the basis of the Overdrag-start point detected by the detection section 110, the display control section 130 of an information processing apparatus 100S can perform control such that the predetermined second display J1 is shown on the display region 141.

[1-11. Operation Performed in Case where Drag Operation is Performed]

Figure 11:
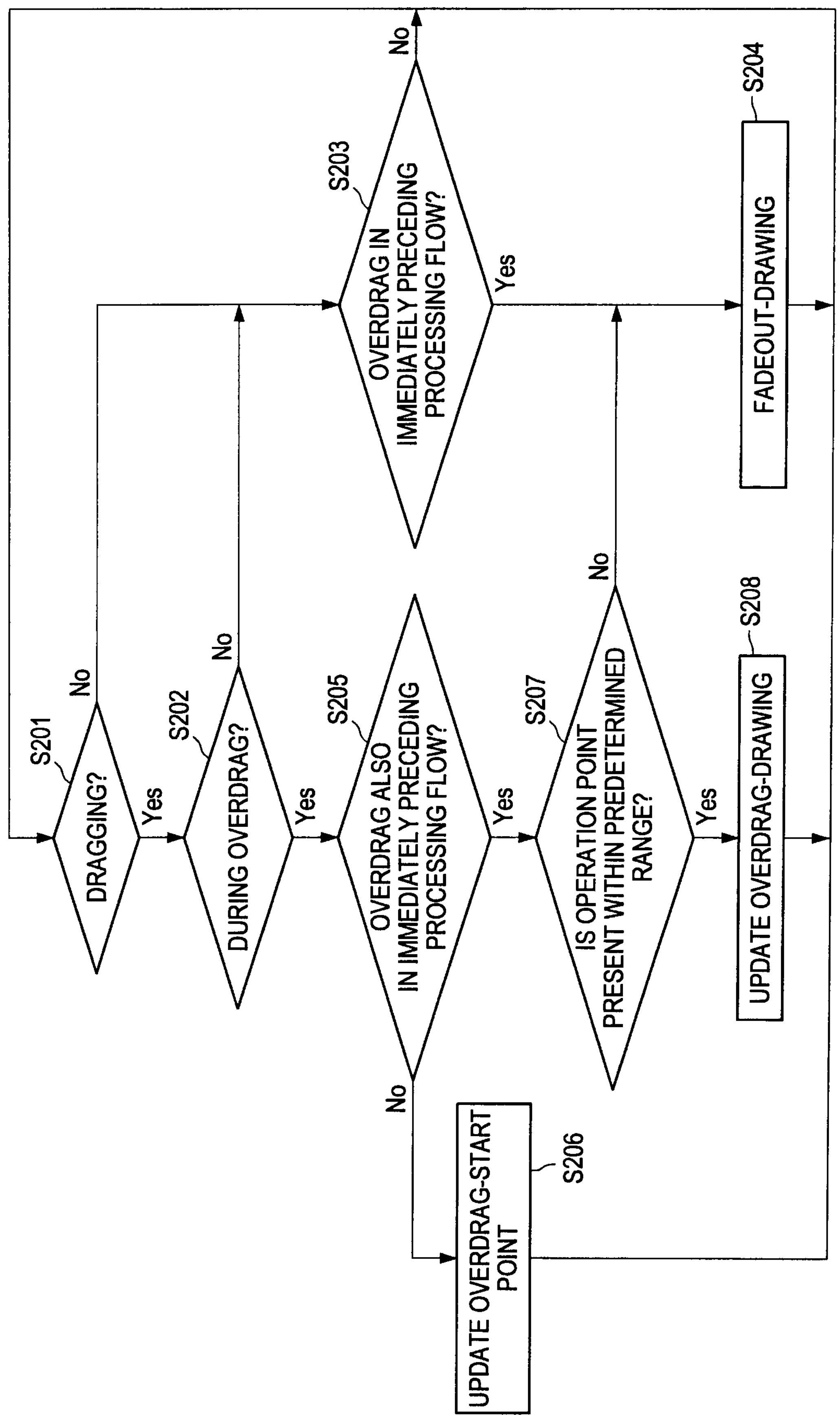
FIG. 11 is a flowchart showing a flow of an operation performed by the information processing apparatus according to the embodiment in a case where a drag operation is performed.
Figure 12:
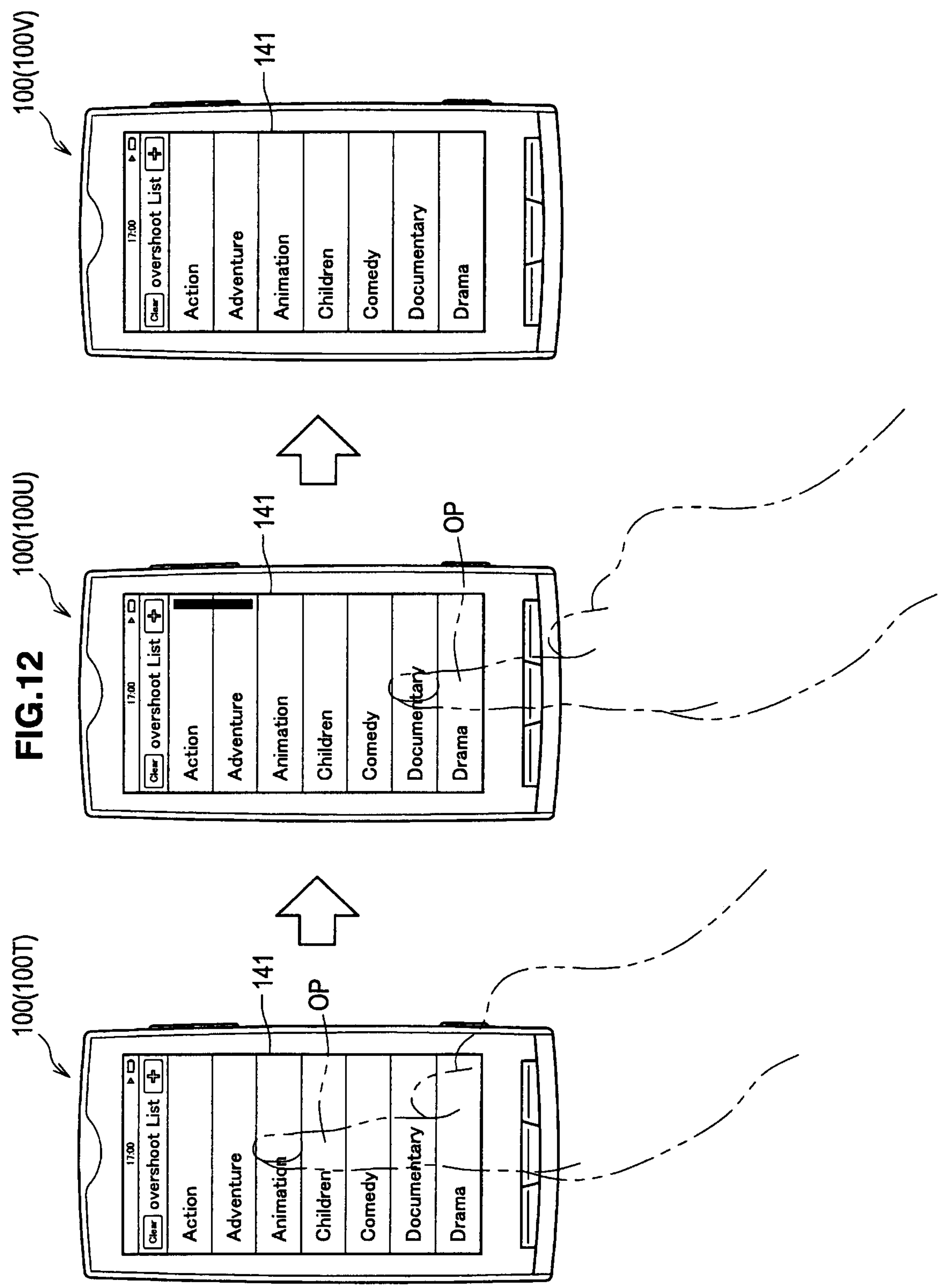
FIG. 12 is a diagram showing a screen example displayed by the information processing apparatus according to the embodiment in the case where the movement operation is performed at the stage in which the edge of the display object has already reached the display region.
Figure 13:
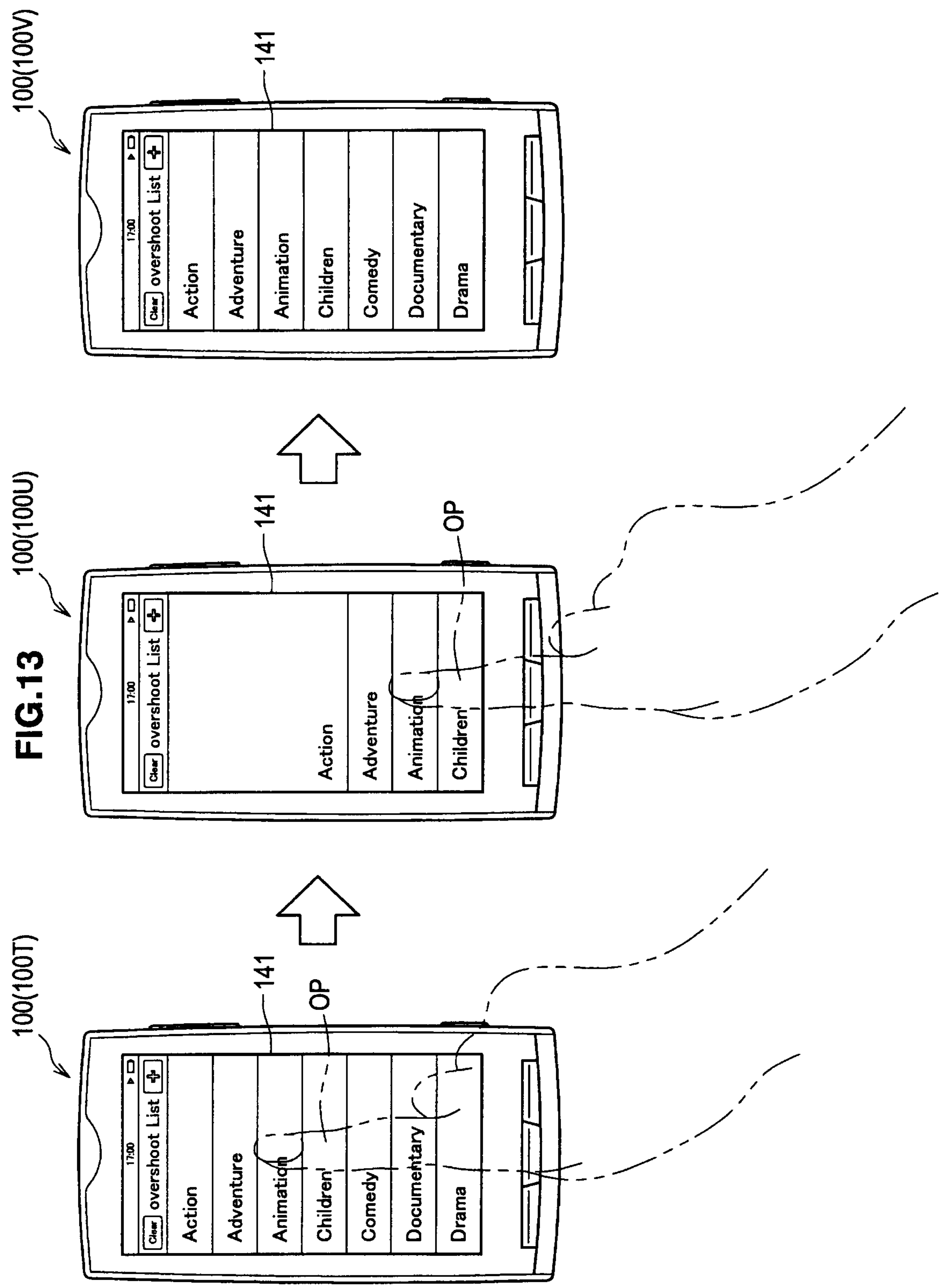
FIG. 13 is a diagram showing a screen example displayed by the information processing apparatus according to the embodiment in the case where the movement operation is performed at the stage in which the edge of the display object has already reached the display region.
Figure 14:
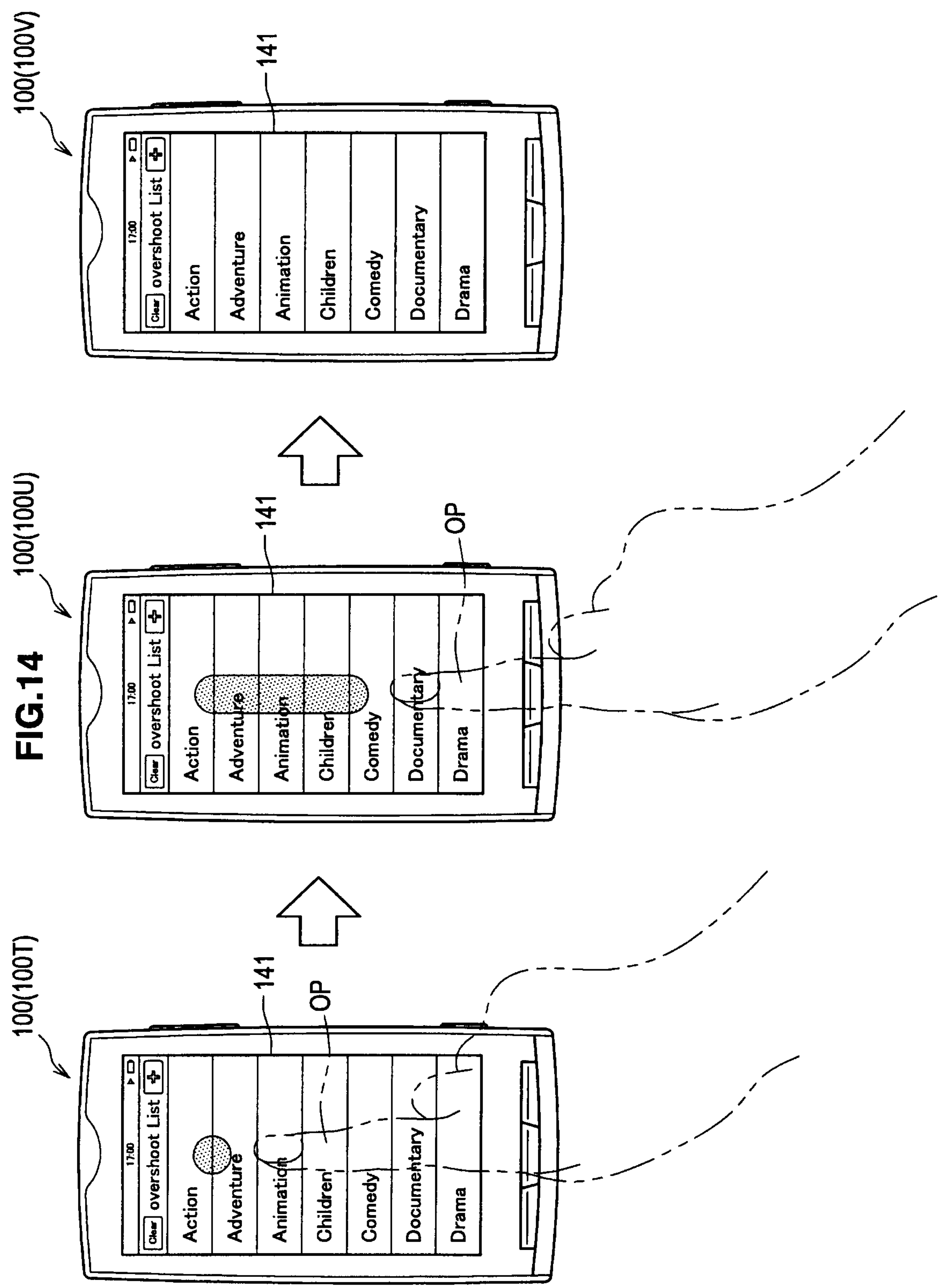
FIG. 14 is a diagram showing a screen example displayed by the information processing apparatus according to the embodiment in the case where the movement operation is performed at the stage in which the edge of the display object has already reached the display region.
Figure 15:
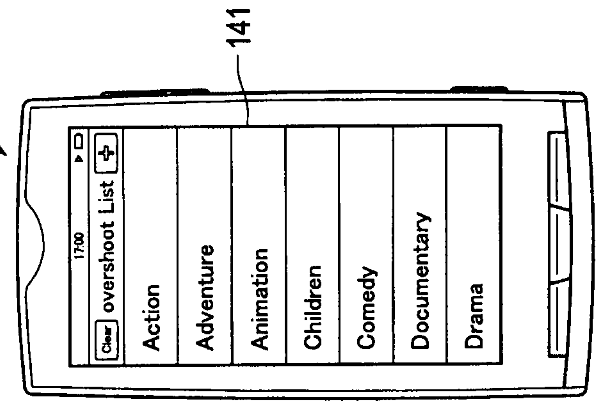
FIG. 15 is a diagram showing a screen example displayed by the information processing apparatus according to the embodiment in the case where the movement operation is performed at the stage in which the edge of the display object has already reached the display region.
Figure 15:
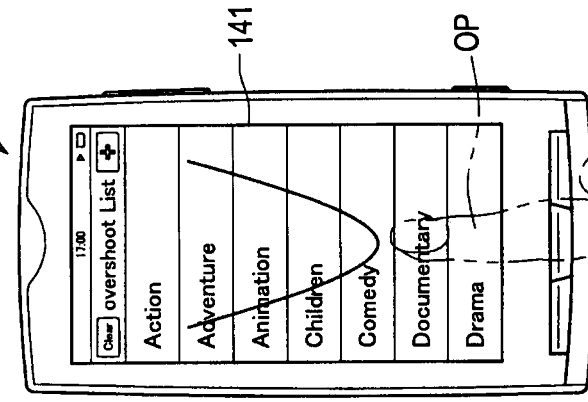
Figure 15:
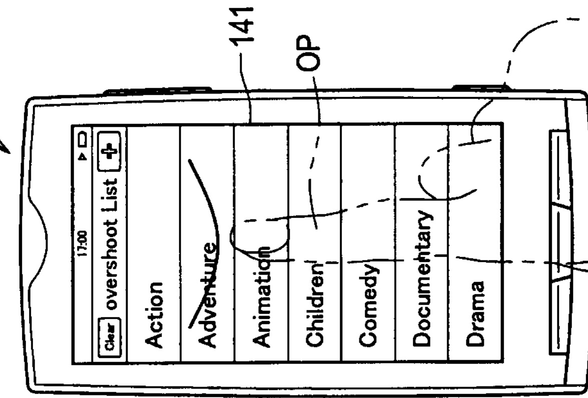
Figure 16:
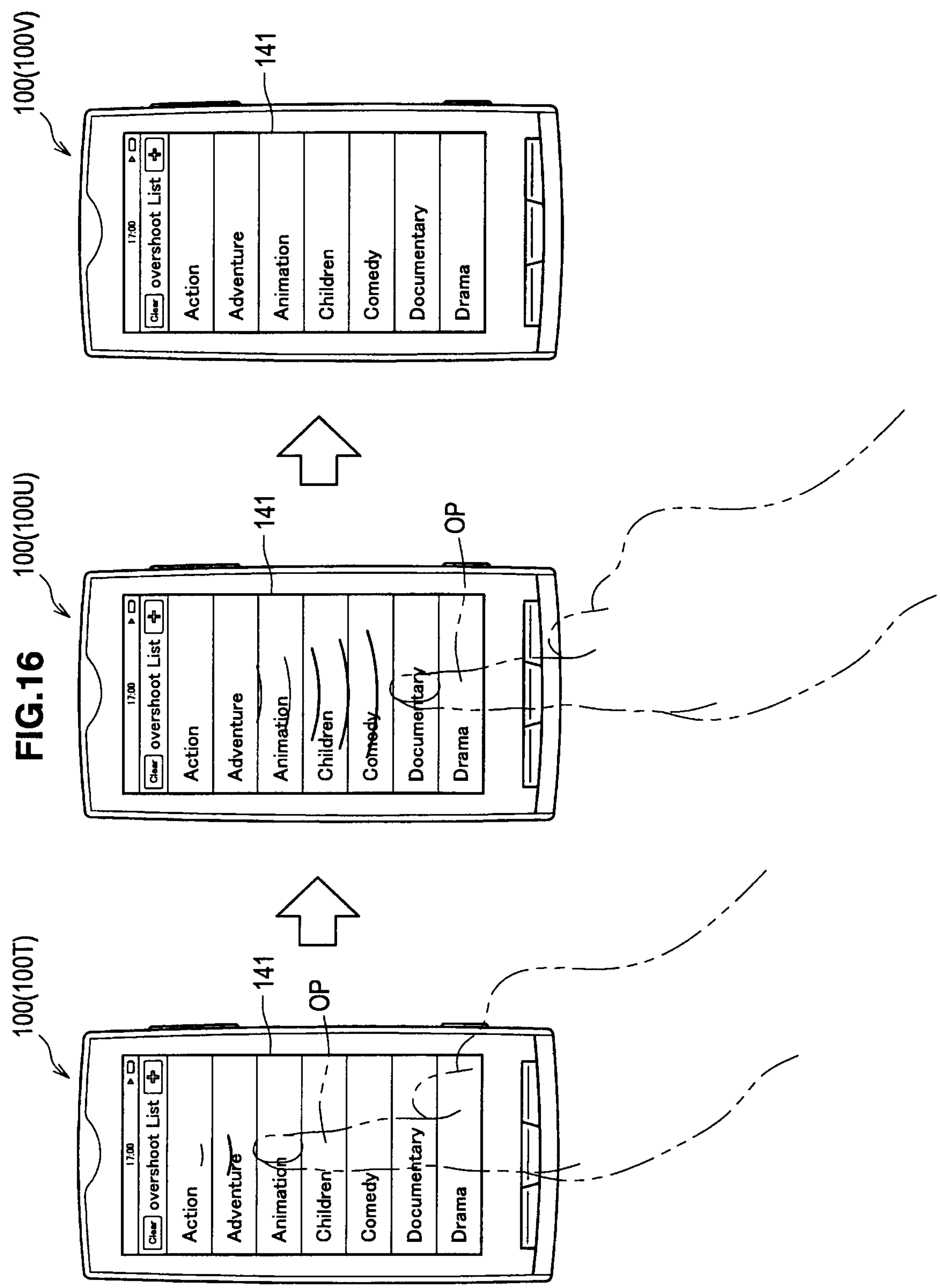
FIG. 16 is a diagram showing a screen example displayed by the information processing apparatus according to the embodiment in the case where the movement operation is performed at the stage in which the edge of the display object has already reached the display region.
Figure 17:
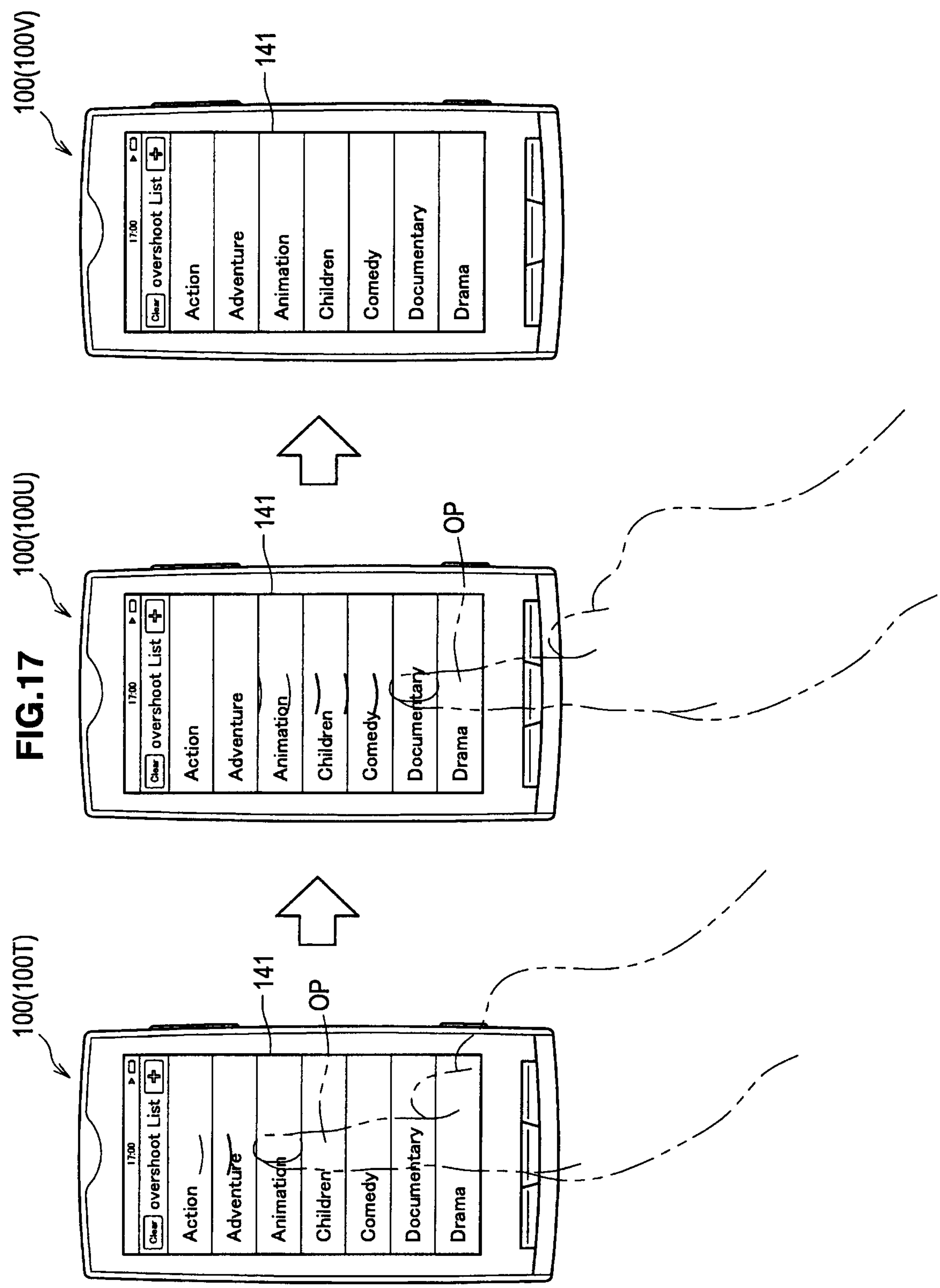
FIG. 17 is a diagram showing a screen example displayed by the information processing apparatus according to the embodiment in the case where the movement operation is performed at the stage in which the edge of the display object has already reached the display region.
Figure 18:
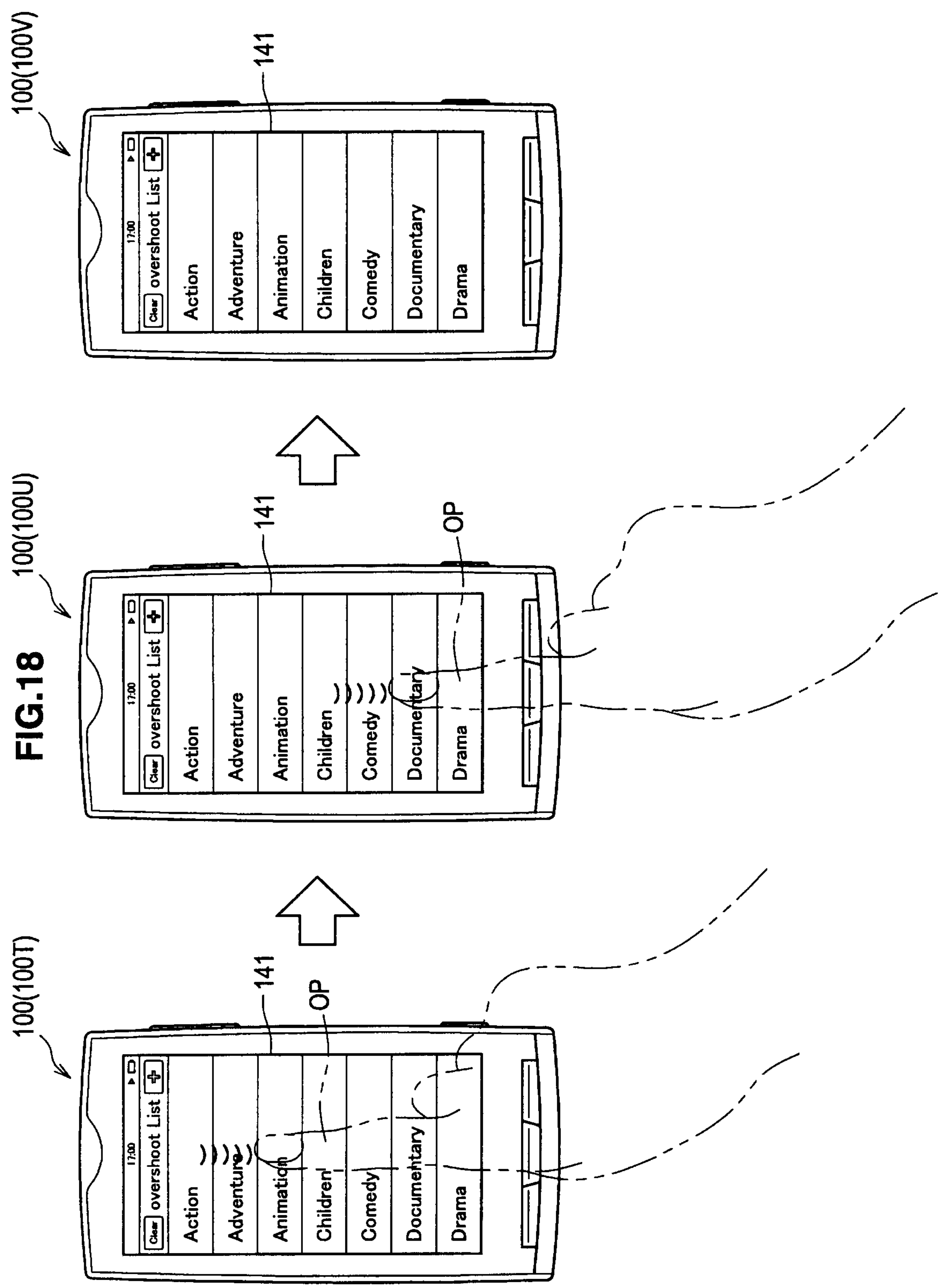
FIG. 18 is a diagram showing a screen example displayed by the information processing apparatus according to the embodiment in the case where the movement operation is performed at the stage in which the edge of the display object has already reached the display region.
Figure 19:
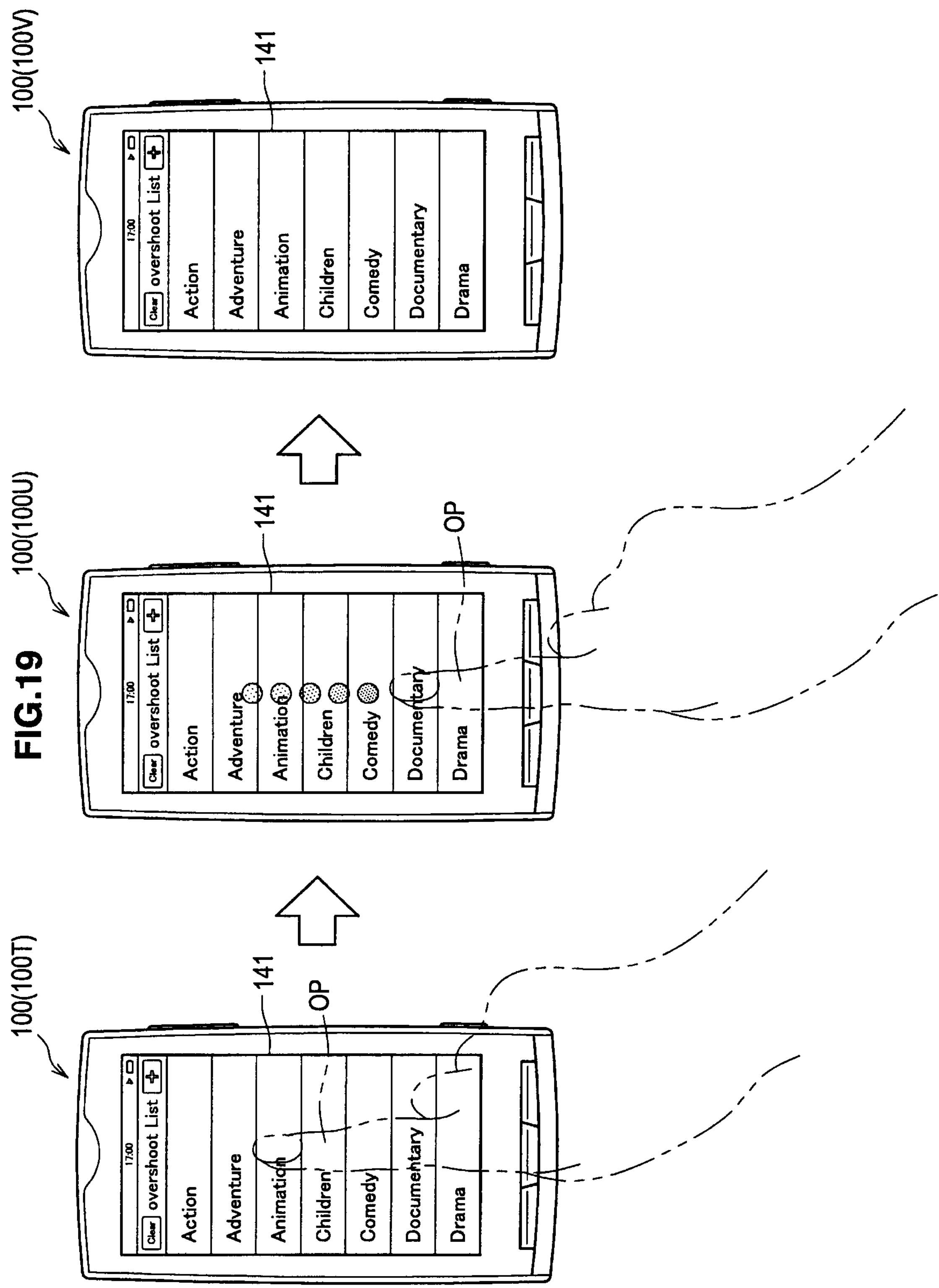
FIG. 19 is a diagram showing a screen example displayed by the information processing apparatus according to the embodiment in the case where the movement operation is performed at the stage in which the edge of the display object has already reached the display region.
Figure 20:
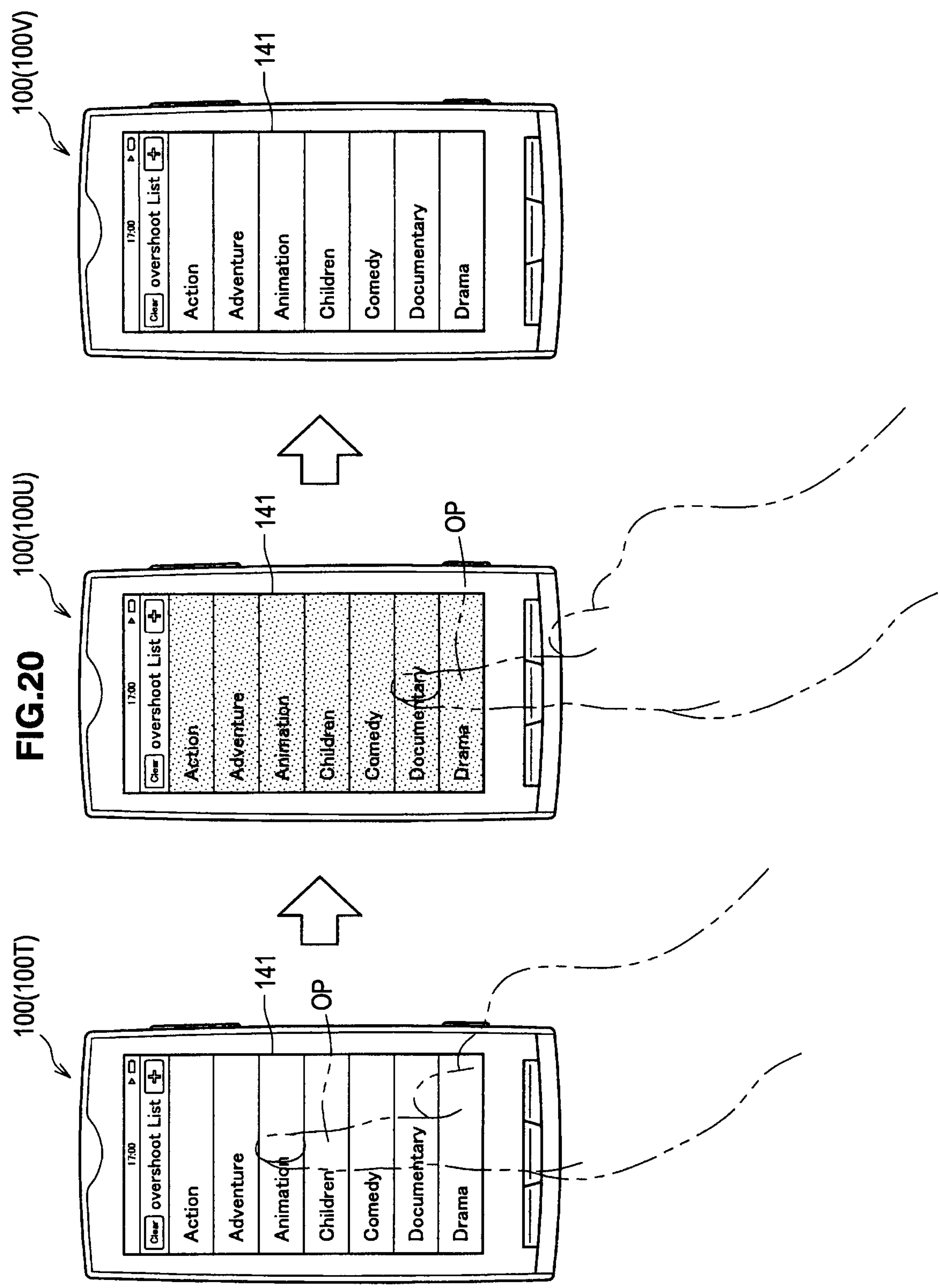
FIG. 20 is a diagram showing a screen example displayed by the information processing apparatus according to the embodiment in the case where the movement operation is performed at the stage in which the edge of the display object has already reached the display region.
Figure 21:
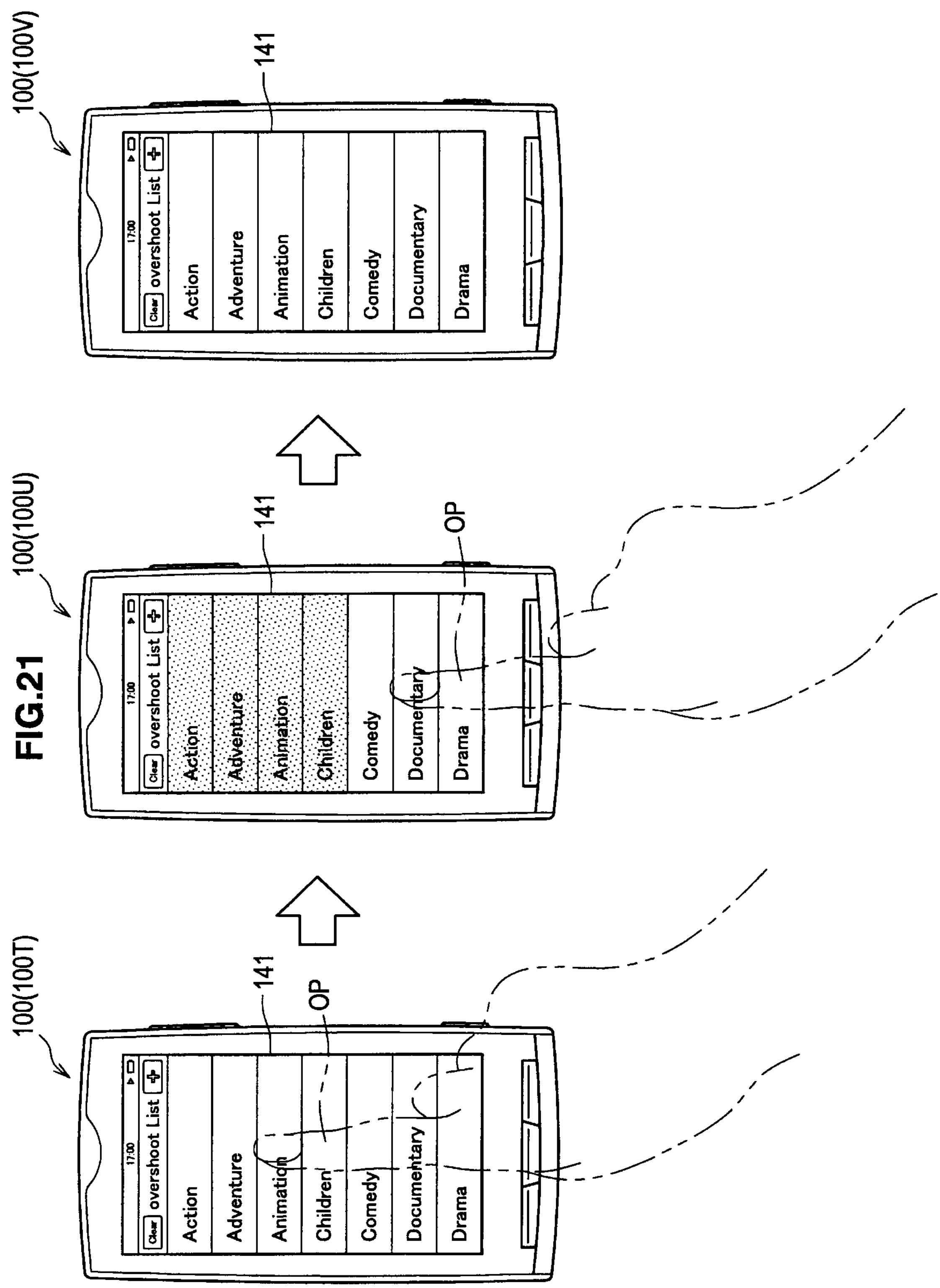
FIG. 21 is a diagram showing a screen example displayed by the information processing apparatus according to the embodiment in the case where the movement operation is performed at the stage in which the edge of the display object has already reached the display region.
Figure 22:
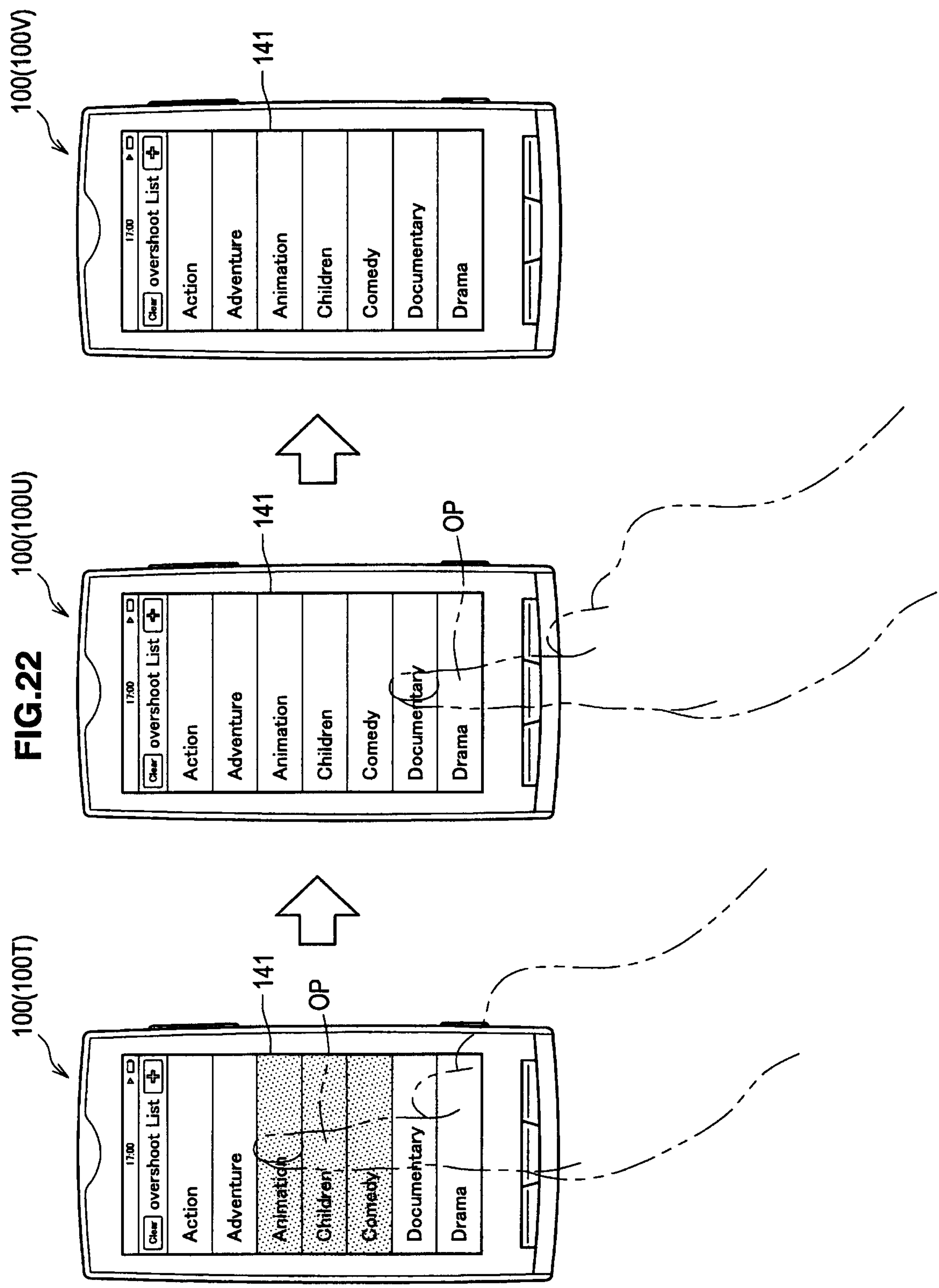
FIG. 22 is a diagram showing a screen example displayed by the information processing apparatus according to the embodiment in the case where the movement operation is performed at the stage in which the edge of the display object has already reached the display region.
Figure 23:
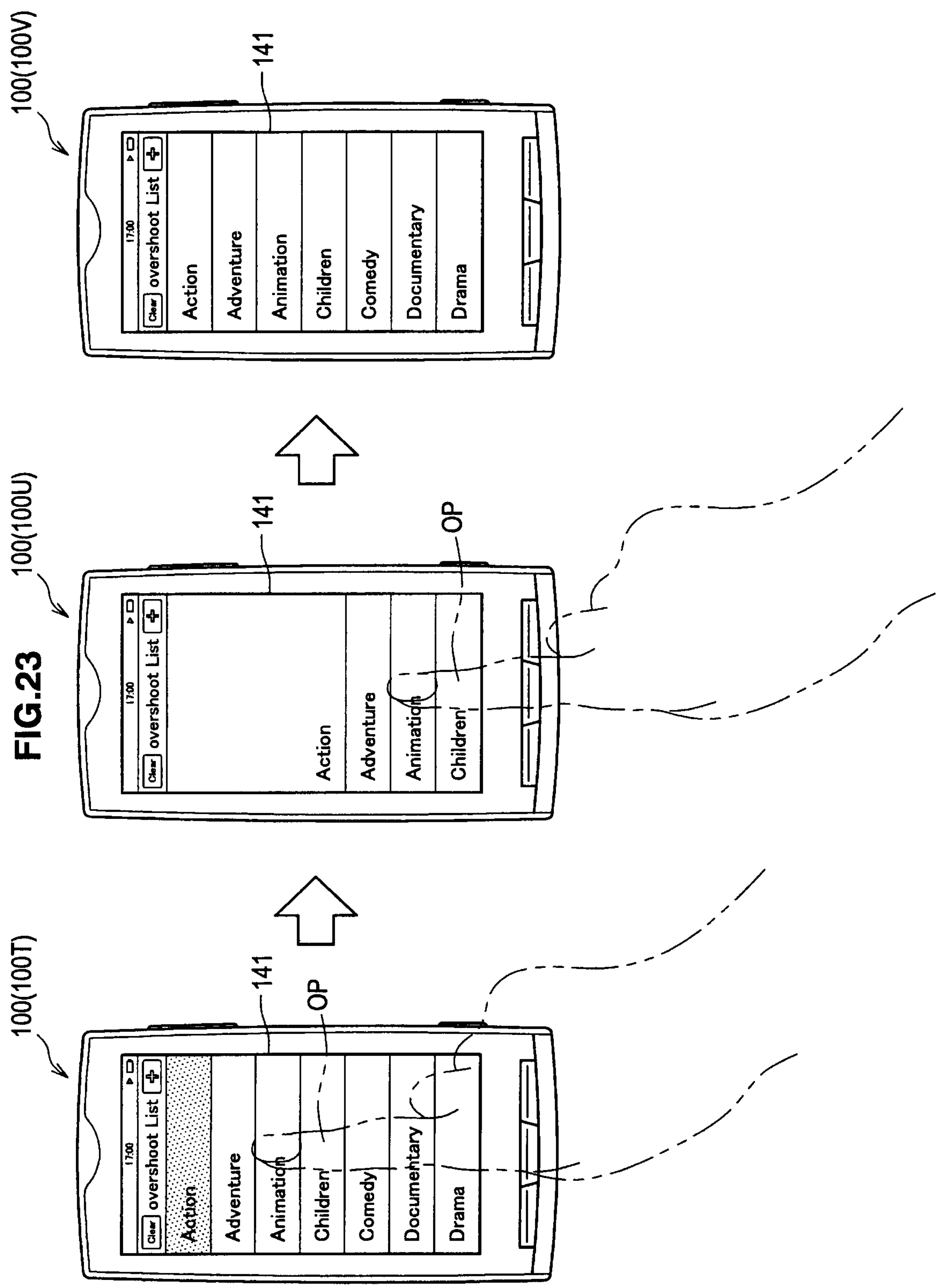
FIG. 23 is a diagram showing a screen example displayed by the information processing apparatus according to the embodiment in the case where the movement operation is performed at the stage in which the edge of the display object has already reached the display region.
Figure 24:
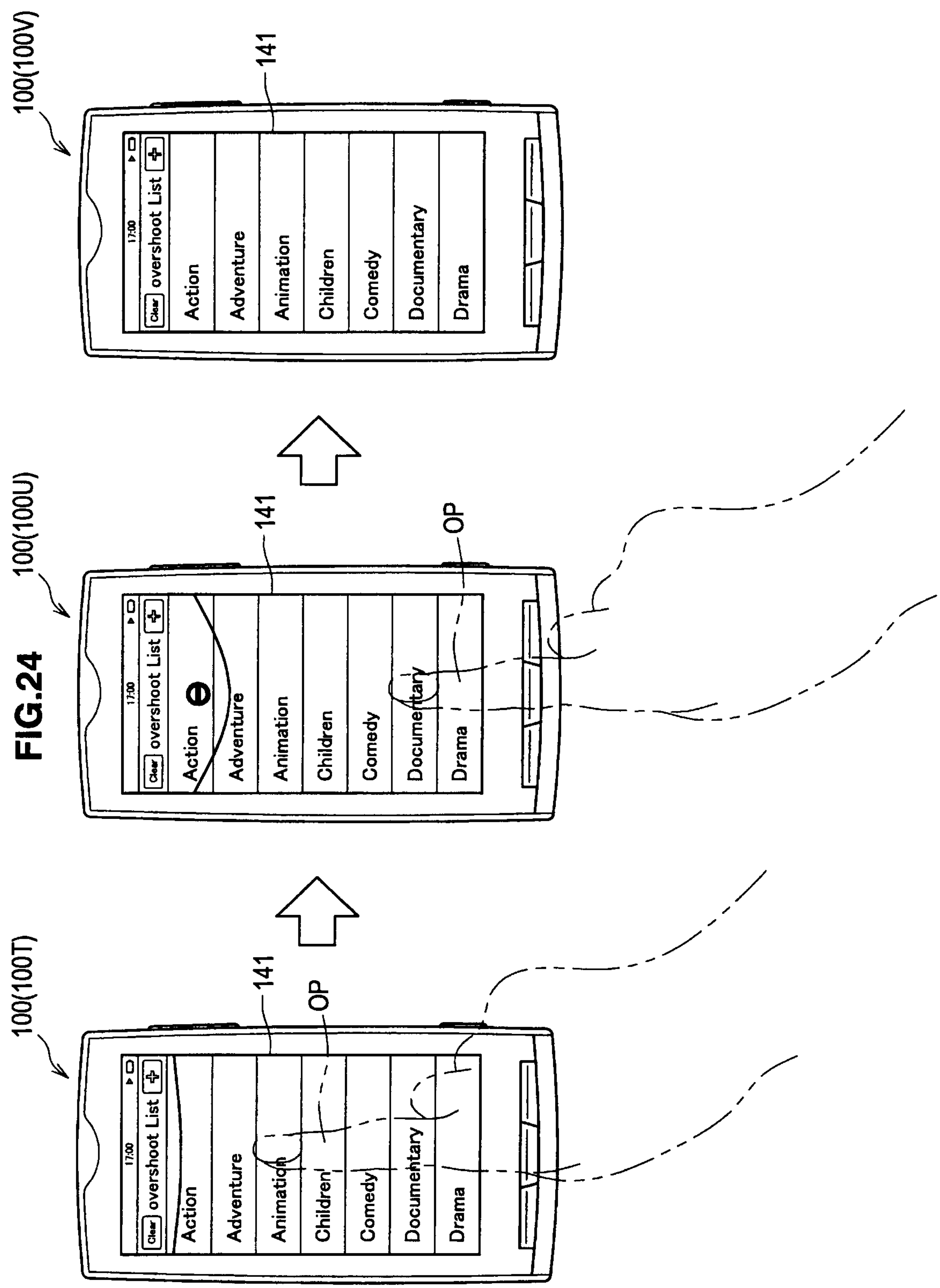
FIG. 24 is a diagram showing a screen example displayed by the information processing apparatus according to the embodiment in the case where the movement operation is performed at the stage in which the edge of the display object has already reached the display region.
Figure 25:
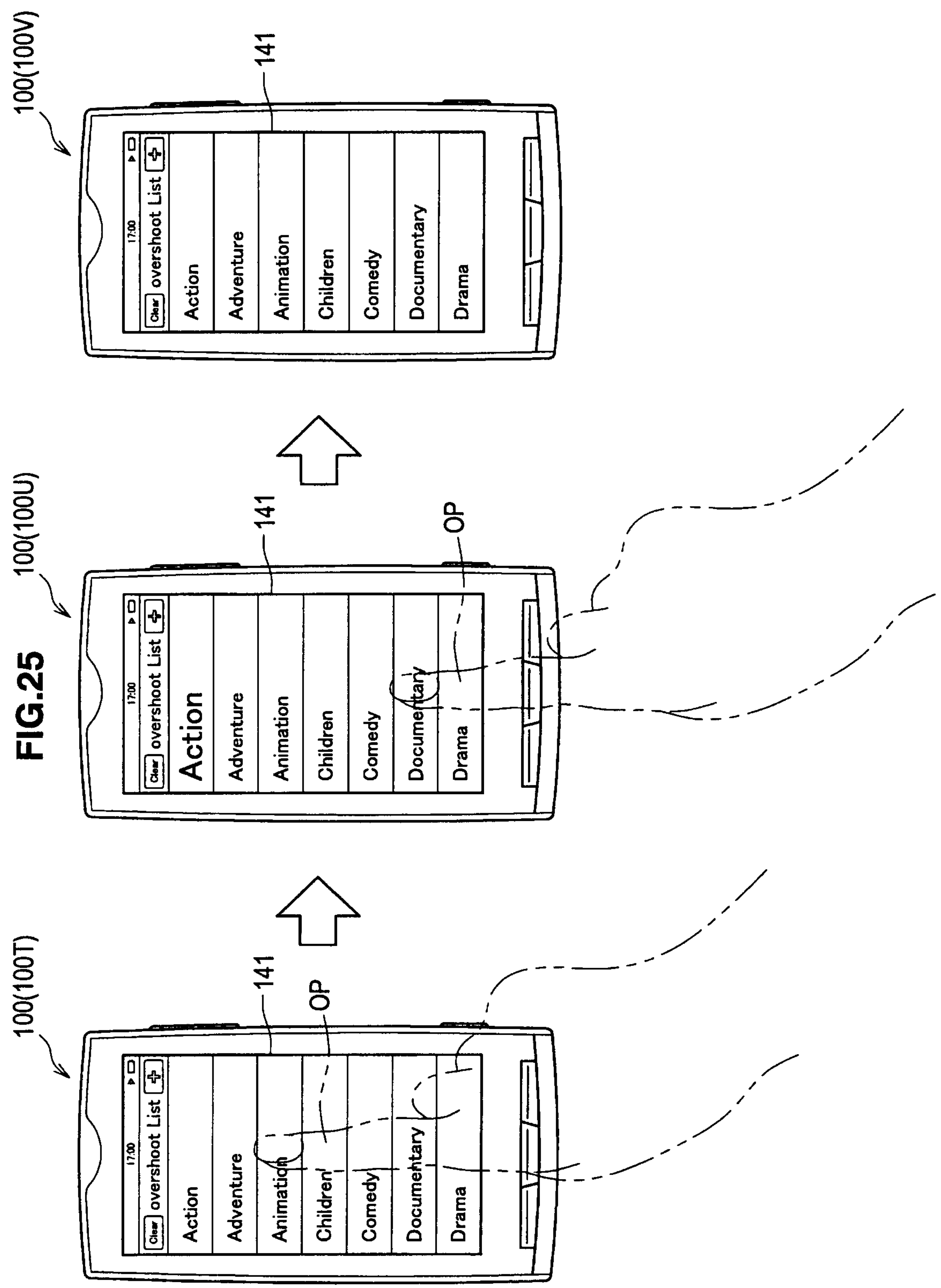
FIG. 25 is a diagram showing a screen example displayed by the information processing apparatus according to the embodiment in the case where the movement operation is performed at the stage in which the edge of the display object has already reached the display region.
Figure 26:
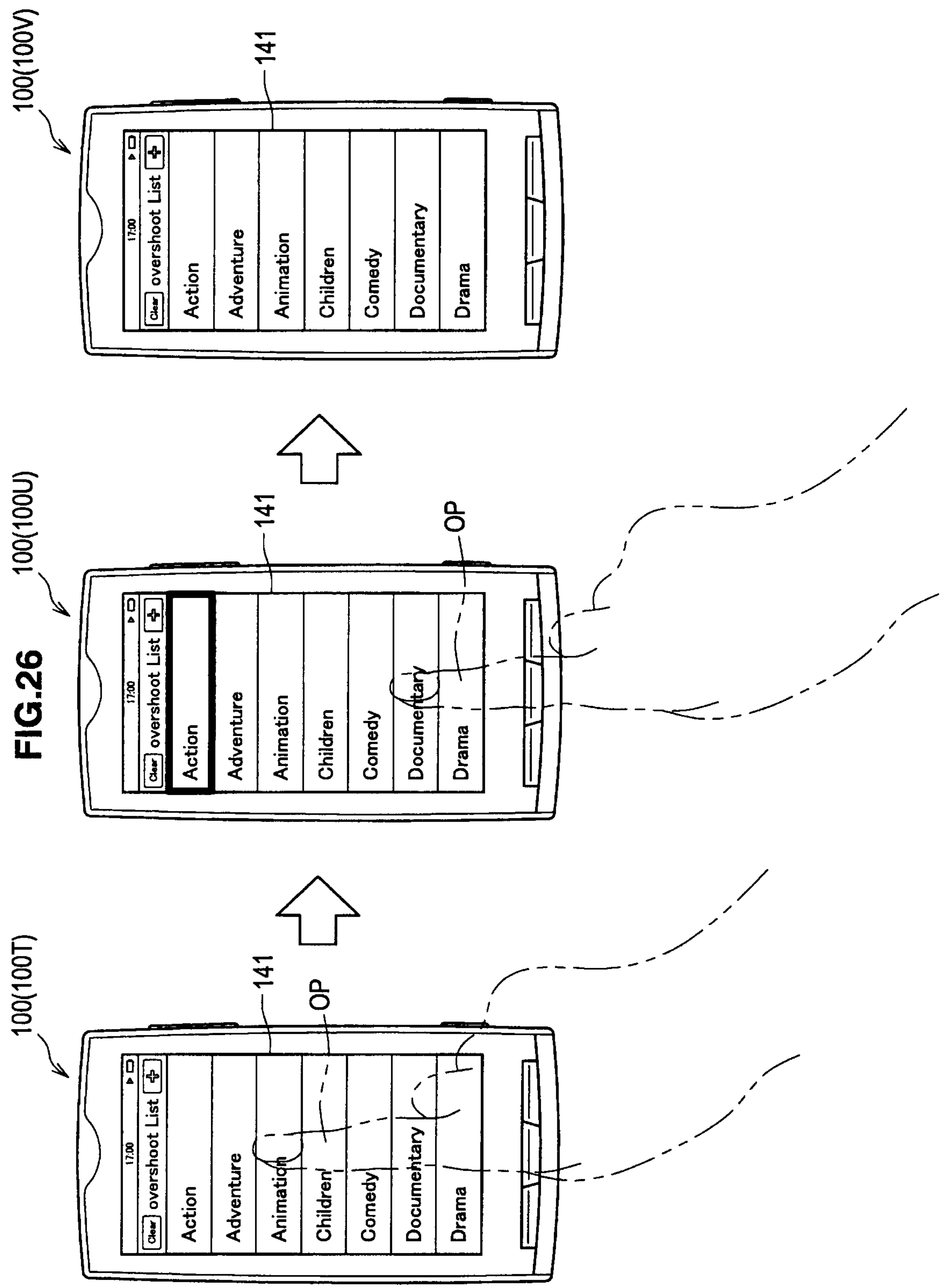
FIG. 26 is a diagram showing a screen example displayed by the information processing apparatus according to the embodiment in the case where the movement operation is performed at the stage in which the edge of the display object has already reached the display region.
Figure 27:
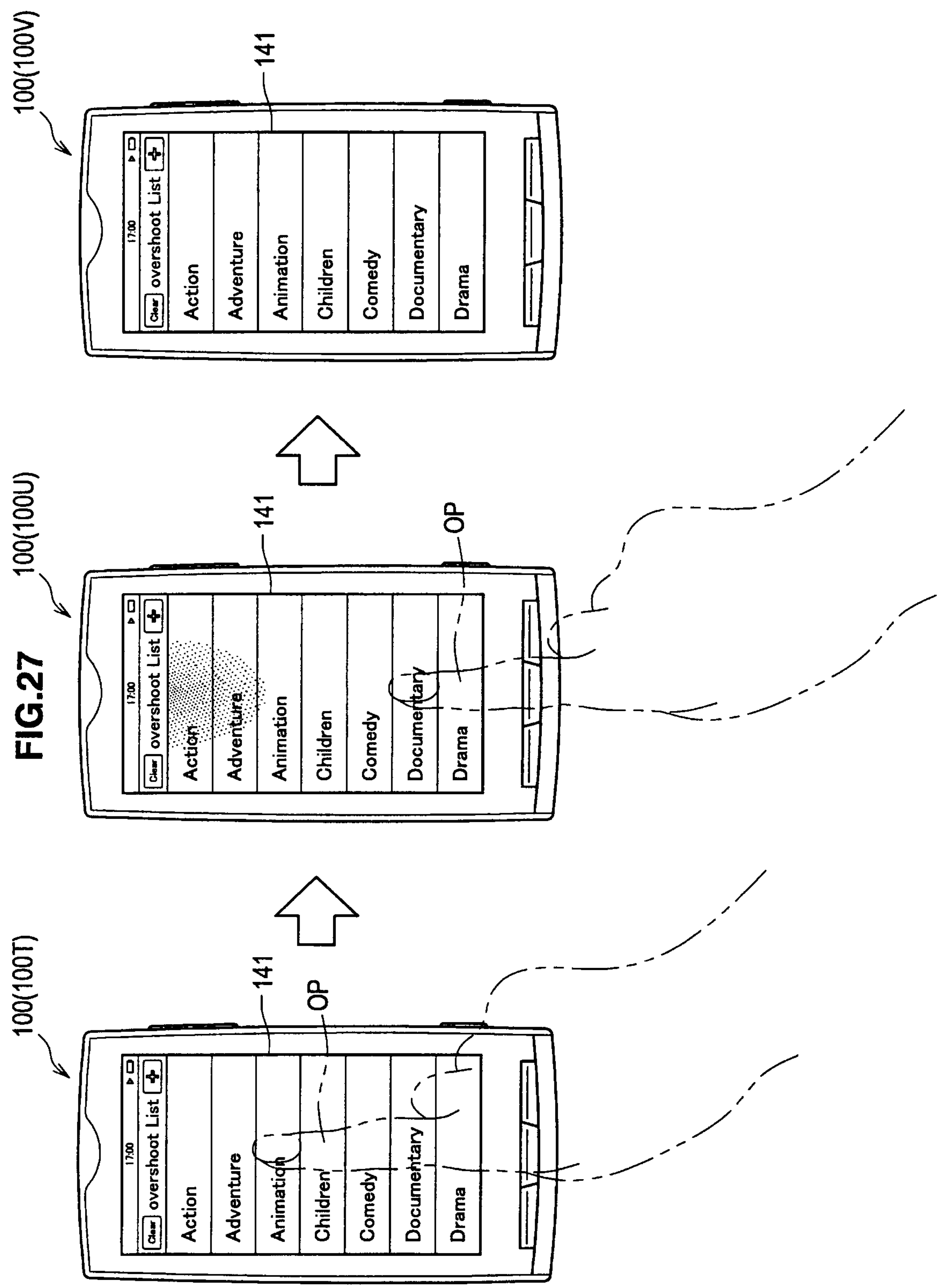
FIG. 27 is a diagram showing a screen example displayed by the information processing apparatus according to the embodiment in the case where the movement operation is performed at the stage in which the edge of the display object has already reached the display region.
Figure 28:
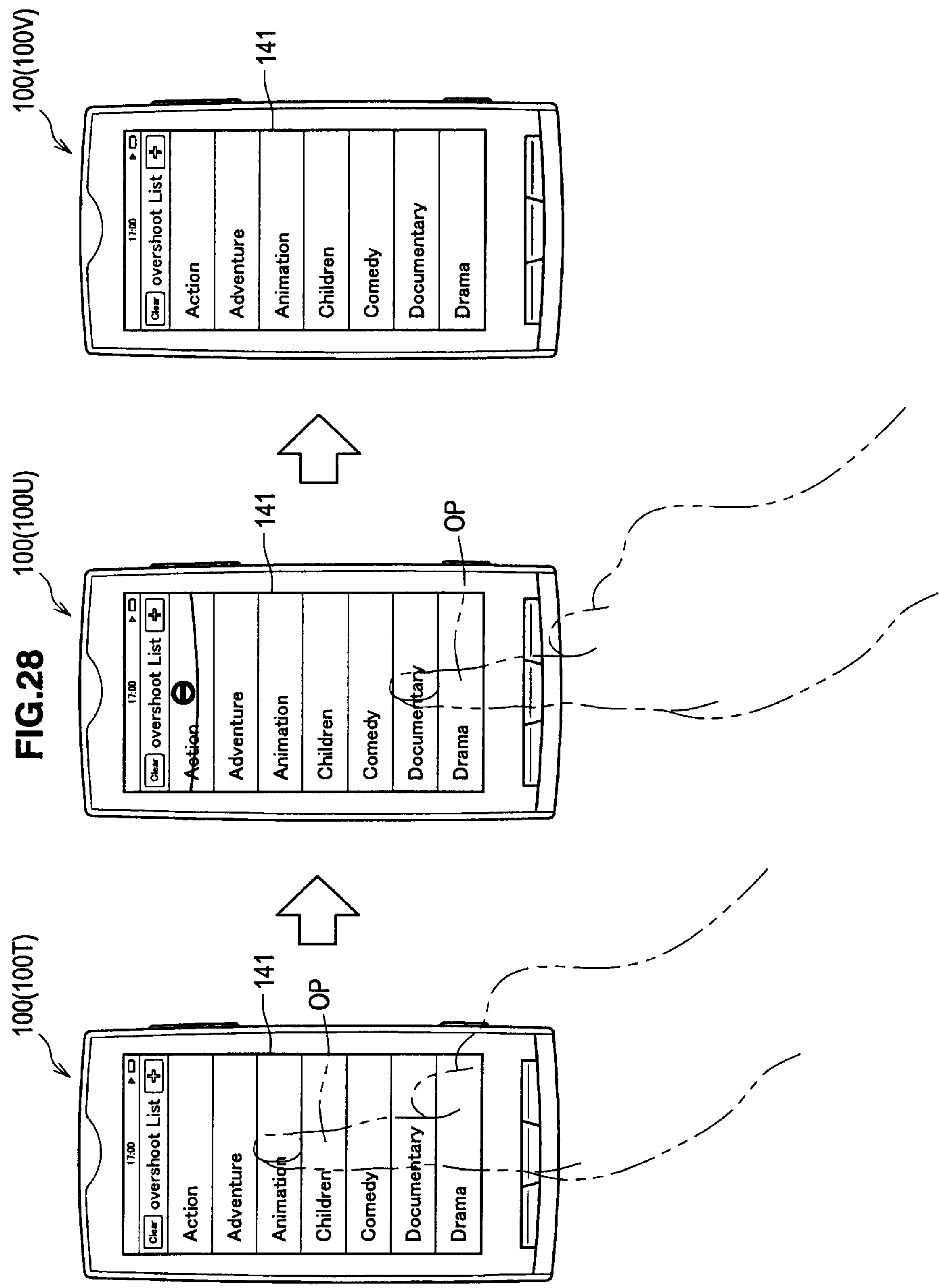
FIG. 28 is a diagram showing a screen example displayed by the information processing apparatus according to the embodiment in the case where the movement operation is performed at the stage in which the edge of the display object has already reached the display region.
Figure 29:
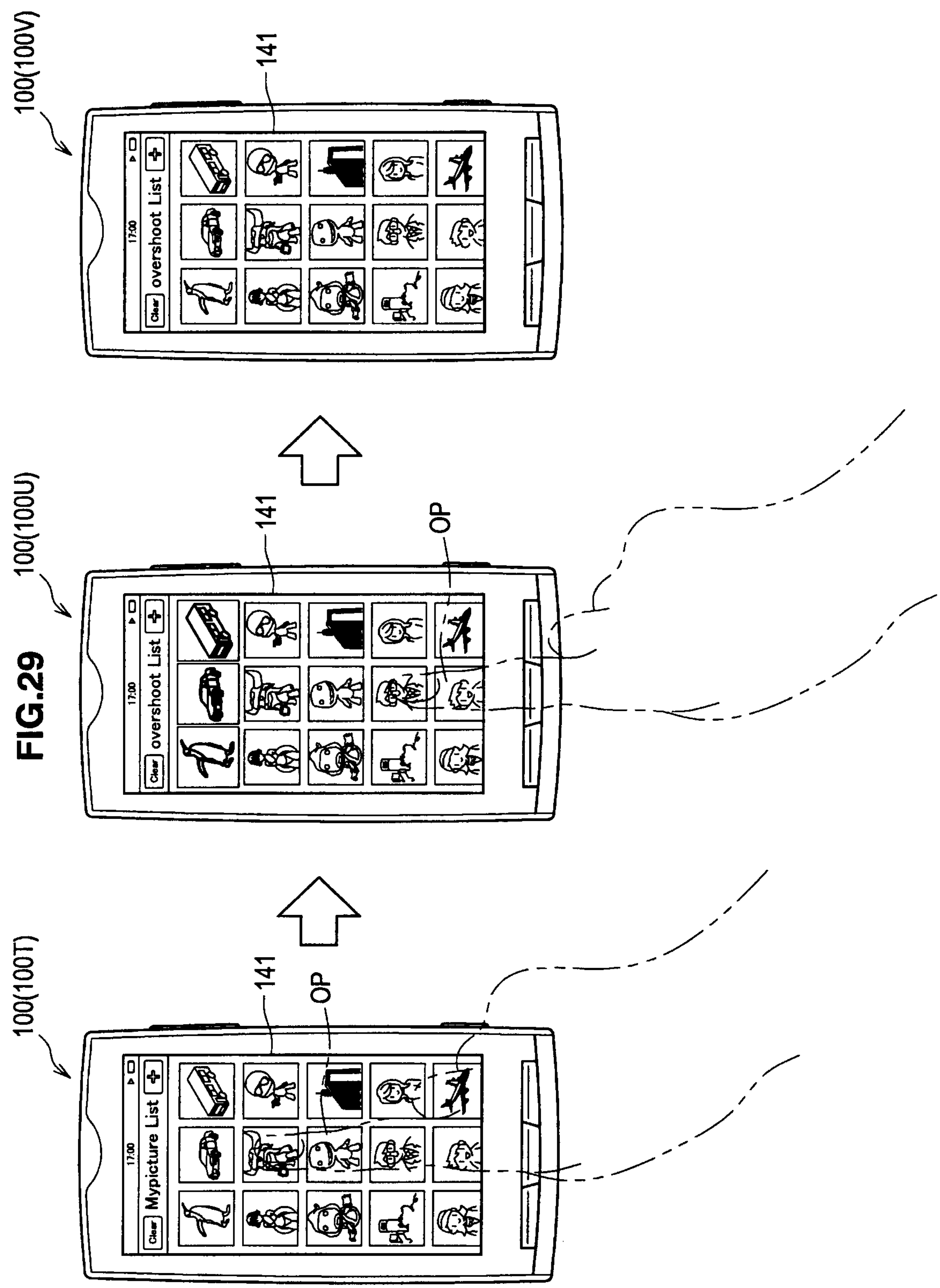
FIG. 29 is a diagram showing a screen example displayed by the information processing apparatus according to the embodiment in the case where the movement operation is performed at the stage in which the edge of the display object has already reached the display region.
Figure 30:
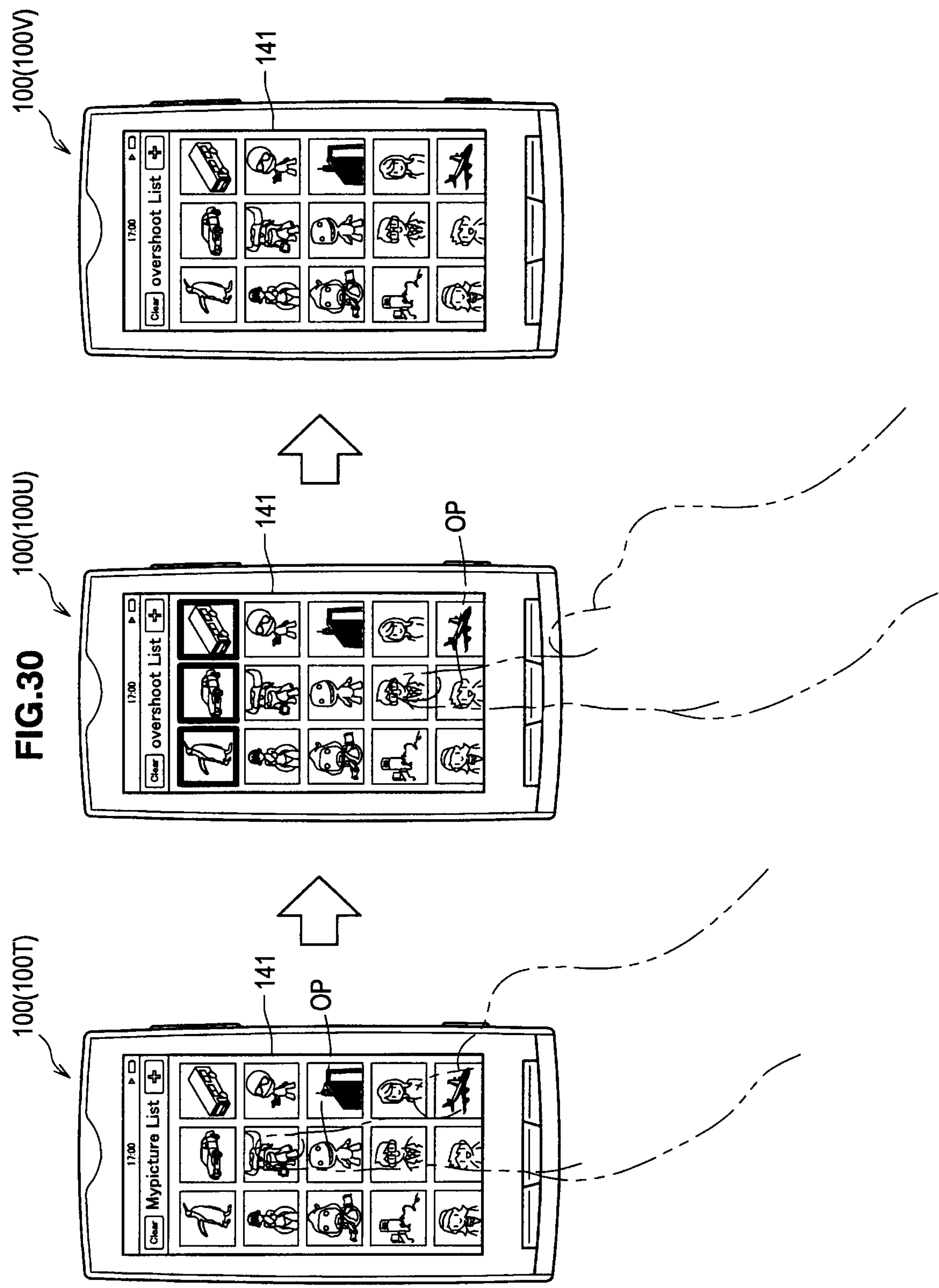
FIG. 30 is a diagram showing a screen example displayed by the information processing apparatus according to the embodiment in the case where the movement operation is performed at the stage in which the edge of the display object has already reached the display region.
Figure 31:
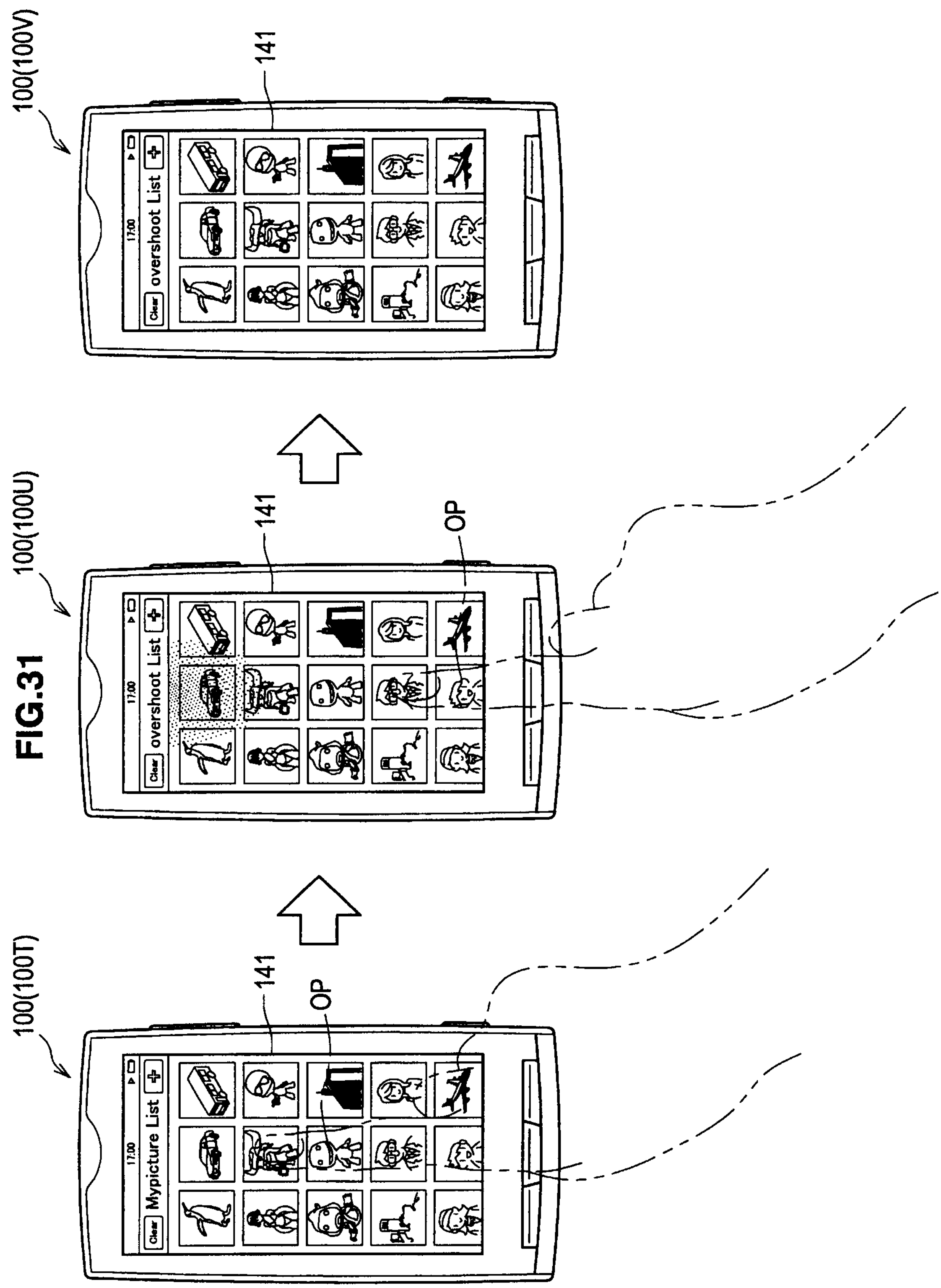
FIG. 31 is a diagram showing a screen example displayed by the information processing apparatus according to the embodiment in the case where the movement operation is performed at the stage in which the edge of the display object has already reached the display region.
Figure 32:
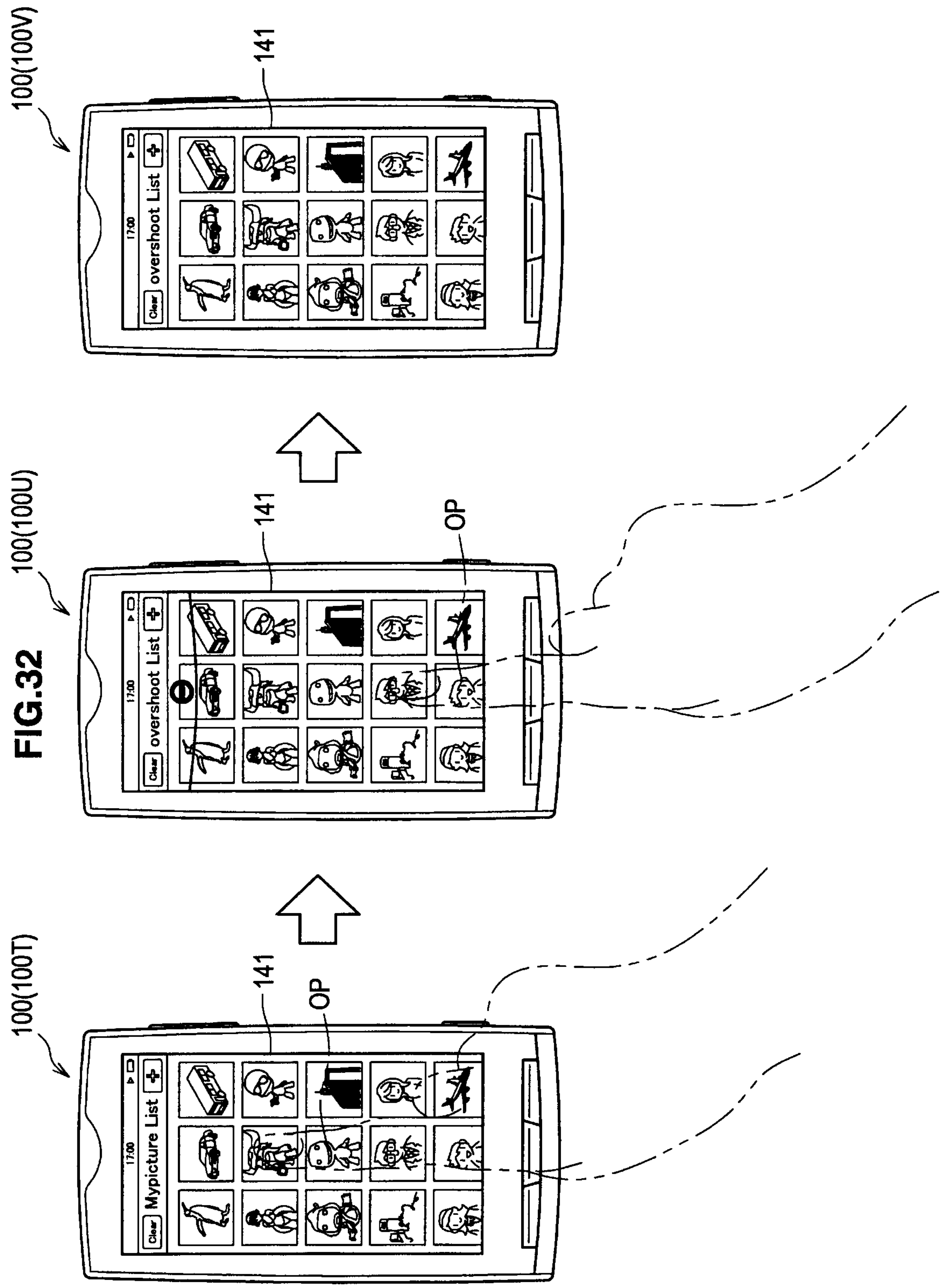
FIG. 32 is a diagram showing a screen example displayed by the information processing apparatus according to the embodiment in the case where the movement operation is performed at the stage in which the edge of the display object has already reached the display region.

FIG. 11 is a flowchart showing a flow of an operation performed by the information processing apparatus 100 according to the embodiment of the present disclosure in a case where a drag operation is performed. As shown in FIG. 11, the determination section 120 determines whether the operation detected by the detection section 110 is dragging (Step S201). In the case of determining that the operation detected by the detection section 110 is not dragging ("No" in Step S201), the determination section 120 determines whether the operation performed in the immediately preceding processing flow detected by the detection section 110 was the Overdrag (Step S203). In the case where the determination section 120 determines that the operation performed in the immediately preceding processing flow detected by the detection section 110 was not the Overdrag ("No" in Step S203), the display control section 130 returns to Step S201. In the case where the determination section 120 determines that the operation performed in the immediately preceding processing flow detected by the detection section 110 was the Overdrag ("Yes" in Step S203), the display control section 130 performs control such that Fadeout-drawing, in which the predetermined second display is gradually hidden, is executed (Step S204), and returns to Step S201.

In the case of determining that the operation detected by the detection section 110 is dragging ("Yes" in Step S201), the determination section 120 determines whether the operation is currently during the Overdrag (Step S202). In the case of determining that the operation is currently not during the Overdrag ("No" in Step S202), the determination section 120 proceeds to Step S203. In the case of determining that the operation is currently during the Overdrag ("Yes" in Step S202), the determination section 120 determines whether the operation performed in the immediately preceding processing flow detected by the detection section 110 was also the Overdrag (Step S205).

In the case of determining that the operation performed in the immediately preceding processing flow detected by the detection section 110 was not the Overdrag ("No" in Step S205), the determination section 120 replaces the Overdrag-start point with current coordinates detected by the detection section 110 (Step S206), and returns to Step S201. In the case of determining that the operation performed in the immediately preceding processing flow detected by the detection section 110 was the Overdrag ("Yes" in Step S205), the determination section 120 determines whether the operation point is present within a predetermined range (Step S207). The predetermined range represents the range that does not exceed the predetermined angle with respect to the movement direction on the basis of the Overdrag-start point.

In the case of determining that the operation point is not present within the predetermined range ("No" in Step S207), the determination section 120 proceeds to Step S204. In the case where it is determined by the determination section 120 that the operation point is present within the predetermined range ("Yes" in Step S207), the display control section 130 updates Overdrag-drawing (Step S208) and returns to Step S201. The updating of the Overdrag-drawing means that control is performed such that the predetermined second display is shown.

[1-12. Screen Displayed by Operation at Stage in which Edge of Display Object Reaches Display Region]

FIGS. 12 to 32 are each a diagram showing a screen example displayed by the information processing apparatus 100 according to the embodiment of the present disclosure in the case where the movement operation is performed at the stage in which the edge DT of the display object has already reached the display region 141. In the case where the movement operation performed by the operating object OP is not detected by the detection section 110 when the edge DT of the display object has already reached the display region 141, the display control section 130 of an information processing apparatus 100T performs control such that the predetermined second display that is different from the predetermined first display is not shown on the display region 141 yet.

In the case where the movement operation performed by the operating object OP is detected by the detection section 110 when the edge DT of the display object has already reached the display region 141, the display control section 130 of an information processing apparatus 100U performs control such that the predetermined second display that is different from the predetermined first display is shown on the display region 141. In the case where the termination of the movement operation is detected by the detection section 110, the display control section 130 of an information processing apparatus 100V can perform control such that the predetermined second display on the display region 141 is hidden.

Figure 33:
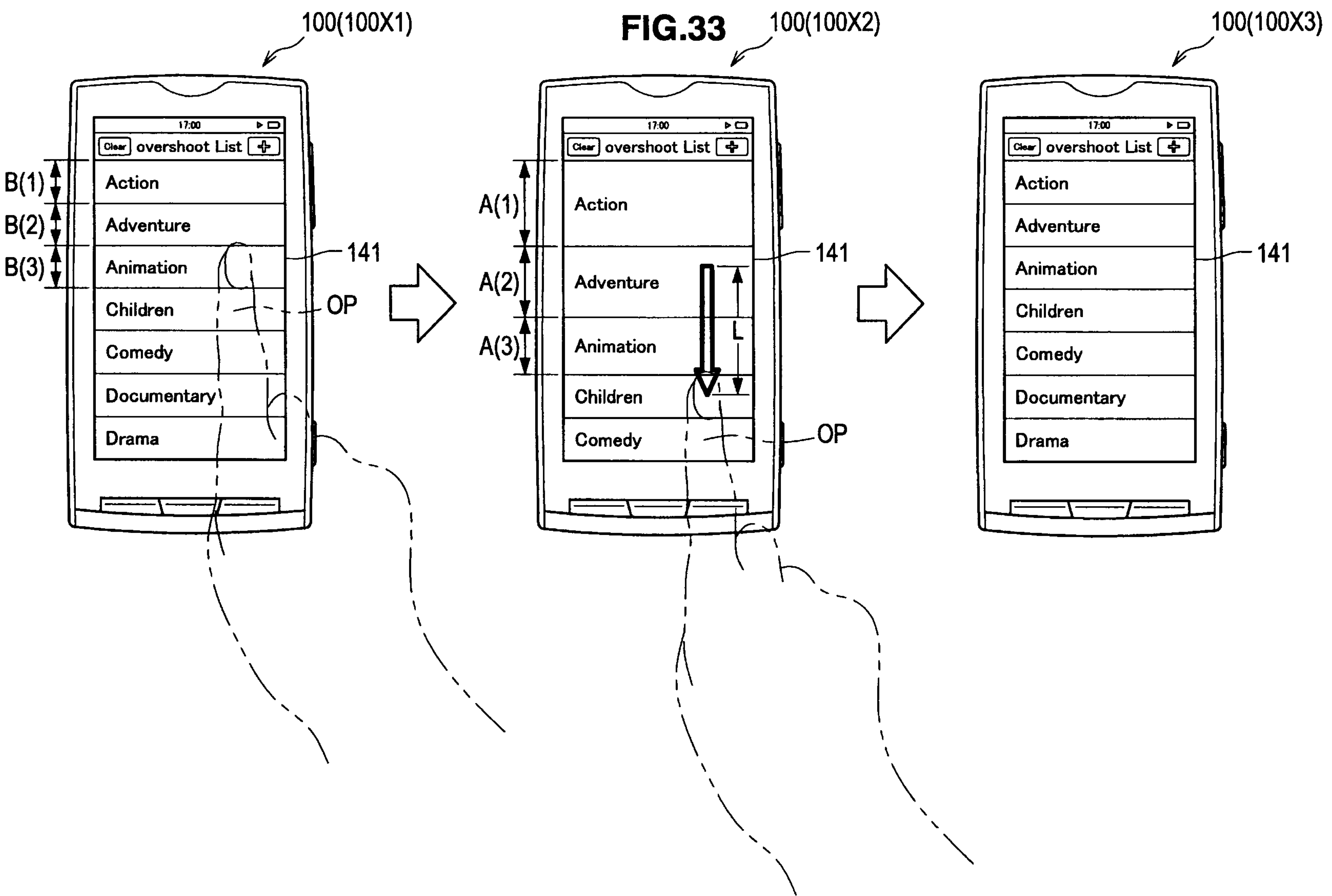
FIG. 33 is a diagram showing a screen example displayed by the information processing apparatus according to the embodiment in the case where the movement operation is performed at the stage in which the edge of the display object has already reached the display region.

FIG. 33 is a diagram showing a screen example displayed by the information processing apparatus 100 according to the embodiment of the present disclosure in the case where the movement operation is performed at the stage in which the edge DT of the display object has already reached the display region 141. In the case where the movement operation performed by the operating object OP is detected by the detection section 110 when the edge DT of the display object has still not reached the display region 141, the display control section 130 of an information processing apparatus 100X1 performs control such that the predetermined second display that is different from the predetermined first display is not shown on the display region 141 yet.

In the case where the movement operation performed by the operating object OP is detected by the detection section 110 when the edge DT of the display object has already reached the display region 141, the display control section 130 of an information processing apparatus 100X2 performs control such that the predetermined second display that is different from the predetermined first display is shown on the display region 141. In the example shown in FIG. 33, the display control section 130 is performing control such that the predetermined second display is shown, by changing the shapes of items which are determined based on the edge DT of the display object and the position of the operating object OP detected by the detection section 110. The display control section 130 can change the shapes of the items which are present between the edge DT of the display object and the position of the operating object OP detected by the detection section 110, for example.

In the example shown in FIG. 33, the display control section 130 changes the shapes of the items "Action", "Adventure", and "Animation", which are present between the edge DT of the display object and the position of the operating object OP detected by the detection section 110. The display control section 130 may change the shape of each item by lengthening the item in the movement direction. As shown in FIG. 33, the display control section 130 lengthens each item in the movement direction such that the lengths of respective items in the movement direction is changed from B(1), B(2), and B(3) to A(1), A(2), and A(3), respectively.

When an item number determined based on the edge DT of the display object and the position of the operating object OP detected by the detection section 110 is represented by 1, 2, . . . , n, in ascending order of distance from the edge DT of the display object, and a movement distance of the operating object OP in the movement direction in the case where the movement operation is performed at the stage in which the edge DT of the display object has already reached the display region 141 is represented by L, a shape-change amount L(i) of i-th item from the edge DT of the display object is represented as shown in the following Equation 1, for example.

$$L(i) = L \times (n-i+1)^2 \Big/ \left( \sum_{k=1}^{n} k^2 \right) \quad \text{(Equation 1)}$$

Further, in the case where the termination of the movement operation is detected by the detection section 110, the display control section 130 of an information processing apparatus 100X3 can perform control such that the predetermined second display on the display region 141 is hidden.

[1-13. Screen Displayed by Operation at Stage Before Edge of Display Object Reaches Display Region]

Figure 34:
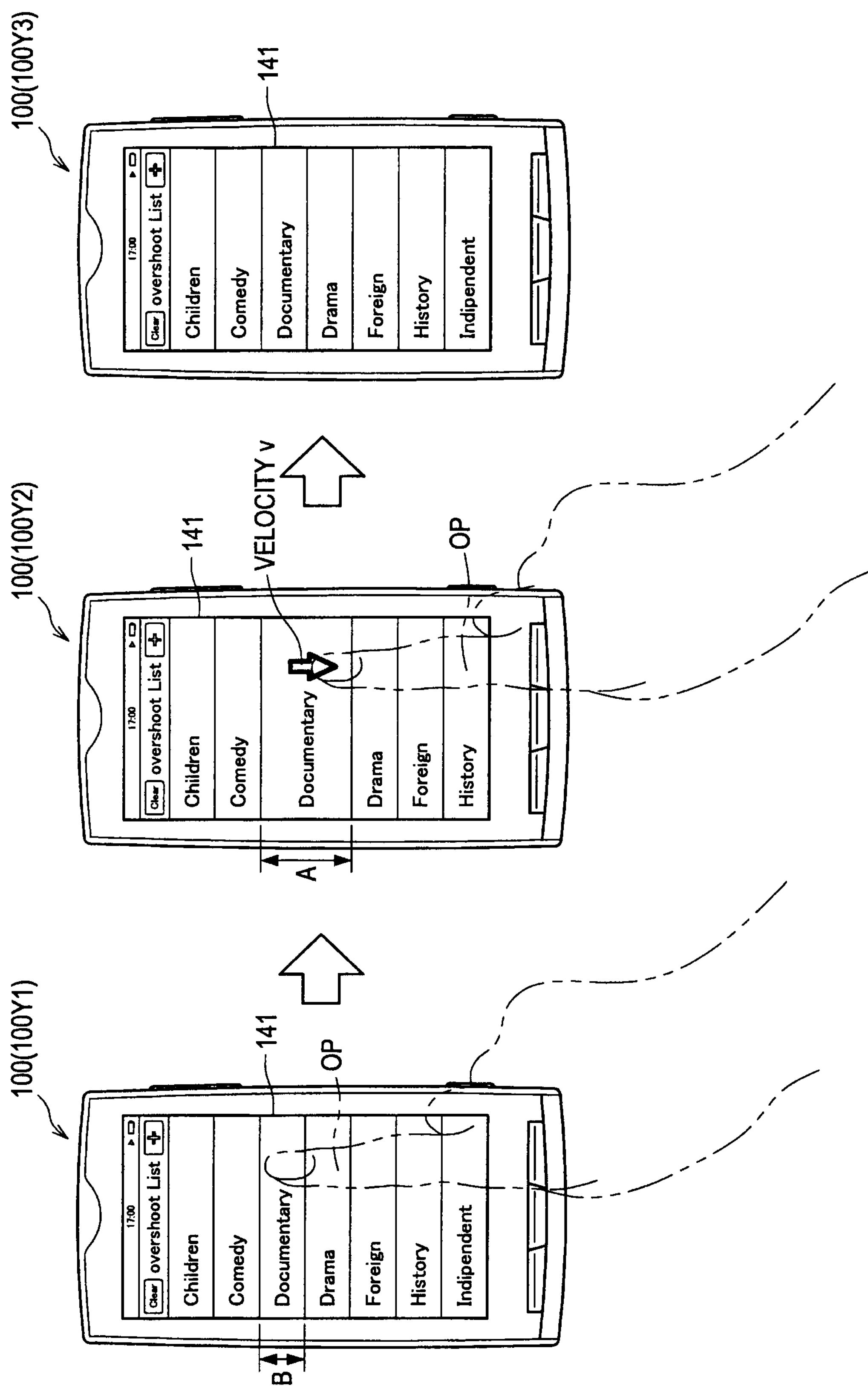
FIG. 34 is a diagram showing a screen example displayed by the information processing apparatus according to the embodiment in the case where the movement operation is performed at a stage before the edge of the display object reaches the display region.

FIG. 34 is a diagram showing a screen example displayed by the information processing apparatus 100 according to the embodiment of the present disclosure in the case where the movement operation is performed at a stage before the edge DT of the display object reaches the display region 141. In the case where the movement operation performed by the operating object OP is not detected by the detection section 110 at the stage before the edge DT of the display object reaches the display region 141, the display control section 130 of an information processing apparatus 100Y1 performs control such that the predetermined second display that is different from the predetermined first display is not shown on the display region 141 yet.

In the case where the movement operation performed by the operating object OP is detected by the detection section 110 at the stage before the edge DT of the display object reaches the display region 141, the display control section 130 of an information processing apparatus 100Y2 performs control such that a predetermined third display that is different from the predetermined second display is shown on the display region 141. In such a manner, the difference between the following can be emphasized: the case where the movement operation is performed at the stage in which the edge DT of the display object has already reached the display region 141; and the case where the movement operation is performed at the stage before the edge DT of the display object reaches the display region 141. In the example shown in FIG. 34, the display control section 130 performs control such that the predetermined third display is shown, by changing the shape of an item which is determined based on the position of the operating object OP detected by the detection section 110, in accordance with velocity v of the operating object OP. The display control section 130 can change the shape of the item, which is present at the position of the operating object OP detected by the detection section 110, by an amount proportional to the velocity v of the operating object OP, for example.

In the example shown in FIG. 34, the display control section 130 changes the shape of the item "Documentary" which is present at the position of the operating object OP detected by the detection section 110. The display control section 130 may change the shape of the item by lengthening the item in the movement direction. As shown in FIG. 34, the display control section 130 lengthens the item in the movement direction such that the length of the item in the movement direction is changed from B to A.

Further, in the case where the termination of the movement operation is to detected by the detection section 110, the display control section 130 of an information processing apparatus 100Y3 can perform control such that the predetermined third display on the display region 141 is hidden.

[1-14. Screen Displayed when Display Object is Small]

Figure 35:
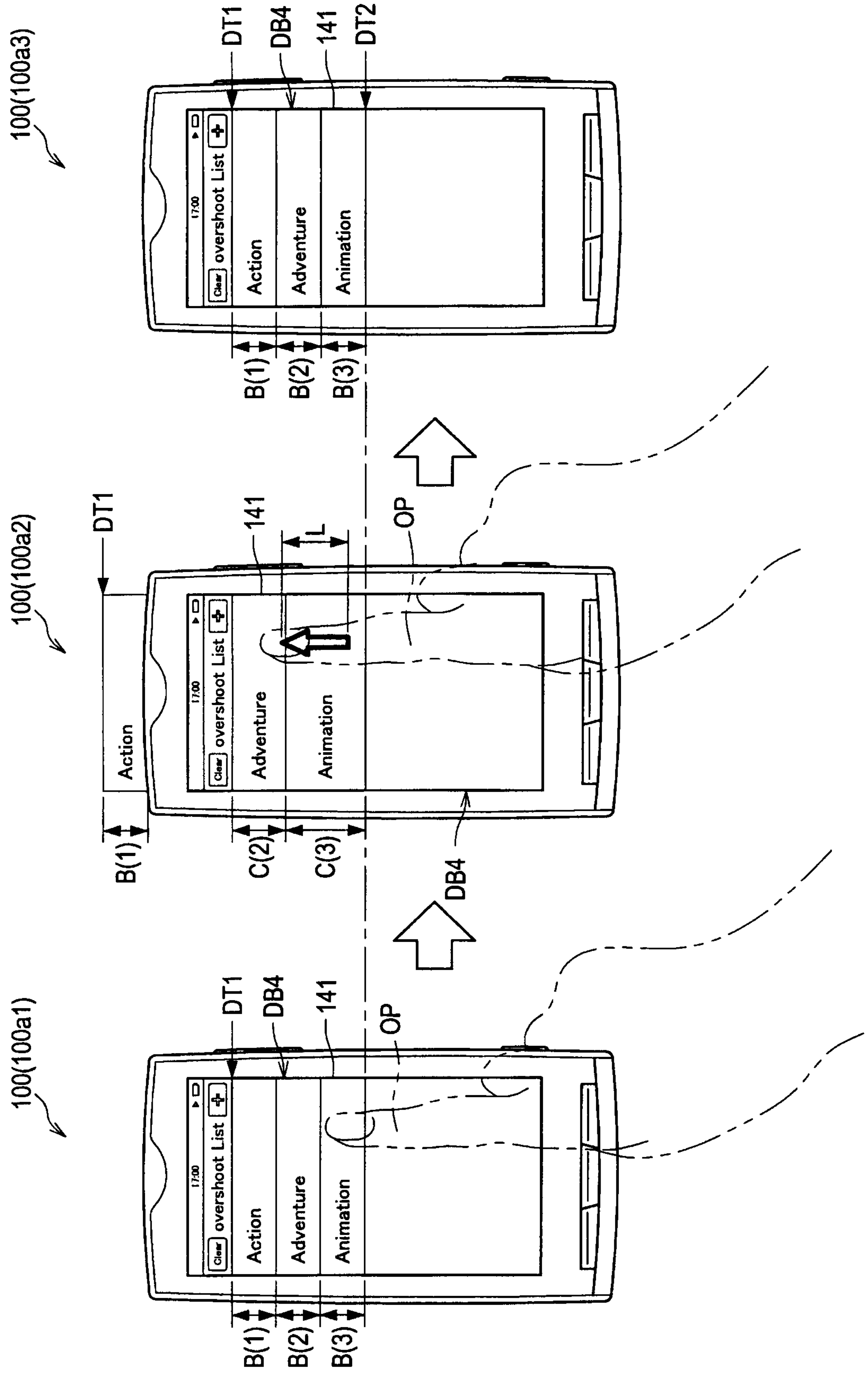
FIG. 35 is a diagram showing a screen example (when a display object is small) displayed by the information processing apparatus according to the embodiment in the case where the movement operation is performed at the stage in which the edge of the display object has already reached the display region.

FIG. 35 is a diagram showing a screen example (when a display object is small) displayed by the information processing apparatus 100 according to the embodiment of the present disclosure in the case where the movement operation is performed at the stage in which an edge DT1 of the display object has already reached the display region 141. In the case where the movement operation performed by the operating object OP is not detected by the detection section 110 when the edge DT1 of the display object has already reached the display region 141, the display control section 130 of an information processing apparatus 100*a*1 performs control such that the predetermined second display that is different from the predetermined first display is not shown on the display region 141 yet.

In the case where the movement operation performed by the operating object OP is detected by the detection section 110 when the edge DT1 of the display object has already reached the edge of the display region 141 corresponding to the edge DT1 of the display object, the display control section 130 of an information processing apparatus 100*a*2 performs control such that the predetermined second display that is different from the predetermined first display is shown on the display region 141. In FIG. 35, there is shown an example in which the length of a display object DB4 in the movement direction (for example, upward direction) is shorter than the length of the display region 141 in the movement direction.

In such a case, as shown in FIG. 35, the display control section 130 of the information processing apparatus 100*a*2 performs control such that the predetermined second display is shown, by lengthening the display object DB4 in the direction from an edge DT2 of the display object to the edge DT1 of the display object on the basis of the edge DT2 of the display object, which is the edge at the opposite side of the edge DT1 of the display object that has reached the display region 141, for example. In the example shown in FIG. 35, the display control section 130 of an information processing apparatus 100*a*2 performs control such that the predetermined second display is shown, in a manner that the length in the movement direction (for example, upward direction) of the display object DB4 of the item "Animation" that is present at the position of the operating object OP detected by the detection section 110 is changed from B(3) to C(3), and that the length in the movement direction (for example, upward direction) of the display object DB4 of "Adventure" which is present in the upward direction of the item is changed from B(2) to C(2).

In the case where the termination of the movement operation is detected by the detection section 110, the display control section 130 of an information processing apparatus 100*a*3 can perform control such that the predetermined second display on the display region 141 is hidden.

Figure 36:
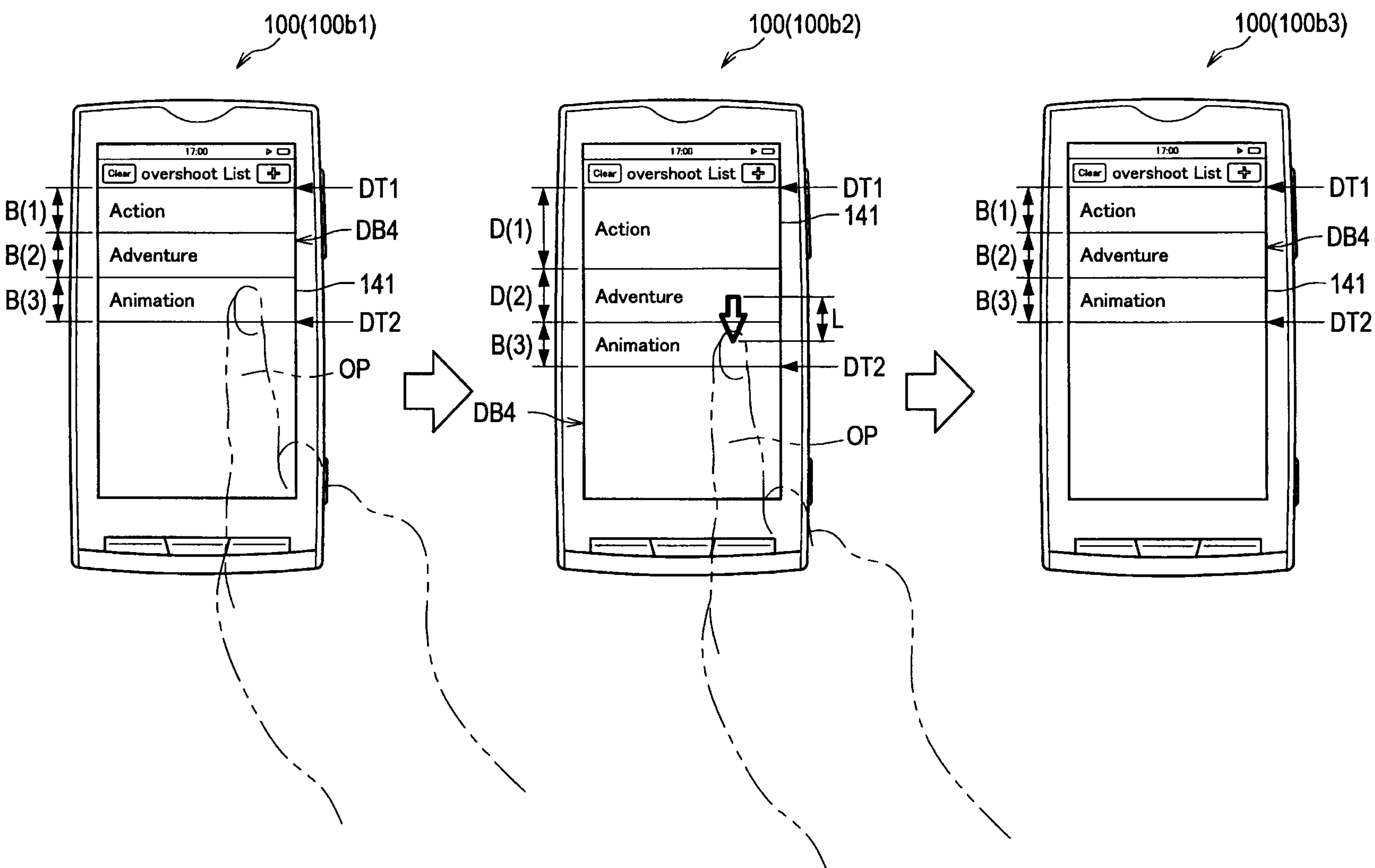
FIG. 36 is a diagram showing a screen example (when a display object is small) displayed by the information processing apparatus according to the embodiment in the case where the movement operation is performed at the stage in which the edge of the display object has already reached the display region.

FIG. 36 is a diagram showing a screen example (when a display object is small) displayed by the information processing apparatus 100 according to the embodiment of the present disclosure in the case where the movement operation is performed at the stage in which the edge DT1 of the display object has already reached the display region 141. In the case where the movement operation performed by the operating object OP is not detected by the detection section 110 when the edge DT1 of the display object has already reached the display region 141, the display control section 130 of an information processing apparatus 100*b*1 performs control such that the predetermined second display that is different from the predetermined first display is not shown on the display region 141 yet.

In the case where the movement operation performed by the operating object OP is detected by the detection section 110 when the edge DT1 of the display object has already reached the edge of the display region 141 corresponding to the edge DT1 of the display object, the display control section 130 of an information processing apparatus 100*b*2 performs control such that the predetermined second display that is different from the predetermined first display is shown on the display region 141. In FIG. 36, there is shown an example in which the length of the display object DB4 in the movement direction (for example, downward direction) is shorter than the length of the display region 141 in the movement direction.

In such a case, as shown in FIG. 36, the display control section 130 of the information processing apparatus 100*b*2 performs control such that the predetermined second display is shown, by lengthening the display object DB4 in the direction from the edge DT1 of the display object to the edge DT2 of the display object on the basis of the edge DT1 of the display object which has reached the edge of the display region 141, for example. In the example shown in FIG. 36, the display control section 130 of the information processing apparatus 100*b*2 performs control such that the predetermined second display is shown, in a manner that the length in the movement direction (for example, downward direction) of the display object DB4 of the item "Action" that is present at the position of the operating object OP detected by the detection section 110 is changed from B(1) to D(1), and that the length in the movement direction (for example, downward direction) of the display object DB4 of "Adventure" which is present in the downward direction of the item is changed from B(2) to D(2).

In the case where the termination of the movement operation is detected by the detection section 110, the display control section 130 of an information processing apparatus 100*b*3 can perform control such that the predetermined second display on the display region 141 is hidden.

[1-15. Screen Displayed by Operation Before Edge of Display Object Reaches Display Region and after Edge of Display Object Reached Display Region]

Figure 37:
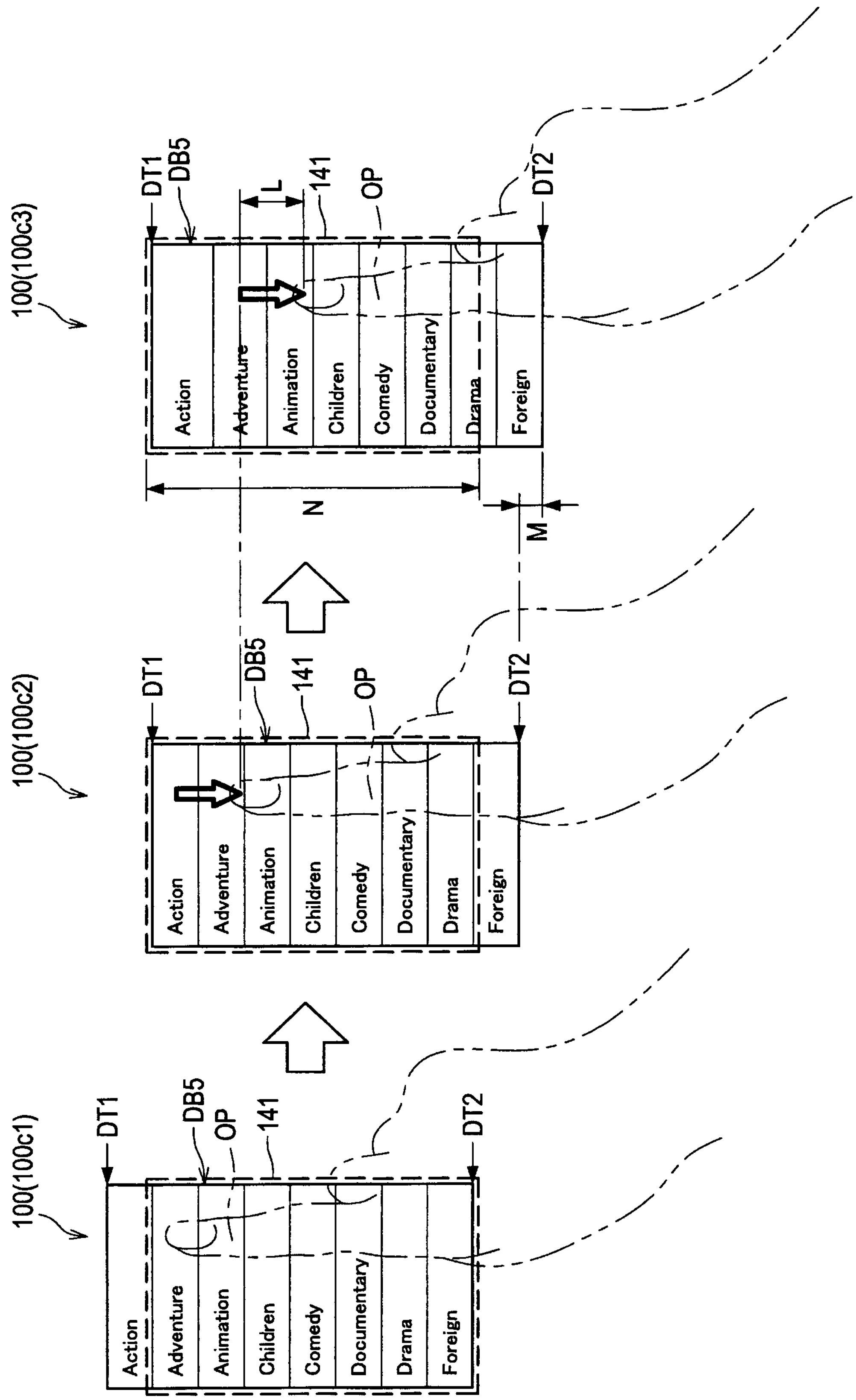
FIG. 37 is a diagram showing a screen example displayed by the information processing apparatus according to the embodiment, obtained by performing the movement operation before the edge of the display object reaches the display region and after the edge of the display object reached the display region.
Figure 38:
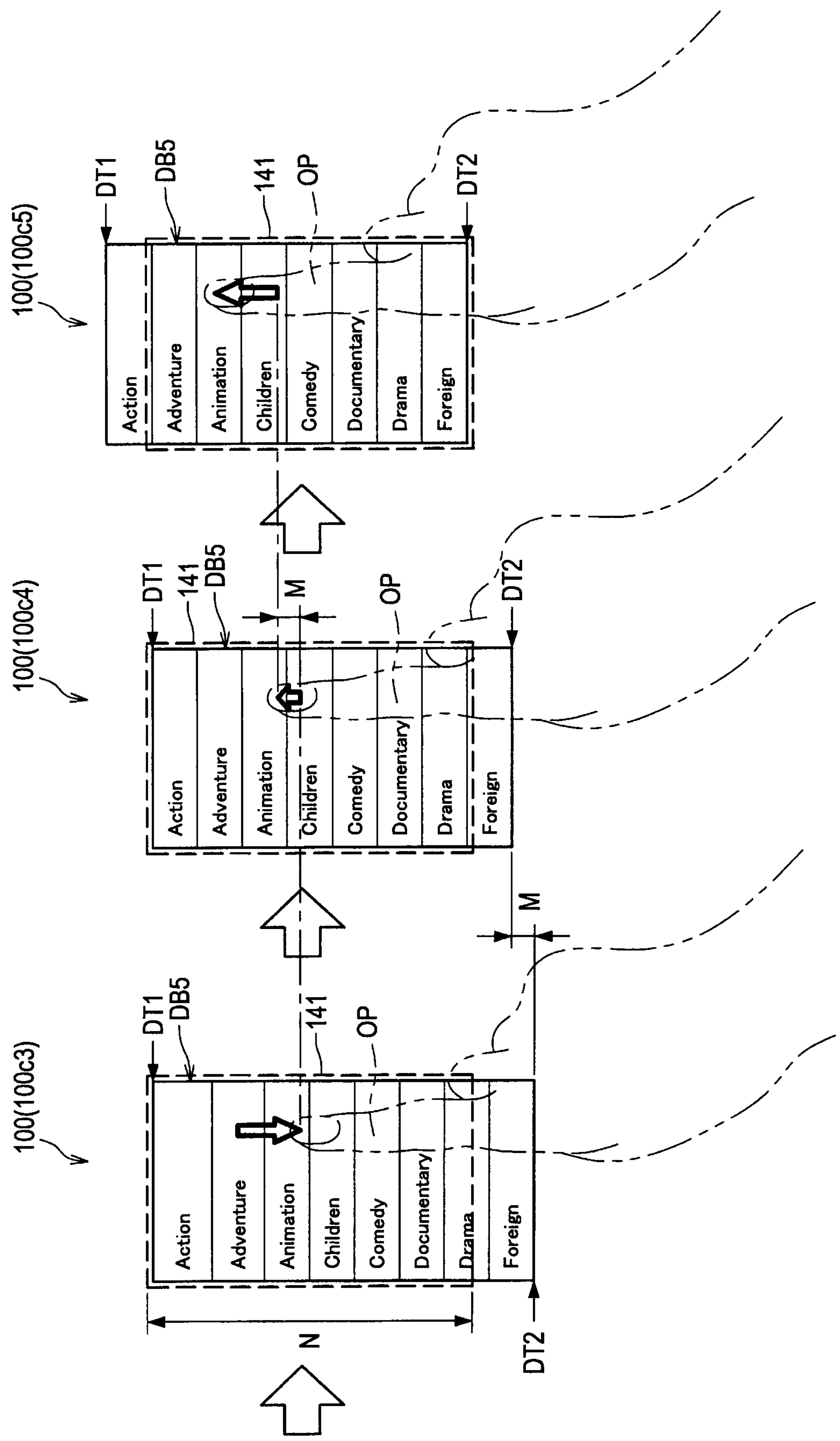
FIG. 38 is a diagram showing a screen example displayed by the information processing apparatus according to the embodiment, obtained by performing the movement operation before the edge of the display object reaches the display region and after the edge of the display object reached the display region.

FIGS. 37 and 38 are each a diagram showing a screen example displayed by the information processing apparatus 100 according to the embodiment of the present disclosure, obtained by performing the movement operation before the edge DT1 of the display object reaches the display region 141 and after the edge DT1 of the display object reached the display region 141. While the edge DT1 of the display object does not reach display region 141, the display control section 130 of an information processing apparatus 100*c*1 performs control such that the predetermined second display that is different from the predetermined first display is not shown on the display region 141 yet.

When the movement operation performed by the operating object OP is detected by the detection section 110, the display control section 130 of an information processing apparatus 100*c*2 performs control such that the predetermined second display that is different from the predetermined first display is not shown on the display region 141 yet, until the edge DT1 of the display object reaches the display region 141.

In the case where the movement operation performed by the operating object OP is detected by the detection section 110 when the edge DT1 of the display object has already reached the edge of the display region 141 corresponding to the edge DT1 of the display object, the display control section 130 of an information processing apparatus 100*c*3 performs control such that the predetermined second display that is different from the predetermined first display is shown on the display region 141. In the example shown in FIG. 37, the display control section 130 of the information processing apparatus 100*c*3 performs the control such that the predetermined second display is shown, by changing the shapes of items which are determined based on the edge DT1 of the display object and the position of the operating object OP detected by the detection section 110.

In the example shown in FIG. 37, the display control section 130 of the information processing apparatus 100*c*3 changes the shapes of the items "Action" and "Adventure" by lengthening the items in the movement direction. When an elongation amount of an display object DB5 (total of elongation amounts of respective items) is represented by M, and a movement distance of the operating object OP in the movement direction in the case where the movement operation is performed at the stage in which the edge DT1 of the display object has already reached the display region 141 is represented by L, the display control section 130 of the information processing apparatus 100*c*3 can lengthen the display object DB5 based on M, which is determined as shown in the following Equation 2, for example.

$$M=\beta\times L \quad \text{(Equation 2)}$$

Here, β represents a constant value, the value thereof is not particularly limited, and may be 3/10(=0.3), for example.

Further, it is assumed that M changes based on the change in L, there may be set an upper limit $M_{max}$ for M. When the length of the display region 141 in the movement direction is represented by N, the display control section 130 of the information processing apparatus 100*c*3 can lengthen the display object DB5, using $M_{max}$, which is determined as shown in the following Equation 3, as the upper limit of the elongation amount of the display object DB5.

$$M_{max}=\alpha\times N \quad \text{(Equation 3)}$$

Here, α represents a constant value, the value thereof is not particularly limited, and may be 1/3, for example.

As shown in FIG. 38, in the case where a movement operation (for example, upward direction), which is a direction opposite to an elongation direction, is detected, the display control section 130 of an information processing apparatus 100*c*4 can perform control such that the elongation of the display object DB5 is cancelled, thereby hiding the predetermined second display on the display region 141. In the example shown in FIG. 38, every time a movement operation in the direction (for example, upward direction) which cancels the elongation is detected, the display control section 130 of the information processing apparatus 100*c*4 cancels the elongation of the display object DB5 for the movement distance based on the movement operation.

In the example shown in FIG. 38, the display control section 130 of the information processing apparatus 100*c*3 lengthens the display object DB5 in the 16 elongation direction (for example, downward direction) for the length corresponding to M. Therefore, every time the movement operation in the direction opposite to the elongation direction is detected, the display control section 130 of the information processing apparatus 100*c*4 can cancel the elongation for the movement distance based on the movement operation, until the elongation amount of the display object DB5 becomes zero.

In the case where the movement operation in the direction (for example, upward direction), which is a direction opposite to the elongation direction, is detected after the elongation amount of the display object DB5 became zero, the display control section 130 of an information processing apparatus 100*c*5 can move the display object DB5 in the direction opposite to the elongation direction for the movement distance based on the movement operation.

[1-16. Screen Displayed by Operation after Edge of Display Object Reached Display Region]

Figure 39:
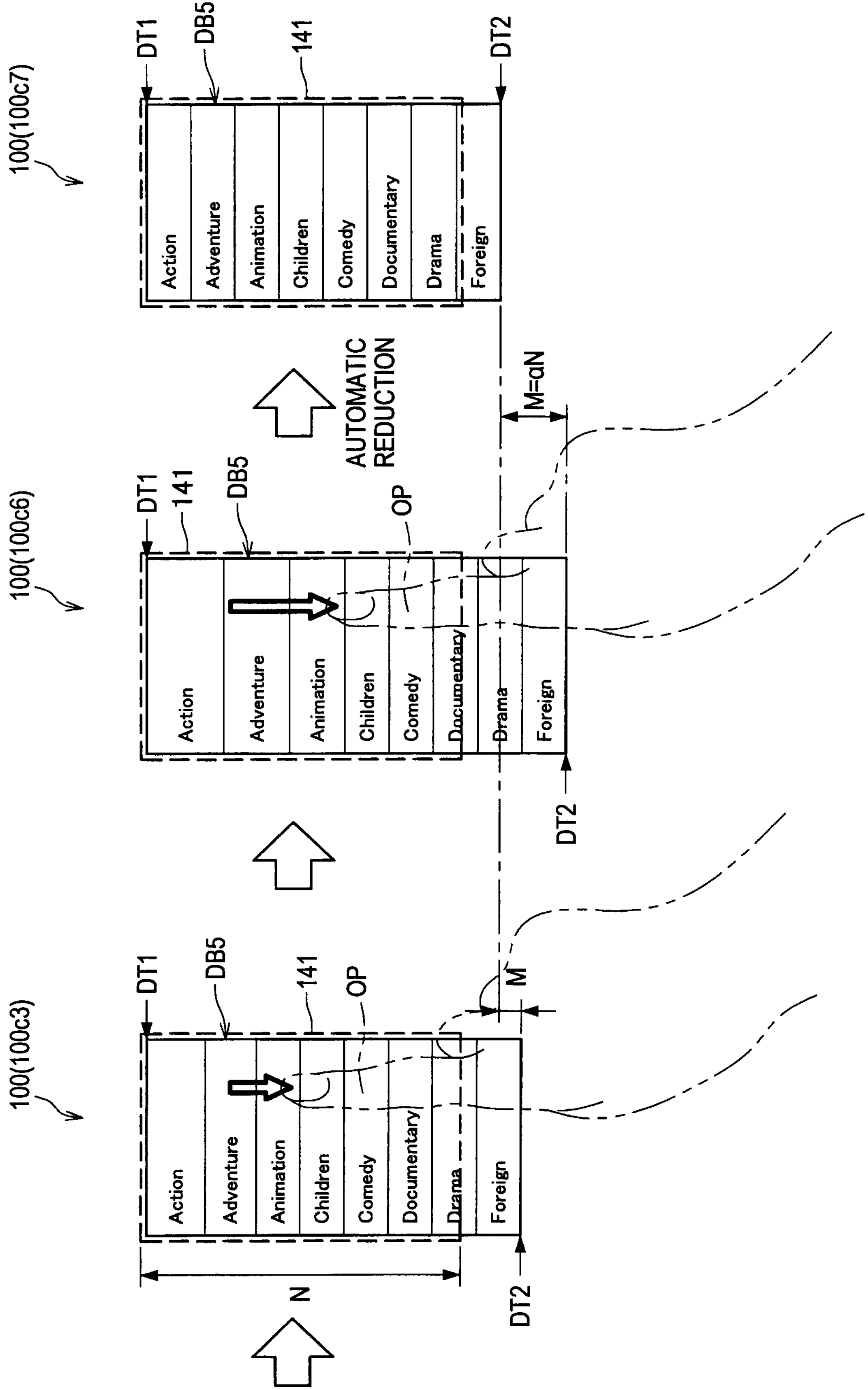
FIG. 39 is a diagram showing a screen example displayed by the information processing apparatus according to the embodiment, obtained by performing the movement operation after the edge of the display object reached the display region.

FIG. 39 is a diagram showing a screen example displayed by the information processing apparatus 100 according to the embodiment of the present disclosure, obtained by performing the movement operation after the edge DT1 of the display object reached the display region 141. As shown in FIG. 39, in the same manner as in the case shown in FIG. 38, the display control section 130 of the information processing apparatus 100*c*3 performs control such that the predetermined second display is shown, by changing the shape of an item which is determined based on the edge DT1 of the display object and the position of the operating object OP detected by the detection section 110.

The display control section 130 of an information processing apparatus 100*c*6 can lengthen the display object DB5 based on M, which is determined as shown in the above Equation 2, for example. However, in the case where the upper limit $M_{max}$ is set for M, the display control section 130 of the information processing apparatus 100*c*6 cannot lengthen the display object DB5 in excess of $M_{max}$, which is determined as shown in the above Equation 3.

Accordingly, in the case where the elongation amount M of the display object DB5 reaches a predetermined amount (for example, $M_{max}$), the display control section 130 of an information processing apparatus 100*c*7 may perform automatic reduction of the display object DB5. That is, in the case where the elongation amount M of the display object DB5 reaches the predetermined amount (for example, $M_{max}$), the display control section 130 of the information processing apparatus 100*c*7 may perform control such that the elongation of the display object DB5 is cancelled (may perform control such that the elongation amount M of the display object DB5 is brought back to zero).

Figure 40:
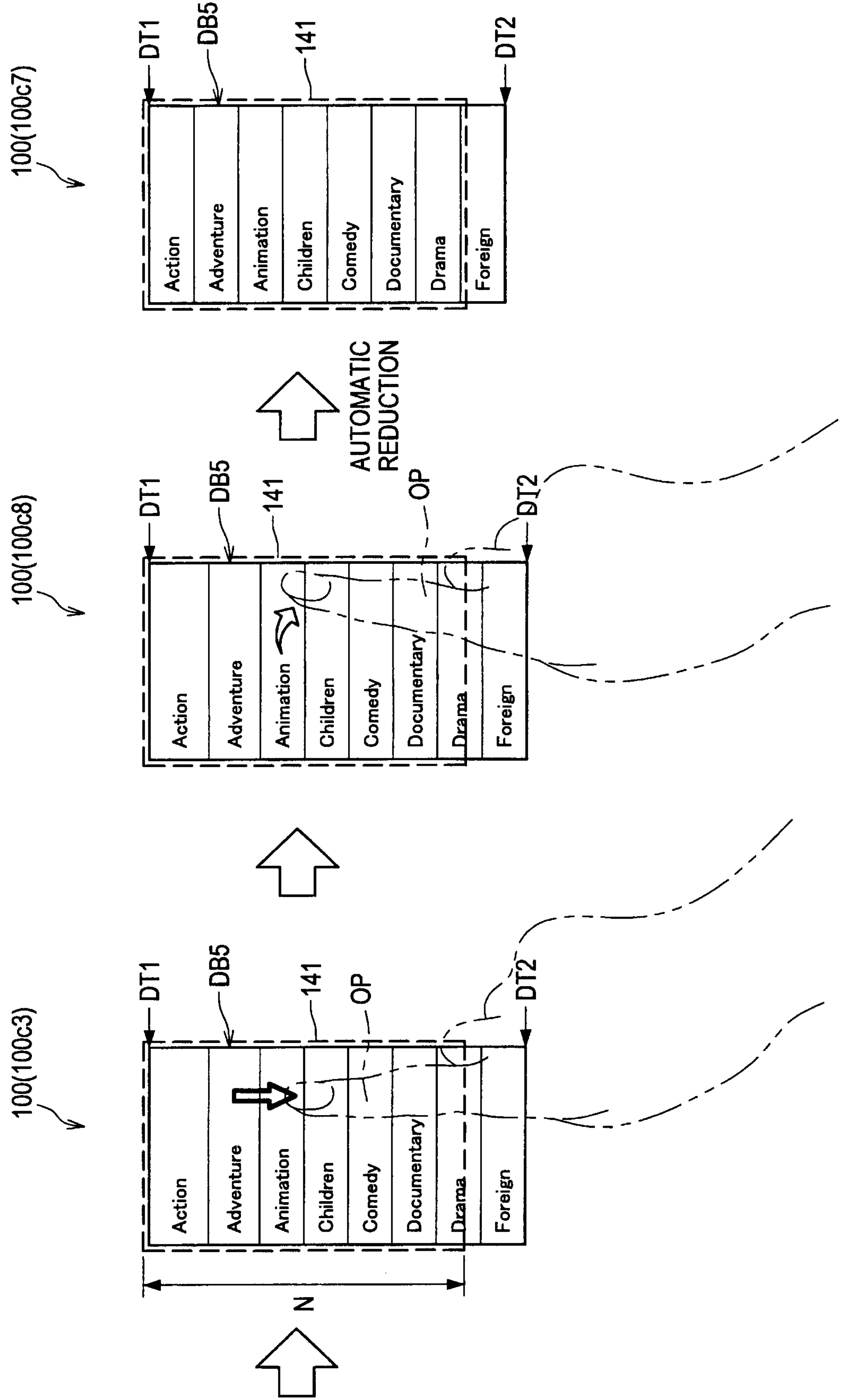
FIG. 40 is a diagram showing a screen example displayed by the information processing apparatus according to the embodiment, obtained by performing the movement operation after the edge of the display object reached the display region.

FIG. 40 is a diagram showing a screen example displayed by the information processing apparatus 100 according to the embodiment of the present disclosure, obtained by performing the movement operation after the edge DT1 of the display object reached the display region 141. As shown in FIG. 40, in the same manner as in the case shown in FIG. 38, the display control section 130 of the information processing apparatus 100c3 performs control such that the predetermined second display is shown, by changing the shape of an item which is determined based on the edge DT1 of the display object and the position of the operating object OP detected by the detection section 110.

Subsequently, let us assume that the detection section 110 of an information processing apparatus 100c8 detects the termination of the movement operation. In that case, the display control section 130 of the information processing apparatus 100c7 may perform automatic reduction of the display object DB5. That is, in the case where the detection section 110 detects the termination of the movement operation, the display control section 130 of the information processing apparatus 100c7 may perform control such that the elongation of the display object DB5 is cancelled (may perform control such that the elongation amount M of the display object DB5 is brought back to zero).

It is assumed that there are various techniques for the display control section 130 to perform the automatic reduction of the display object DB5. For example, when V(t) represents a length of the display object DB5 at time t, $V_{END}$ represents a terminal value of the length of the display object DB5, $V_{START}$ represents an initial value of the length of the display object DB5, $t_{DURATION}$ represents time required for the automatic reduction, and γ represents an attenuation parameter, the display control section 130 can reduce the length of the display object DB5 based on V(t), which is determined as shown in the following Equation 4.

$$V(t)=(V_{END}-V_{START})\times(1.0-(1.0-t/t_{DURATION})^{2\times\gamma})+V_{START} \quad \text{(Equation 4)}$$

[1-17. Another Example of Case where Edge of Display Object Reaches Display Region at End of Flick]

Figure 41:
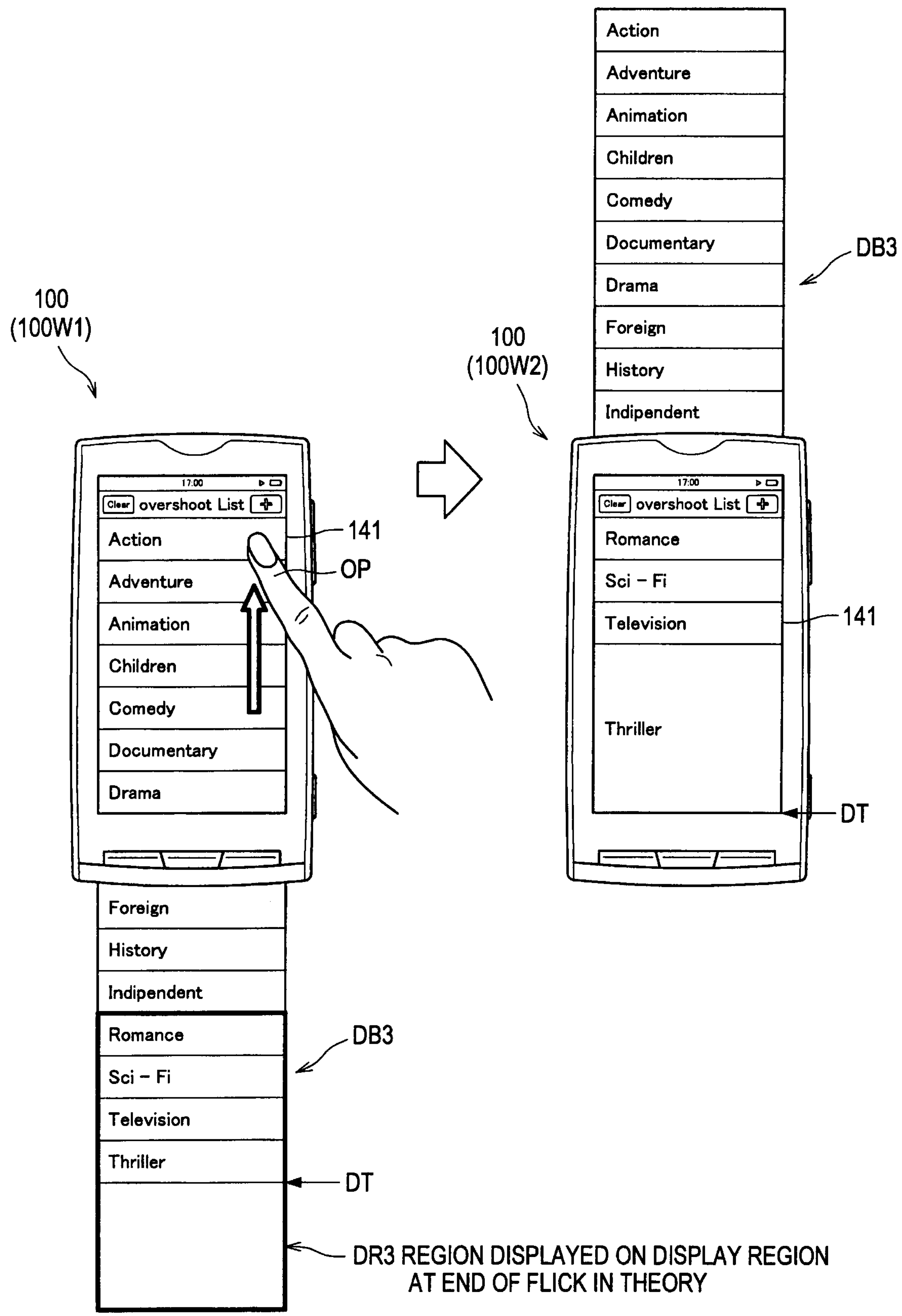
FIG. 41 is a diagram illustrating another example of the operation of the information processing apparatus according to the embodiment in the case where the edge of the display object reaches the display region at the end of the flick.
Figure 42:
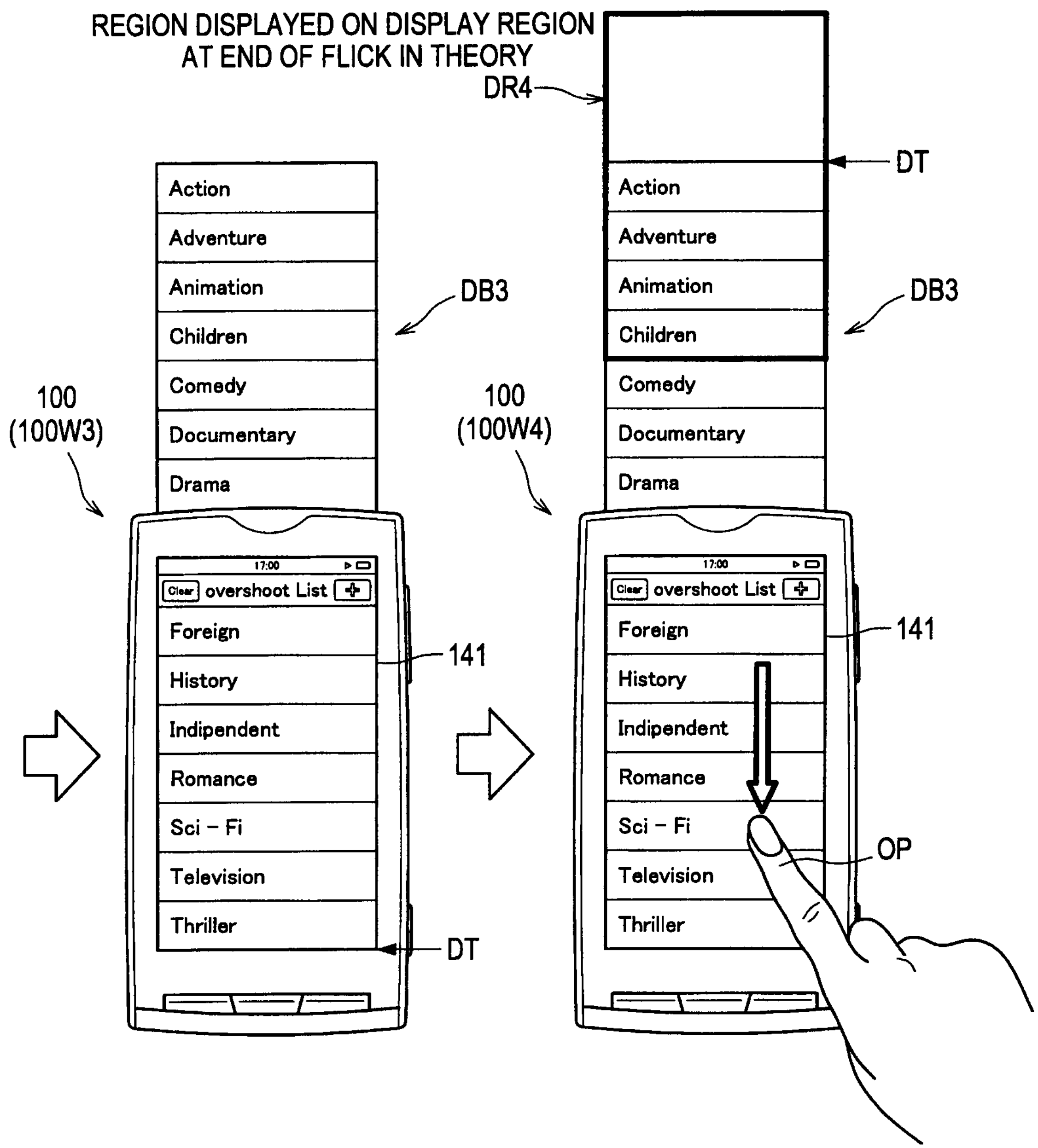
FIG. 42 is a diagram illustrating another example of the operation of the information processing apparatus according to the embodiment in the case where the edge of the display object reaches the display region at the end of the flick.
Figure 43:
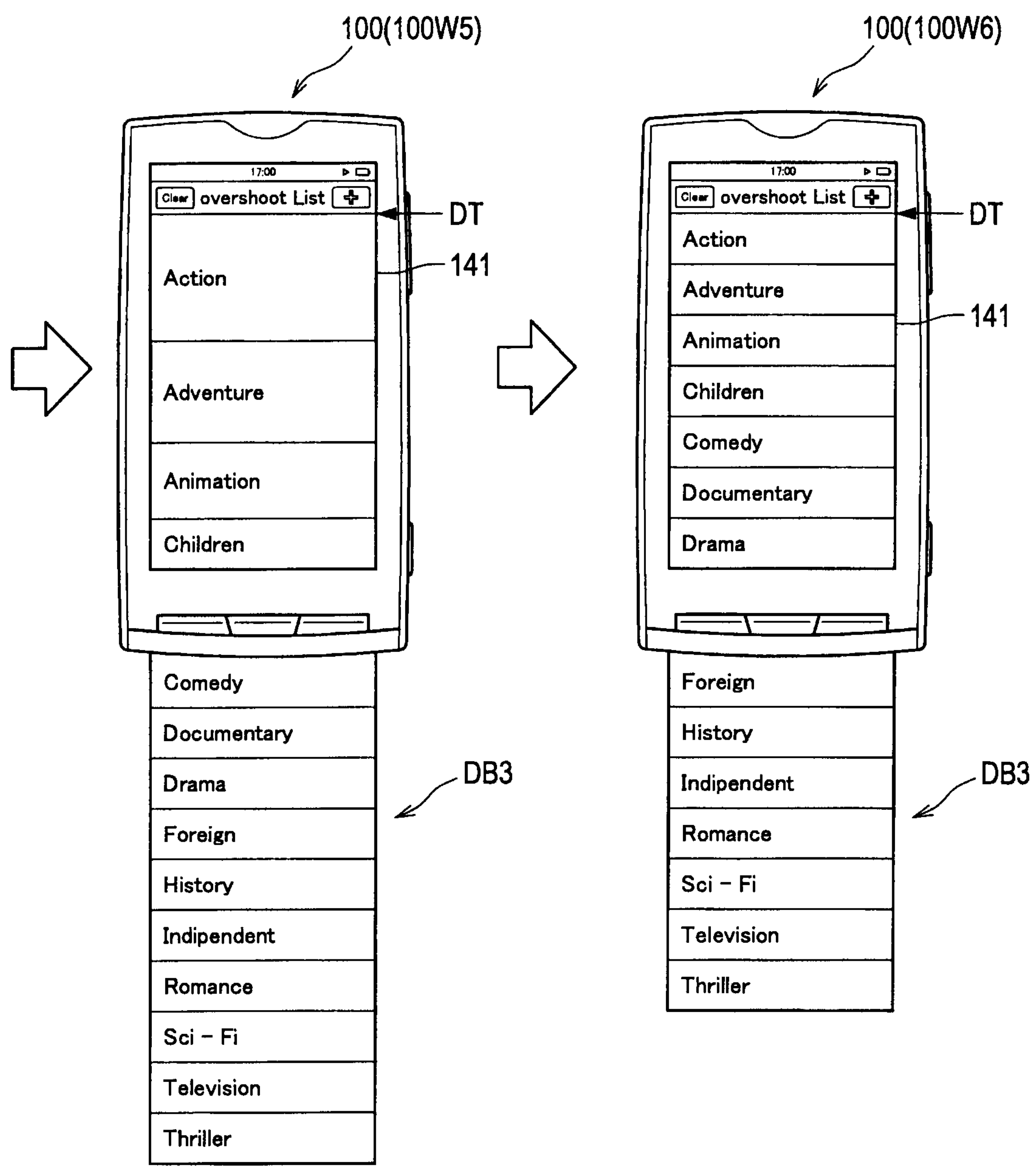
FIG. 43 is a diagram illustrating another example of the operation of the information processing apparatus according to the embodiment in the case where the edge of the display object reaches the display region at the end of the flick.

FIGS. 41 to 43 are each a diagram illustrating another example of the operation of the information processing apparatus 100 according to the embodiment of the present disclosure in the case where the edge of the display object reaches the display region at the end of the flick. As shown in FIG. 41, an information processing apparatus 100W1 causes a part of the display object DB3 to be displayed on the display region 141. When the flick operation in the upward direction is performed by the operating object OP in this state, it is assumed that the following corresponds to a region DR3 (i.e., a portion of the display object DB3) that is displayed on the display region 141 at the end of the flick operation in theory: a region within the display object DB3 obtained by proceeding the distance corresponding to the intensity of the flick operation from the region displayed on the display region 141, in the downward direction of the display object DB3.

As shown in FIG. 41, at the end of the flick, although the display control section 130 of an information processing apparatus 100W2 attempts to cause the region DR3 to be displayed on the display region 141, which is to be displayed on the display region 141 at the end of the flick in theory, the display control section 130 of the information processing apparatus 100W2 cannot cause the region DR3 to be displayed, because the edge DT (lower edge) of the display object DB3 passes through the edge (lower edge) of the display region 141. The determination on whether the edge DT (lower edge) of the display object DB3 passes through the edge (lower edge) of the display region 141 is performed by the determination section 120 as described above.

In the case where the determination section 120 determines that the edge DT of the display object passes through the edge of the display region 141 corresponding to the edge DT of the display object by the movement of the display object DB3 caused by the flick operation, the display control section 130 of the information processing apparatus 100W2 can cause a part or all of the display object DB3 to be lengthened after the edge DT of the display object DB3 reached the edge of the display region 141 corresponding to the edge DT of the display object DB3. The display control section 130 of the information processing apparatus 100W2 may cause the lengthened display object DB3 to be displayed on the display region 141, for example. In FIG. 41, there is shown an example in which the display control section 130 of the information processing apparatus 100W2 performs control such that the item “Thriller”, which is the nearest item from the edge DT (lower edge) of the display object DB3, is lengthened, and the lengthened display object DB3 is displayed on the display region 141.

After the elapse of a predetermined time period from the control of displaying the lengthened display object DB3 on the display region 141, the display control section 130 of an information processing apparatus 100W3 may perform control such that, as shown in FIG. 42, the display object DB3 whose elongation is cancelled is displayed on the display region 141. In FIG. 42, there is shown an example in which the display control section 130 of the information processing apparatus 100W3 performs control such that the display object DB3 in which the elongation of the item “Thriller” is cancelled is displayed on the display region 141, after the elapse of the predetermined time period.

As shown in FIG. 42, an information processing apparatus 100W4 causes a part of the display object DB3 to be displayed on the display region 141. When the flick operation in the downward direction is performed by the operating object OP in this state, it is assumed that the following corresponds to a region DR4 that is displayed on the display region 141 at the end of the flick operation in theory: a region within the display object DB3 obtained by proceeding the distance corresponding to the intensity of the flick operation from the region displayed on the display region 141, in the upward direction of the display object DB3.

As shown in FIG. 43, at the end of the flick, although the display control section 130 of an information processing apparatus 100W5 attempts to cause the region DR4 to be displayed on the display region 141, which is to be displayed on the display region 141 at the end of the flick in theory, the display control section 130 of the information processing apparatus 100W5 cannot cause the region DR4 to be displayed, because the edge DT (upper edge) of the display object DB3 reaches the edge (upper edge) of the display region 141. In this case, the display control section 130 of the information processing apparatus 100W5 may cause the lengthened display object DB3 to be displayed on the display region 141, for example. In FIG. 43, there is shown an example in which the display control section 130 of the information processing apparatus 100W5 performs control such that “Action”, which is the nearest item from the edge DT (upper edge) of the display object DB3, “Adventure”, which is the second nearest item, and “Animation”, which is the third nearest item, are lengthened, and the lengthened display object DB3 is displayed on the display region 141.

Note that the number of items to be lengthened by the display control section 130 is not particularly limited. For example, the display control section 130 may not lengthen the item based on the velocity of the flick operation, but may lengthen in the same amount each of a predetermined number of items counted from the nearest item from the edge DT of the display object DB3, or may lengthen the items such that the nearer the item is from the edge DT of the display object DB3, the larger the extent to which the item is lengthened. Further, for example, the display control section 130 may lengthen in the same amount the items counted from the nearest item from the edge DT of the display object DB3, or may lengthen the items such that the nearer the item is from the edge DT of the display object DB3, the larger the extent to which the item is lengthened, the number of items being determined in accordance with the velocity of the flick operation.

After the elapse of a predetermined time period from the control of displaying the lengthened display object DB3 on the display region 141, the display control section 130 of an information processing apparatus 100W6 may perform control such that, as shown in FIG. 43, the display object DB3 whose elongation is cancelled is displayed on the display region 141. In FIG. 43, there is shown an example in which the display control section 130 of the information processing apparatus 100W6 performs control such that the display object DB3 in which the elongation of the items "Action", "Adventure", and "Animation" is cancelled is displayed on the display region 141, after the elapse of a predetermined time period.

[1-18. Operation in Case where Drag Operation (in X- and Y-Axis Directions) is Performed]

FIG. 44 is a flowchart showing a flow of an operation (when the display object can be moved in the X-axis direction and in the Y-axis direction) performed by the information processing apparatus according to the embodiment in the case where the drag operation is performed. As shown in FIG. 44, the determination section 120 determines whether the operation detected by the detection section 110 is dragging (Step S301). In the case of determining that the operation detected by the detection section 110 is not dragging ("No" in Step S301), the determination section 120 determines whether the operation performed in the immediately preceding processing flow detected by the detection section 110 was the Overdrag (Step S302). In the case where the determination section 120 determines that the operation performed in the immediately preceding processing flow detected by the detection section 110 was not the Overdrag ("No" in Step S302), the display control section 130 returns to Step S301. In the case where the determination section 120 determines that the operation performed in the immediately preceding processing flow detected by the detection section 110 was the Overdrag ("Yes" in Step S302), the display control section 130 performs control such that Fadeout-drawing, in which the predetermined second display is gradually hidden, is executed (Step S303), and returns to Step S301.

In the case of determining that the operation detected by the detection section 110 is dragging ("Yes" in Step S301), the determination section 120 determines whether the operation is currently during the Overdrag in the X-direction (Step S304). In the case of determining that the operation is currently not during the Overdrag in the X-direction ("No" in Step S304), the determination section 120 determines whether the operation is currently during the Overdrag in the Y-direction (Step S312). In the case of determining that the operation is currently not during the Overdrag in the Y-direction ("No" in Step S312), the determination section 120 proceeds to Step S302.

In the case of determining that the operation is currently during the Overdrag in the Y-direction ("Yes" in Step S312), the determination section 120 determines whether the operation performed in the immediately preceding processing flow was also the Overdrag in the Y-direction (Step S313). In the case of determining that the operation performed in the immediately preceding processing flow was also the Overdrag in the Y-direction ("Yes" in Step S313), the determination section 120 determines whether the operation is currently during the Overdrag in the X-direction (Step S315). In the case of determining that the operation performed in the immediately preceding processing flow was not the Overdrag in the Y-direction ("No" in Step S313), the determination section 120 replaces the Overdrag-start point in the Y-direction with a current Y coordinate detected by the detection section 110 (Step S314), and proceeds to Step S315.

The determination section 120 determines whether the operation is currently during the Overdrag in the X-direction (Step S315). In the case of determining that the operation is currently not during the Overdrag in the X-direction ("No" in Step S315), the determination section 120 updates Overdrag-drawing in the Y-direction (Step S318) and returns to Step S301. The updating of the Overdrag-drawing in the Y-direction means that control is performed such that the predetermined second display is shown in the Y-direction.

In the case of determining that the operation is currently during the Overdrag in the X-direction ("Yes" in Step S315), the determination section 120 determines whether the operation performed in the immediately preceding processing flow was also the Overdrag in the X-direction (Step S316). In the case of determining that the operation performed in the immediately preceding processing flow was also the Overdrag in the X-direction ("Yes" in Step S316), the determination section 120 updates Overdrag-drawing in the XY-directions (Step S311) and returns to Step S301. The updating of the Overdrag-drawing in the XY-directions means that control is performed such that the predetermined second display is shown in the XY-directions.

In the case of determining that the operation performed in the immediately preceding processing flow was not the Overdrag in the X-direction ("No" in Step S316), the determination section 120 replaces the Overdrag-start point in the X-direction with a current X coordinate detected by the detection section 110 (Step S317), and proceeds to Step S311. In the case of determining that the operation is currently during the Overdrag in the X-direction ("Yes" in Step S304), the determination section 120 carries out processing in the X-direction in the same manner as in the case of "Yes" in Step S312.

<2. Modified Example>

It should be understood by those skilled in the art that various modifications, combinations, sub-combinations and alterations may occur depending on design requirements and other factors insofar as they are within the scope of the appended claims or the equivalents thereof.

For example, although it is shown in the present embodiment that the information processing apparatus 100 performs the predetermined first display, the predetermined second display, and the predetermined third display, it is not necessary that the information processing apparatus 100 perform all the predetermined first display, the predetermined second display, and the predetermined third display. For example, at least one of the predetermined first display, the predetermined second display, and the predetermined third display may be performed, or any two of the predetermined first display, the predetermined second display, and the predetermined third display may be performed.

<3. Summary>

According to the embodiment of the present disclosure, it is possible to grasp, in the stage in which the operation of moving the display object is performed, how far the display object can be moved. According to the embodiment of the present disclosure, in the case where the movement operation is performed at the stage in which an edge of the display object has already reached the display region, it is possible to notify the user that the display object cannot be scrolled any farther.

What is claimed is:

1. An apparatus comprising:

a display;

a touch panel;

a processor; and a non-transitory computer-readable medium encoded with instructions which, when executed by the processor, cause the apparatus to:

display, in a region of the display, a portion of a scrollable display object including a plurality of respective items and a separator line for separating the plurality of respective items;

detect a movement operation in which an operating object moves at least partially in a first direction along the touch panel while in contact with the touch panel;

determine, during the movement operation, whether an edge of the display object has reached the region of the display;

when, during the movement operation, the edge of the display object has not reached the region, scroll the display object in the first direction within the region;

when, during the movement operation, the edge of the display object has reached the region, refrain from moving the edge of the display object in the first direction;

detect, during the movement operation, an overdrag operation in which the operating object moves at least partially in the first direction at a time after the edge of the display object has reached the region of the display; and in response to detecting the overdrag operation and before the operating object releases contact with the touch panel, display, under control of the operating object, a graphic element in the region of the display, wherein the graphic element comprises a curved shape and a degree of curvature of the curved shape is updated on the basis of an extent of the overdrag operation.

2. The apparatus of claim 1, wherein a direction of the separator line is orthogonal to the first direction of the overdrag operation.

3. The apparatus of claim 1, wherein the computer-readable medium is encoded with additional instructions which, when executed by the processor, further cause the apparatus to:

monitor a characteristic of the detected movement of the operating object during the movement operation; and modify at least one feature of the graphic element during the movement operation based on changes to the monitored characteristic.

4. The apparatus of claim 3, wherein the monitored characteristic of the detected movement comprises a distance traveled by the operating object along the touch panel.

5. The apparatus of claim 4, wherein the at least one modified feature of the graphic element comprises a shape of the graphic element.

6. The apparatus of claim 5, wherein the at least one modified feature of the graphic element further comprises a size of the graphic element.

7. The apparatus of claim 1, wherein the instructions that cause the apparatus to display the graphic element in the region comprise additional instructions which, when executed by the processor, cause the apparatus to:

display the graphic element in an orientation that depends on a direction of the overdrag operation.

8. The apparatus of claim 1, wherein the computer-readable medium is encoded with additional instructions which, when executed by the processor, further cause the apparatus to:

modify a shape of the graphic element based on an extent of the overdrag operation.

9. The apparatus of claim 8, wherein the computer-readable medium is encoded with additional instructions which, when executed by the processor, further cause the apparatus to:

modify a size of the graphic element based on the extent of the overdrag operation.

10. The apparatus of claim 1, wherein the instructions that cause the apparatus to display the graphic element in the region comprise additional instruction which, when executed by the processor, cause the apparatus to:

orient the curved shape in the region in a direction corresponding to a direction of the overdrag operation.

11. The apparatus of claim 1, wherein the graphic element further comprises a flat edge located opposite to the curved shape, and the instructions that cause the apparatus to display the graphic element in the region comprise additional instruction which, when executed by the processor, cause the apparatus to:

display the graphic element in the region so that the curved shape is oriented in a direction of the overdrag operation.

12. The apparatus of claim 11, wherein the graphic element comprises a shaded area.

13. The apparatus of claim 1, wherein the computer-readable medium is encoded with additional instructions which, when executed by the processor, further cause the apparatus to:

identify an end of the movement operation; and cease displaying the graphic element in the region in response to identifying the end of the movement operation.

14. The apparatus of claim 13, wherein the instructions that cause the processor to cease displaying the graphic element include instructions that, when executed by the processor, cause the graphic element to gradually fade out from the region.

15. The apparatus of claim 1, wherein the computer-readable medium is encoded with additional instructions which, when executed by the processor, further cause the apparatus to:

display, under control of the operating object and in response to detecting the overdrag operation and before the operating object releases contact with the touch panel, the graphic element in the region that at least partially overlays at least one item of the plurality of items, the at least one item being located adjacent the edge.

16. The apparatus of claim 1, wherein the graphic element at least partially overlays the separator line.

17. A non-transitory computer-readable medium for use with an apparatus including a display, a touch panel, and a processor, wherein the computer-readable medium is encoded with instructions which, when executed by the processor, cause the apparatus to:

display, in a region of the display, a portion of a scrollable display object including a plurality of respective items and a separator line for separating the plurality of respective items;

detect a movement operation in which an operating object moves at least partially in a first direction along the touch panel while in contact with the touch panel;

determine, during the movement operation, whether an edge of the display object has reached the region of the display;

when, during the movement operation, the edge of the display object has not reached the region, scroll the display object in the first direction within the region;

when, during the movement operation, the edge of the display object has reached the region, refrain from moving the edge of the display object in the first direction;

detect, during the movement operation, an overdrag operation in which the operating object moves at least partially in the first direction at a time after the edge of the display object has reached the region of the display; and in response to detecting the overdrag operation and before the operating object releases contact with the touch panel, display, under control of the operating object, a graphic element in the region of the display, wherein the graphic element comprises a curved shape and a degree of curvature of the curved shape is updated on the basis of an extent of the overdrag operation.

18. A method for operating an apparatus including a display and a touch panel, the method comprising:

displaying, in a region of the display, a portion of a scrollable display object including a plurality of respective items and a separator line for separating the plurality of respective items;

detecting a movement operation in which an operating object moves at least partially in a first direction along the touch panel while in contact with the touch panel;

in response to a first portion of the movement operation, scrolling the display object in the first direction within the region of the display;

determining that an edge of the display object reaches the region during the movement operation;

detecting, during a second portion of the movement operation, an overdrag operation in which the operating object moves at least partially in the first direction at a time after the edge of the display object has reached the region of the display;

refraining from moving the edge of the display object in the first direction in response to the second portion of the movement operation; and in response to detecting the overdrag operation and before the operating object releases contact with the touch panel, displaying, under control of the operating object, a graphic element in the region of the display, wherein the graphic element comprises a curved shape and a degree of curvature of the curved shape is updated on the basis of an extent of the overdrag operation.

* * * * *